(12) United States Patent
Jiang et al.

(10) Patent No.: US 12,141,660 B2
(45) Date of Patent: Nov. 12, 2024

(54) QUANTUM REPEATERS FOR CONCATENATED QUANTUM ERROR CORRECTION, AND ASSOCIATED METHODS

(71) Applicant: The University of Chicago, Chicago, IL (US)

(72) Inventors: Liang Jiang, Chicago, IL (US); Filip D. Rozpedek, Chicago, IL (US); Kyungjoo Noh, Pasadena, CA (US)

(73) Assignee: The University of Chicago, Chicago, IL (US)

(*) Notice: Subject to any disclaimer, the term of this patent is extended or adjusted under 35 U.S.C. 154(b) by 78 days.

(21) Appl. No.: 18/000,074

(22) PCT Filed: Jun. 4, 2021

(86) PCT No.: PCT/US2021/035940
§ 371 (c)(1),
(2) Date: Nov. 28, 2022

(87) PCT Pub. No.: WO2022/039818
PCT Pub. Date: Feb. 24, 2022

(65) Prior Publication Data
US 2023/0206110 A1   Jun. 29, 2023

Related U.S. Application Data

(60) Provisional application No. 63/035,589, filed on Jun. 5, 2020.

(51) Int. Cl.
*G06N 10/70* (2022.01)
*H04B 10/70* (2013.01)

(52) U.S. Cl.
CPC ............. *G06N 10/70* (2022.01); *H04B 10/70* (2013.01)

(58) Field of Classification Search
CPC ........ G06N 10/70; H04B 10/70; H04B 10/29; H04L 1/0041; H04L 1/0065
See application file for complete search history.

(56) References Cited

U.S. PATENT DOCUMENTS

| | | | |
|---|---|---|---|
| 9,858,531 B1* | 1/2018 | Monroe | .................. G06N 10/00 |
| 2007/0043997 A1* | 2/2007 | Yang | .................. H03M 13/2903 |
| | | | 714/758 |

(Continued)

OTHER PUBLICATIONS

A. Agata, K. Tanaka and N. Edagawa, "Study on the optimum Reed-Solomon-based FEC codes for 40-GB/s-based ultralong-distance WDM transmission," in Journal of Lightwave Technology, vol. 20, No. 12, pp. 2189-2195, Dec. 2002.*

(Continued)

*Primary Examiner* — Steve N Nguyen
(74) *Attorney, Agent, or Firm* — Cozen O'Connor

(57) ABSTRACT

Quantum repeaters and network architectures use two concatenated quantum error correction codes to increase the transmission range of quantum information. A block of data qubits collectively encode a second-layer logical qubit according to a second-layer code concatenated with a first-layer code. A first-layer quantum repeater first-layer corrects each data qubit based on a first-layer syndrome extracted therefrom. The first-layer quantum repeater transmits these first-layer-corrected qubits to a second-layer quantum repeater via a quantum communication channel. The first-layer quantum repeater also transmits the first-layer syndromes to the second-layer quantum repeater via a classical communication channel. After extracting a second-layer syndrome from the first-layer-corrected qubits, the second-layer quantum repeater uses the first-layer syndromes and second-layer syndrome to second-layer correct the first-layer-corrected qubits. The first-layer syndromes improve quantum error correction by reducing the number of sec- (Continued)

and-layer stabilizer measurements needed to determine which data qubits have an error.

19 Claims, 18 Drawing Sheets

(56) References Cited

U.S. PATENT DOCUMENTS

| | | | |
|---|---|---|---|
| 2008/0089696 A1* | 4/2008 | Furuta | H04L 9/0855 |
| | | | 398/175 |
| 2009/0204877 A1 | 8/2009 | Betts | |
| 2010/0251049 A1 | 9/2010 | Goto et al. | |
| 2012/0155870 A1 | 6/2012 | Harrison et al. | |
| 2014/0289583 A1 | 9/2014 | Goto et al. | |
| 2015/0214978 A1* | 7/2015 | Yoon | G06N 10/00 |
| | | | 714/776 |
| 2016/0344414 A1 | 11/2016 | Naaman et al. | |
| 2020/0334107 A1* | 10/2020 | Katabarwa | G06N 10/00 |
| 2021/0125096 A1* | 4/2021 | Puri | H04L 1/04 |

OTHER PUBLICATIONS

N. C. Jones, K. De Greve and Y. Yamamoto, "Fault-tolerant quantum repeaters for long-distance quantum communication based on quantum dots," 2012 Conference on Lasers and Electro-Optics (CLEO), San Jose, CA, USA, 2012.*

W. J. Munro, K. Azuma, K. Tamaki and K. Nemoto, "Inside Quantum Repeaters," in IEEE Journal of Selected Topics in Quantum Electronics, vol. 21, No. 3, pp. 78-90, May-Jun. 2015.*

W. J. Munro and K. Nemoto, "Routing on Quantum Repeater Networks," 2020 Conference on Lasers and Electro-Optics (CLEO), San Jose, CA, USA, 2020.*

M. Grassl, P. W. Shor and B. Zeng, "Generalized concatenation for quantum codes," 2009 IEEE International Symposium on Information Theory, Seoul, Korea (South), 2009, pp. 953-957.*

Z. Li, L. Xing and X. Wang, "A Family of Asymptotically Good Quantum Codes Based on Code Concatenation," in IEEE Transactions on Information Theory, vol. 55, No. 8, pp. 3821-3824, Aug. 2009.*

Albert et al., Performance and Structure of Single-Mode Bosonic Codes, arXiv:1708.05010v3 [quant-ph] Mar. 20, 2018.

Noh et al., Improved Quantum Capacity Bounds of Gaussian Loss Channels and Achievable Rates with Gottesman-Kitaev-Preskill Codes, arXiv:1801.07271v2 [quant-ph] Feb. 6, 2018.

Fluhmann et al., Encoding a Qubit in a Trapped-Ion Mechanical Oscillator, arXiv:1807.01033v1 [quant-ph] Jul. 3, 2018.

Fukui et al., Analog Quantum Error Correction with Encoding a Qubit into an Oscillator, arXiv:1706.03011v3 [quant-ph] Nov. 10, 2017.

Fukui, High-Threshold Fault-Tolerant Quantum Computation with the GKP Qubit and Realistically Noisy Devices, arXiv:1906.09767v1 [quant-ph] Jun. 24, 2019.

Vuillot et al., Quantum Error Correction with the Toric Gottesman-Kitaev-Preskill Code, Phys. Rev. A 99, 032344.

Briegel et al., Quantum Repeaters: The Role of Imperfect Local Operations in Quantum Communication, Physical Review Letters, vol. 81, No. 26, Dec. 28, 1998.

Noh et al., Fault-Tolerant Bosonic Quantum Error Correction with the Surface-GKP Code, arXiv: 1908.03579v2 [quant-ph] Jan. 13, 2020.

Fukui et al., High-Threshold Fault-Tolerant Quantum Computation with Analog Quantum Error Correction, arXiv:1712.00294v3 [quant-ph] Mar. 6, 2018.

Muralidharan et al., Ultrafast and Fault-Tolerant Quantum Communication Across Long Distances, arXiv:1310.5291v2 [quant-ph] Feb. 13, 2014.

Jiang et al., Quantum Repeater with Encoding, arXiv:0809.3629v2 [quant-ph] Dec. 21, 2008.

Gottesman et al., Encoding a Qubit in an Oscillator, Physical Review A, vol. 64, 012310, The American Physical Society.

Devitt et al., Quantum Error Correction for Beginners, arXiv:0905.2794v4 [quant-ph] Jun. 21, 2013.

Campagne-Ibarcq, Quantum Error Correction in a Qubit Encoded in Grid States of an Oscillator, arXvi:1907.12487v3 [quant-ph] Mar. 23, 2020.

PCT Application No. PCT/US21/35940, International Search Report and Written Opinion, dated Feb. 28, 2022.

* cited by examiner

FIG. 18

FIG. 19

QUANTUM REPEATERS FOR CONCATENATED QUANTUM ERROR CORRECTION, AND ASSOCIATED METHODS

RELATED APPLICATIONS

This application is a 35 U.S.C. § 371 filing of International Application No. PCT/US2021/035940, filed on Jun. 4, 2021, which claims priority to U.S. Provisional Patent Application No. 63/035,589, filed on Jun. 5, 2020. Each of these applications is incorporated herein by reference in its entirety.

STATEMENT REGARDING FEDERALLY SPONSORED RESEARCH OR DEVELOPMENT

This invention was made with government support under grant numbers W911NF-15-2-0067, W911NF-18-1-0020, W911NF-18-1-0212, and W911NF-16-1-0349 awarded by Army Research Office, grant numbers FA9550-15-1-0015 and FA9550-19-1-0399 awarded by Air Force Office of Scientific Research, and grant numbers EFMA1640959 and OMA1936118 awarded by National Science Foundation. The government has certain rights in the invention.

BACKGROUND

Quantum error correction (QEC) refers to techniques that detect an error in a logical qubit without measuring the actual state of the logical qubit. QEC techniques work by redundantly encoding each logical qubit in more Hilbert-space dimensions than is necessary (i.e., two dimensions for a qubit). This redundancy can be implemented by using multiple physical qubits, physical qubits having a sufficiently complex internal energy-level structure, or a combination thereof. Thus, QEC can serve as the basis for a quantum repeater that detects and corrects errors that have occurred during qubit transmission through a quantum communication channel.

SUMMARY

Quantum repeaters are used in quantum communication networks to extend the transmission range of quantum information (i.e., data encoded as qubits), similar to how classical repeaters are used in classical communication networks to extend the transmission range of classical signals (i.e., data encoded as bits). In classical fiber-optic communications, an optical repeater regenerates light pulses that have been attenuated due to transmission along a lossy optical fiber. The optical repeater performs this regeneration by optically amplifying the light pulses to compensate for the attenuation introduced by the optical fiber. Some optical repeaters also implement pulse reshaping, retiming, or both to correct for distortion (e.g., pulse broadening) to the light pulses caused by dispersion of the optical fiber.

Much like the classical case, the integrity of quantum information can degrade over long distances due to attenuation. For example, quantum information can be encoded as logical qubits in photonic signals that are transmitted over hundreds of kilometers, or more, via optical fiber. Here, the photonic signals serve as "quantum information carriers". Attenuation of the photonic signals in the optical fiber gives rise to various types of qubit errors, such as single-qubit phase errors, single-qubit bit-flip errors, erasures, multi-qubit errors, and others. The type of qubit error that occurs depends on the encoding scheme used. For example, each logical qubit can be encoded in a single photon (e.g., via polarization or time-bin encoding). In this case, attenuation destroys the photon, causing an erasure error. This destruction of quantum information renders direct transmission of single-photon encoding schemes impractical for long-distance quantum communication.

In more practical encoding schemes, a logical qubit is encoded in the bosonic modes of a quantum harmonic oscillator. For example, a logical qubit may be encoded as a superposition of photon-number states. After a photon is lost, the resulting state is still a superposition of photon-number states. If the encoding is designed appropriately, the quantum harmonic oscillator can retain the logical qubit even after losing the photon. For example, in cat-state encoding, a logical qubit can be encoded in two quasi-orthogonal even states $|0\rangle_L = |\alpha\rangle + |-\alpha\rangle$ and $|1\rangle_L = |i\alpha\rangle + |-i\alpha\rangle$. Loss of a photon transforms these states into quasi-orthogonal odd cat states with odd photon number. The preservation of quasi-orthogonality means that the quantum information is preserved under such a photon loss. Hence, by measuring the photon-number parity (i.e., odd or even) of the state, an error can be detected without collapsing the encoded information. If odd parity is measured, the photon loss error can be corrected. Cat-state encoding is one example of a bosonic code, and other examples of bosonic codes include GKP codes and binomial codes, both of which are similarly constructed such that photon loss gives rise to errors that are detectable and correctable.

The present embodiments feature quantum repeaters and network architectures that implement quantum error correction (QEC) with two concatenated codes to advantageously increase the transmission range of a quantum communication network using fewer resources than prior-art approaches. Specifically, a plurality of physical qubits collectively block-encode a second-layer logical qubit according to a second-layer code concatenated with a first-layer code. Each of the physical qubits individually encodes a first-layer logical qubit according to the first-layer code. Each of the first-layer and second-layer codes may be any type of QEC code known in the art (e.g., continuous-variable or discrete-variable).

In some embodiments, the first-layer code is a continuous-variable bosonic code (e.g., a Gottesman-Kitaev-Preskill code, binominal code, cat code, etc.) and the second-layer code is a discrete-variable code (e.g., a subsystem code, stabilizer code, Calderbank-Shor-Steane code, surface code, etc.). To implement the bosonic code, each physical qubit may be a quantum harmonic oscillator whose many energy levels (an infinite number, in theory) can be used to encode quantum information in a much larger dimensional Hilbert space than a "traditional" two-level physical qubit. Thus, the bosonic code takes advantage of the redundancy inherent in the bosonic modes of quantum harmonic oscillators.

The terms "first-layer correcting" and "first-layer QEC" are used herein to refer to QEC that is applied only to physical qubits according to the first-layer code. With first-layer QEC, each physical qubit is individually corrected (e.g., sequentially one at a time, or separately in parallel) by first performing a first-layer stabilizer measurement with the physical qubit to extract a corresponding first-layer syndrome. The first-layer syndrome may indicate that the first-layer logical qubit encoded in the physical qubit has an error. This error, referred to herein as a "first-layer physical error", may be any type of error that is correctable by the first-layer code. By contrast, the term "first-layer logical error" refers to any type of error that cannot be corrected by the first-layer code. First-layer logical errors can be corrected by the second-layer code, as described in more detail below.

Each physical qubit is then transformed, based on its first-layer syndrome, to undo the first-layer physical error. For example, when the first-layer code is a bosonic code, each first-layer syndrome is a continuous real value quantifying how much the first-layer logical qubit has shifted in phase space relative to the logical basis states of the first-layer code. Herein, the term "first-layer quantum repeater" refers to a quantum repeater that only implements first-layer QEC. The term "first-level" is used synonymously with "first-layer" herein.

The terms "second-layer correcting" and "second-layer QEC" refer to QEC that is applied to a block of physical qubits according to the second-layer code. With second-layer QEC, one or more second-layer stabilizer measurements are performed with the block to extract a second-layer syndrome. For example, when the second-layer code is discrete-variable, each stabilizer measurement may result in a single classical bit of syndrome information. The second-layer syndrome may be a single-bit syndrome for the case when only one second-layer stabilizer is measured, or a multi-bit syndrome when more than one second-layer stabilizer is measured. In any case, the second-layer syndrome may indicate that the second-layer qubit has an error. This error, referred to herein as a "second-layer physical error", may be any type of error that is correctable by the second-layer code. By contrast, the term "second-layer logical error" refers to any type of error that cannot be corrected by the second-layer code.

Second-layer physical errors are due the cooperativeness of the physical qubits (as opposed to individual errors on the first layer) and may arise from one or more first-layer logical errors in the first-layer logical qubits. The second-layer QEC then corrects the second-layer physical error by identifying which of the physical qubits are the most likely to have a first-layer logical error, and then transform each of these identified physical qubits to undo its first-layer logical error. The term "second-layer quantum repeater" refers to a quantum repeater that implements second-layer QEC. A second-layer quantum repeater may additionally implement first-layer QEC. The term "second-level" is used synonymously with "second-layer" herein.

When a second-layer syndrome indicates a second-layer physical error, the first-layer syndromes previously extracted for these physical qubits can be used to probabilistically determine which are the most likely to have first-layer logical errors. One advantage of this approach is that the most likely physical qubits can be uniquely and unambiguously identified with fewer second-layer stabilizer measurements than would otherwise be necessary, thereby saving quantum resources and minimizing the coupling of noise into the physical qubits introduced by stabilizer measurements. It also allows for fewer physical qubits within each encoding block without reducing the number of errors the second-layer code can correct.

One aspect of the present embodiments is the realization that first-layer syndromes used for second-layer QEC may come from other nodes of a quantum communication network. These first-layer syndromes may be classically transmitted to a second-layer quantum repeater that then uses these syndromes for second-layer QEC. This realization gives rise to new quantum network architectures in which a second-layer quantum repeater is connected to the end of a linear chain of n first-layer quantum repeaters, where each first-layer quantum repeater sends qubits over a quantum communication channel to a next first-layer quantum repeater in the linear chain, and where each first-layer quantum repeater classically transmits its first-layer syndromes to the second-layer quantum repeater at the end of the chain. Advantageously, this architecture uses fewer resources than a corresponding linear chain of n+1 second-layer quantum repeaters since first-layer QEC operates on physical qubits of a block individually while second-layer QEC collectively operates on multiple physical qubits of the block collectively. The present embodiments may be described as "one-way" quantum repeaters, "one-way" quantum networks, and the like, since the quantum information (i.e., the qubits) and the classical information (i.e., the first-layer syndromes) are transmitted in the same direction, from sender to receiver.

In some embodiments, each physical qubit is a photonic state (e.g., coherent state, squeezed state, cat state, etc.). Advantageously, photonic states can be transmitted along conventional optical fiber already used for telecommunications, and therefore can be used to realize the quantum architectures described herein with transmission ranges of hundreds of kilometers, or more. However, since photonic states are destroyed upon measurement, syndromes (both first-layer and second-layer) cannot be obtained via direct measurement of the photonic states. Instead, the photonic states are coupled (e.g., via optical elements) to photonic ancilla qubits that are instead measured and destroyed. However, the present embodiments may be alternatively implemented with other types of bosonic modes, such as microwave photons and phonons. The present embodiments may be alternatively implemented with other types of physical qubits, including those that (unlike photonic states) may not be destroyed upon measurement and may be directly measured to extract syndromes (e.g., superconducting circuits, trapped ions, nuclei, electrons, etc.). Where the quantum information carriers are not bosonic modes, the first layer of encoding should be compatible with the quantum information carriers (e.g., quantum d-level encoding for d-level quantum systems).

Another aspect of the present embodiments is the realization that QEC can be used to reduce noise added by quantum amplification. To extend the transmission range of a quantum communication network, quantum information can be amplified by quantum repeaters. However, each stage of amplification adds quantum noise that degrades signal-to-noise ratio. After several quantum repeaters, the quantum noise dominates, rendering the logical qubits useless. In some of the present embodiments, a first-layer quantum repeater amplifies photonic GKP qubits (e.g., via phase-insensitive amplification). First-layer QEC is then applied to the amplified qubits to reduce the quantum noise added by the amplification. If the gain of the quantum amplification is selected to counteract the transmissivity of the subsequent quantum communication channel (e.g., an optical fiber), then the combination of amplification and subsequent transmission is equivalent to a Gaussian random displacement channel whose errors can be corrected by first-layer QEC.

Applications of the present embodiments include quantum communication, quantum cryptography (e.g., quantum key distribution), quantum information processing, quantum coding, and quantum computing.

BRIEF DESCRIPTION OF THE DRAWINGS

FIG. 18 is a schematic diagram of time scheduling of the operations performed in the GKP and [[4,1,2]] code multi-qubit repeater, in an embodiment.

FIG. 19 is a schematic diagram of time scheduling of the operations performed in the [[7,1,3]] code multi-qubit repeater, in an embodiment.

DETAILED DESCRIPTION

Figure 1:
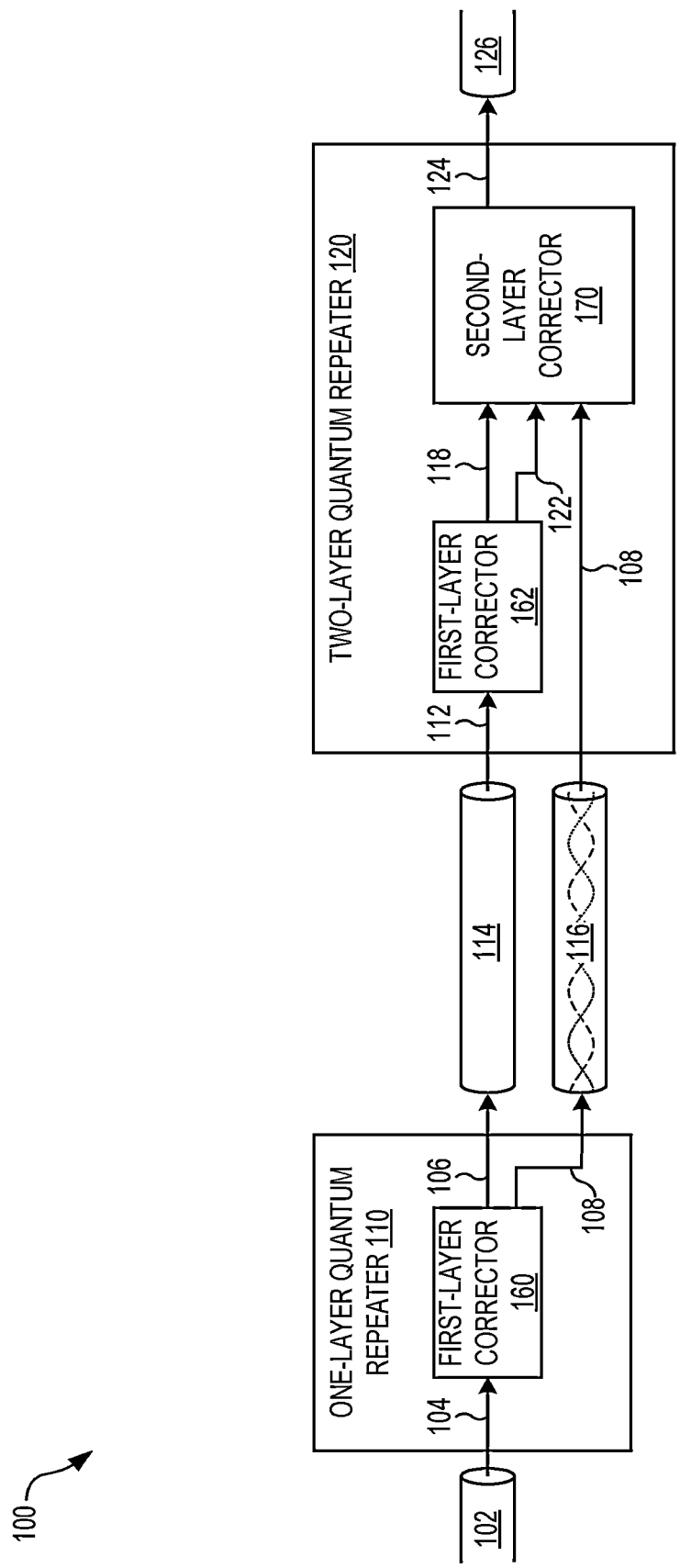
FIG. 1 is a functional diagram of a quantum network that uses two types of quantum repeaters to transmit quantum information across long distances, in embodiments.

FIG. 1 is a functional diagram of a quantum network 100 that uses two types of quantum repeaters to transmit quantum information across long distances (e.g., hundreds of kilometers, or more) with less loss and fewer operational errors than other types of quantum networks. Each quantum repeater implements quantum error correction (QEC) to fix one or more errors that may have occurred during transmission. Such errors may also have occurred due to imperfect quantum error correction that occurred previously (e.g., at a previous quantum repeater in the quantum network 100), transmission along a lossy channel, or noise added upon amplification. The errors may include a single-qubit bit-flip (i.e., a Pauli X-type error), a single-qubit phase-flip (i.e., a Pauli Z-type error), combinations thereof, and/or other types of errors.

In the example of FIG. 1, the quantum network 100 has two repeater stations. A first-layer quantum repeater 110 serves as a first repeater station while a second-layer quantum repeater 120 serves as a second repeater station. The first-layer quantum repeater 110 receives physical qubits 104 from an input quantum communication channel 102 that is designed to transmit the physical qubits 104. For example, when the physical qubits 104 are photonic signals, then the quantum communication channel 102 may be an optical fiber. However, the present embodiments can be alternatively implemented with another one or more other types of physical qubit (e.g., superconducting circuits, ions, neutral atoms, atomic nuclei, electrons, etc.). For some types of qubit, the quantum communication channel 102 does not transmit physical qubits 104, but rather couples quantum information between stationary physical qubits at both ends of the quantum communication channel 102. For example, when the physical qubits 104 are physically separated superconducting circuits, the quantum communication channel 102 may be a superconducting wire that couples the two superconducting circuits to each other.

A block of the physical qubits 104 collectively encode, or "block encode" a second-layer logical qubit according to a second-layer code concatenated with a first-layer code. Each of the physical qubits 104 individually encodes a first-layer logical qubit according to the first-layer code. In the following description, the first-layer code is a continuous-variable bosonic code, such as a Gottesman-Kitaev-Preskill (GKP) code, and the second-layer quantum code is a discrete-variable code, such as a Calderbank-Shor-Steane (CSS) code. However, each of the first-layer and second-layer codes may be another type of QEC code without departing from the scope hereof.

The first-layer quantum repeater 110 has a first-layer corrector 160 that implements first-layer QEC to each of the physical qubits 104 it receives. In the example of FIG. 1, where the first-layer code is the continuous-variable bosonic code, the first-layer corrector 160 operates on each of the qubits 104 individually. More specifically, for each qubit 104, the first-layer corrector 160 performs a stabilizer measurement to extract a corresponding one of a plurality of first-layer syndromes 108. Each first-layer syndrome 108 is a continuous value (e.g., a real number), and is therefore classical information (i.e., not quantum information). For example, if each qubit 104 encodes a GKP qubit, then each first-layer syndrome 108 is a real number indicating how much the qubit 104 is shifted in the x or p quadrature relative to an error-free GKP qubit (modulo $\sqrt{\pi}$). The first-layer corrector 160 uses each first-layer syndrome 108 to correct the corresponding qubit 104, e.g., by applying a quantum gate that transforms the corresponding qubit 104 to undo a first-layer physical error indicated by the first-layer syndrome 108.

The first-layer corrector 160 transforms each physical qubit 104 into a corresponding corrected qubit 106 that is transmitted over an output quantum communication channel 114 to the second-layer quantum repeater 120. The first-layer corrector 160 also transmits the first-layer syndromes 108 to the second-layer quantum repeater 120 via a classical communication channel 116. The classical communication channel 116 may form part of a wireless network (e.g., Wi-Fi, 4G, 5G, etc.), a wired network (e.g., Ethernet), a fiber-optic network, a free-space optical or infrared link, or another type of network that transmits data classically. The first-layer quantum repeater 110 may simultaneously process all qubits 104 forming one encoded block, in which case the first-layer quantum repeater 110 may simultaneously output all of the corresponding corrected qubits 106 and all of the corresponding first-layer syndromes 108. For example, when the qubits 104, 106 are photonic signals, the quantum communication channel 114 may be a bundle of n optical fibers, where n is the number of qubits 104, 106 forming a block. Alternatively, the first-layer quantum repeater 110 may process and output each qubit 106 sequentially (i.e., one at a time). In this case, each first-layer syndrome 108 may be labeled with an identifier that indicates which of the qubits 106 it corresponds to. Alternatively, the first-layer syndromes 108 may be transmitted in an order corresponding to that of the qubits 106 in the block so that each first-layer syndrome 108 can be properly matched to its qubit 106.

The second-layer quantum repeater 120 receives the corrected qubits 106 as received qubits 112, which may be different than the corrected qubits 106 due to loss and errors occurring during transmission through the quantum communication channel 114. The second-layer quantum repeater 120 includes a first-layer corrector 162 that is similar to the first-layer corrector 160. More specifically, the first-layer corrector 162 implements first-layer QEC on each of the received qubits 112 to create a corresponding first-layer-corrected qubit 118. As part of the first-layer QEC, the first-layer corrector 162 performs a stabilizer measurement to extract a first-layer syndrome 122 for each of the received qubits 112. Similar to the first-layer syndromes 108, each first-layer syndrome 122 is a continuous value represented as classical information.

The second-layer quantum repeater 120 also includes a second-layer corrector 170 that receives the first-layer-corrected qubits 118 and first-layer syndromes 122 from the first-layer corrector 162, and the first-layer syndromes 108 from the first-layer corrector 160 via the classical communication channel 116. The second-layer corrector 170 implements second-layer QEC by performing one or more second-layer stabilizer measurements with the first-layer-corrected qubits 118 to extract a second-layer syndrome.

Since the second-layer corrector 170 operates on several of the first-layer-corrected qubits 118, a single-bit second-layer syndrome may not indicate which of the physical qubits 118 have first-layer logical errors consistent with the second-layer syndrome. More specifically, several combinations of the qubits 118, when having first-layer logical errors, could generate the second-layer syndrome. To resolve this discrepancy, additional second-layer stabilizer measurements may be performed to better identify exactly which of the qubits 118 have errors. Multiple second-layer stabilizer measurements results in a multiple-bit second-layer syndrome. However, each additional second-layer stabilizer measurement adds noise to the qubits 118 that may generate additional errors. Therefore, it may be best to minimize the number of such second-layer stabilizer measurements.

The second-layer corrector 170 uses the first-layer syndromes 108 and 122 to probabilistically identify which of the qubits 118 are the most likely to have first-layer logical errors, and therefore how to correct these identified qubits 118. Advantageously, the use of the first-layer syndromes 108 and 122 in second-layer QEC minimizes both the number of second-layer syndromes (i.e., the number of second-layer stabilizer measurements) and the number of physical qubits needed for each encoding block without reducing the number of correctable errors of the second-layer code. The second-layer corrector 170 parses through all subsets of the qubits 118 in the block, keeping only those consistent with the second-layer syndrome. A subset is consistent with the second-layer syndrome if each qubit 118 in the subset, when having a first-layer logical error, would generate the second-layer syndrome. Each subset is referred to as a "candidate".

For example, consider four qubits that are labeled by i=1, 2, 3, 4 and measured with the stabilizer $Z_1 Z_2 Z_3 Z_4$ to obtain a syndrome, where each $Z_i$ is a Pauli Z-type operator that acts on the $i^{th}$ qubit. The syndrome may have a value of −1 to indicate that among the four qubits there is an odd number of bit-flip errors. Therefore, each subset that consists of only two of the four qubits is excluded from being a candidate, along with the subset consisting of all four of the qubits. The null subset is also excluded as it is also inconsistent with the syndrome (i.e., at least one of the four qubits must have an error to obtain the syndrome). Thus, the candidates are $\{1\}$, $\{2\}$, $\{3\}$, $\{4\}$, $\{1, 2, 3\}$, $\{1, 2, 4\}$, $\{1, 3, 4\}$, and $\{2, 3, 4\}$.

In some embodiments, only those subsets having less than a fixed number of qubits (e.g., two qubits) are kept as candidates. This limits the number of individual qubit errors represented by each candidate to be less than the fixed number. Such limiting ensures that the errors represented by each candidate are consistent with the discrete-variable code. For example, consider a [[7, 1, 3]] Steane code, which has a code distance of three and therefore can only detect one-qubit and two-qubit errors. In this case, each candidate will have only one or two qubits. In the above example of the stabilizer $Z_1 Z_2 Z_3 Z_4$, selecting the fixed number to be two qubits leaves $\{1\}$, $\{2\}$, $\{3\}$, and $\{4\}$ as the candidates.

The second-layer corrector 170 then calculates, for each candidate, a probability that (i) all of the qubits 118 in the candidate have a first-layer logical error and (ii) all of the qubits 118 of the block that are not in the candidate do not have a first-layer logical error. In one embodiment, each candidate's probability is obtained by combining (i) the probabilities that each individual qubit 118 in the candidate has a first-layer logical error, and (ii) the probabilities that each qubit 118 not in the candidate does not have a first-layer logical error. The probability for each individual qubit can be obtained from its first-layer syndromes 108 and 122. Described below are more details about how each first-layer syndrome can be used to calculate a probability that the corresponding qubit was improperly corrected based on that first-layer syndrome. The second-layer corrector 170 may then select the candidate with the highest probability, and correct the one or more qubits 118 in the selected candidate. After second-layer correcting, the second-layer quantum repeater 120 may then output second-layer-corrected qubits 124 into a quantum communication channel 126. Alternatively, the second-layer quantum repeater 120 may locally transmit the second-layer-corrected qubits 124 to another type of quantum computing device.

Figure 2:
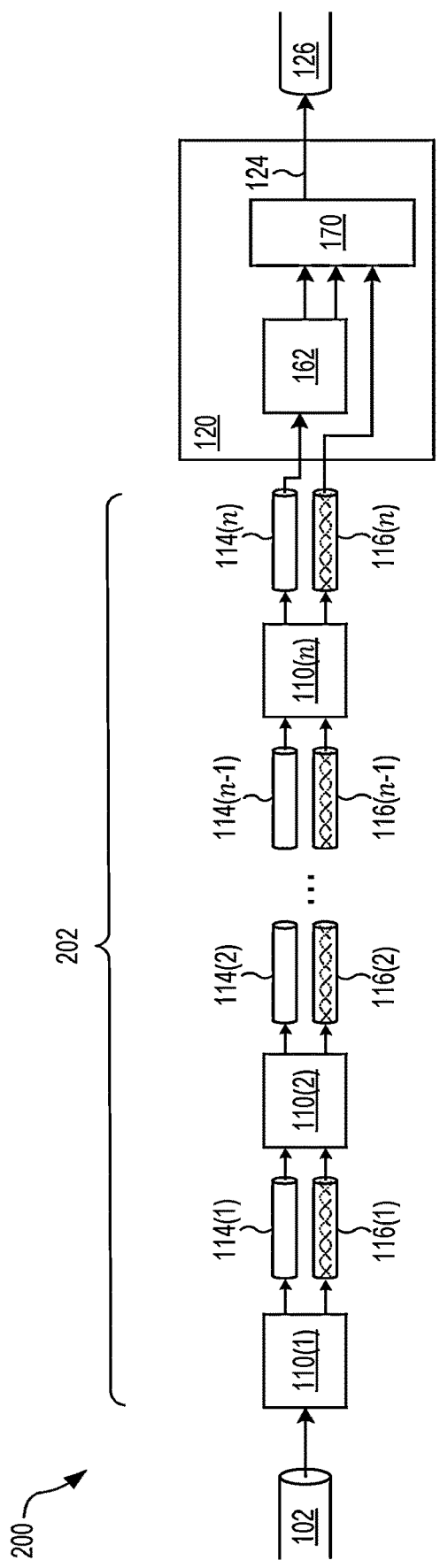
FIG. 2 is a functional diagram of a quantum network that is similar to the quantum network of FIG. 1, except that a sequence of n first-layer quantum link an input quantum communication channel with a second-layer quantum repeater, in embodiments.

FIG. 2 is a functional diagram of a quantum network 200 that is similar to the quantum network 100 of FIG. 1, except that a sequence 202 of n first-layer quantum repeaters 110(1), 110(2), ..., 110(n) link the input quantum communication channel 102 with the second-layer quantum repeater 120. Each first-layer quantum repeater 110(i) (where i=1 to n−1) outputs first-layer corrected qubits to a next first-layer quantum repeater 110(i+1) of the sequence 202 via a corresponding quantum communication channel 114(i). The second-layer quantum repeater 120 receives qubits from a last first-layer quantum repeater 110(n) of the sequence 202 via a last quantum communication channel 114(n). Each first-layer quantum repeater 110(i) (where i=1 to n−1) is also referred to herein as an intrasequence quantum repeater. Similarly, each quantum communication channel 114(i) is also referred to herein as an intrasequence quantum communication channel.

Each first-layer quantum repeater 110(i) also outputs first-layer syndromes to the next first-layer quantum repeater 110(i+1) via a corresponding classical communication channel 116(i). Each first-layer quantum repeater 110(i) combines its first-layer syndromes to those received from the previous first-layer quantum repeater 110(i−1), and outputs the combined set of first-layer syndromes to the next first-layer quantum repeater 110(i+1). The second-layer quantum repeater 120 receives, via a last classical communication channel 116(n), all of the first-layer syndromes outputted by the n first-layer quantum repeaters 110, and uses some or all of these first-layer syndromes to determine individual probabilities that any one qubit received therein has a first-layer logical error, and thus the probability for each candidate.

Figure 3:
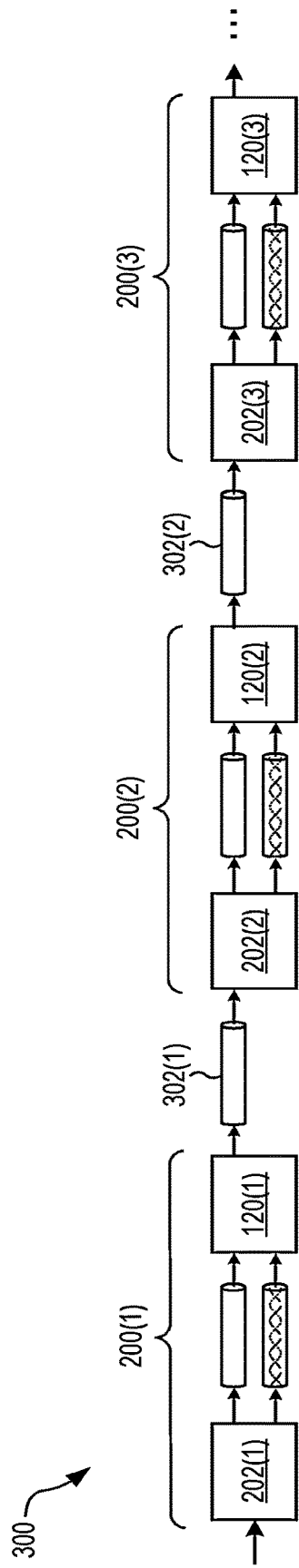
FIG. 3 shows a long-haul quantum network that is created by connecting several of the quantum network of FIG. 2 in series, in an embodiment.

FIG. 3 shows a long-haul quantum network 300 that is created by connecting several of the quantum networks 200 in series. The long-haul quantum network 300 thus alternates between sequences 202 of first-layer quantum repeaters 110 and second-layer quantum repeaters 120. The output of each second-layer quantum repeater 120(i) is connected to an input of the subsequent sequence 202(i+1) by an intersequence quantum communication channel 302(i). The number of one or more first-layer quantum repeaters 110 within each sequence 202 may be the same or different than the number of one or more first-layer quantum repeaters 110 in any of the other sequences 202. While the example of FIG. 3 shows the long-haul quantum network 300 with three of the quantum networks 200(1), 200(2), and 200(3) connected in series (i.e., three sequences 202(1), 202(2), and 202(3) followed by three respective second-layer quantum repeaters 120(1), 120(2), and 120(3)), it should be appreciated that the long-haul quantum network 300 may have any other number of the quantum networks 200 connected in series.

In the examples of FIGS. 2 and 3, where each sequence 202 contains more than one first-layer quantum repeater 110, each first-layer quantum repeater 110 may alternatively transmit the first-layer syndromes that it extracts directly to the second-layer quantum repeater 120, as opposed to sending the first-layer syndromes directly to a subsequent first-layer quantum repeater 110. In this case, each classical communication channel 116(i) connects directly to the second-layer quantum repeater 120, bypassing all subsequent first-layer quantum repeaters 110 in the sequence 202.

In some embodiments of the quantum networks 100, 200, and 300, one or more of the second-layer quantum repeaters 120 exclude the first-layer corrector 162, and therefore only implement second-layer QEC. Such embodiments may be used when there is a low probability of errors occurring while qubits are transmitted to the second-layer quantum repeater 120 (e.g., via the quantum communication channel 114(n)). However, when this probability is large enough to warrant first-layer QEC, the first-layer corrector 162 may be included in the second-layer quantum repeater 120 to beneficially provide both layers of QEC within one device.

Figure 4:
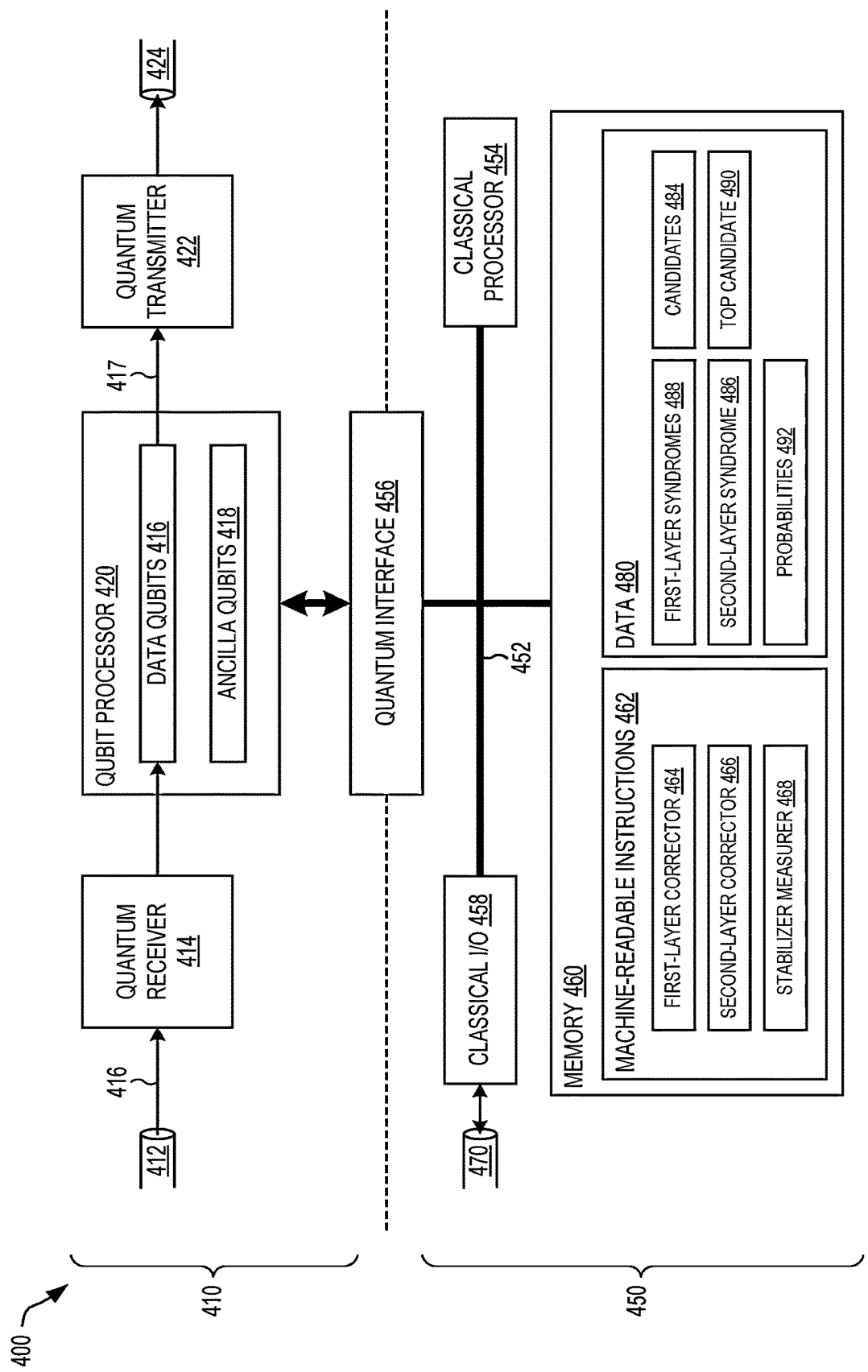
FIG. 4 is a functional diagram of a second-layer quantum repeater that implements the present method embodiments.

FIG. 4 is a functional diagram of a second-layer quantum repeater 400 that implements the present method embodiments. The second-layer quantum repeater 400 may be used for any of the second-layer quantum repeaters 120 described above and shown in FIGS. 1, 2, and 3. The quantum repeater 400 includes a quantum computing device 410 and a classical computing device 450. The quantum computing device 410 receives data qubits 416 from an input quantum communication channel 412, processes the data qubits 416 into corrected qubits 417 with a qubit processor 420, and transmits the corrected qubits 417 into an output quantum communication channel 424. The qubit processor 420 may also process one or more ancilla qubits 418. The data qubits 416, corrected qubits 417, and ancilla qubits 418 are physical qubits.

In some embodiments, the quantum computing device 410 includes one or both of a quantum receiver 414 and a quantum transmitter 422. The quantum receiver 414 receives and preprocesses the data qubits 416 prior to processing by the qubit processor 420. For example, the quantum receiver 414 may include an amplifier that amplifies the data qubits 416 to compensate for loss in the input quantum communication channel 412. The amplifier may implement phase-insensitive amplification. Additionally or alternatively, the quantum receiver 414 may convert the data qubits 416 from one medium to another (e.g., from photonic qubits to matter qubits). The quantum receiver 414 may preprocess the data qubits 416 in additional ways without departing from the scope hereof. Similarly, the quantum computing device 410 may include a quantum transmitter 422 that postprocesses the corrected qubits 417 prior to transmission via the output quantum communication channel 424. For example, the quantum transmitter 422 may include an amplifier for amplifying the corrected qubits 417 (e.g., to compensate for loss in the output quantum communication channel 424). Additionally or alternatively, the quantum transmitter 422 may convert the corrected qubits 417 from one medium to another (e.g., from matter qubits to photonic qubits). The quantum transmitter 422 may postprocess the corrected qubits 417 in additional ways without departing from the scope hereof. Although not shown in FIG. 4, the quantum receiver 414 and quantum transmitter 422 may electronically communicate with the classical computing device 450 via the quantum interface 456.

Each of the data qubits 416 individually encodes a first-layer logical qubit according to a first-layer code. The plurality of data qubits 416 collectively encode (or block-encode) a second-layer logical qubit according to a second-layer code that is concatenated with the first-layer code, as described above. The first-layer code may be a bosonic code, such as a GKP code. However, the first-layer code may be another type of QEC code (e.g., a discrete variable code) without departing from the scope hereof. The second-layer code may be a discrete-variable code. However, the second-layer code may be another type of QEC code (e.g., continuous-variable bosonic code) without departing from the scope hereof.

The quantum repeater 400 also includes a quantum interface 456 through which the classical computing device 450 communicates with the quantum computing device 410. Specifically, the qubit processor 420 includes instruments (e.g., frequency synthesizers, current sources, lasers, timing circuits, etc.) that interface with the qubits 416 and 418 to implement quantum circuits, and these instruments may be controlled by the classical computing device 450 via the quantum interface 456. The qubit processor 420 may also include one or more detectors that measure the qubits 416 and 418 to obtain classical data that is passed to the classical computing device 450, via the quantum interface 456, for processing and storage. When the data qubits 416 are photonic states that would be destroyed if measured, only ancilla qubits 418 may be measured. The ancilla qubits 418 may also be used to assist with stabilizer measurements when it is difficult to collectively measure the data qubits 416 without collapsing their wavefunction.

The classical computing device 450 also includes a classical processor 454 and memory 460 that communicate with each other over a system bus 452. The classical computing device 450 receives first-layer syndromes from one or more external first-layer quantum repeaters (e.g., the first-layer quantum repeater 110 of FIG. 1). For example, the classical computing device 450 may include a classical I/O block 458 that is connected to both a classical communication channel 470 and the system bus 452. The classical I/O block 458 may implement a wired network interface (e.g., Ethernet, Infiniband, Fiber Channel, etc.), wireless network interface (e.g., WiFi, Bluetooth, BLE, etc.), cellular network interface (e.g., 4G, 5G, LTE), optical network interface (e.g., SONET, SDH, IrDA, etc.), multi-media card interface (e.g., SD card, Compact Flash, etc.), or another type of communication port through which the classical computing device 450 can receive first-layer syndromes from the classical communication channel 470.

The classical processor 454 may be any type of circuit or integrated circuit capable of performing logic, control, and input/output operations. For example, the classical processor 454 may include one or more of a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC). The classical processor 454 may also include a memory controller, bus controller, and other components that manage data flow between the classical processor 454, memory 460, classical I/O block 458, and quantum interface 456.

The memory 460 stores machine-readable instructions 462 that, when executed by the classical processor 454, control the quantum repeater 400 to implement the functionality and methods described herein. The memory 460 also stores data 480 used by the classical processor 454 when executing the machine-readable instructions 462. In the example of FIG. 4, the data 480 stores first-layer syndromes 488 received from the classical communication channel 470. (e.g., the first-layer syndromes 108 in FIG. 1), a second-layer syndrome 486 measured with the data qubits 416, candidates 484, probabilities 492, and a top candidate 490 having a largest of the probabilities 492. The memory 460 may store additional data 480 than shown in FIG. 4.

In the example of FIG. 4, the machine-readable instructions 462 include a second-layer corrector 466 that implements the functionality of the second-layer corrector 170, as described above. The second-layer corrector 466 may call a stabilizer measurer 468 that, when executed by the classical processor 454, controls the qubit processor 420 to perform a second-layer stabilizer measurement with the data qubits 416 to extract the second-layer syndrome 486. The memory 460 may store additional machine-readable instructions 462 than shown in FIG. 4. In some embodiments, the machine-readable instructions 462 include a first-layer corrector 464 that implements the functionality of the first-layer corrector 162, as described above and shown in FIGS. 1 and 2. When included, the first-layer corrector 464 may controls the qubit processor 420 to perform a first-layer stabilizer measurement to extract a first-layer syndrome for each of the data qubits 416. Each of the extracted first-layer syndromes may then be stored in the memory 460 with the first-layer syndromes 488.

Figure 15:
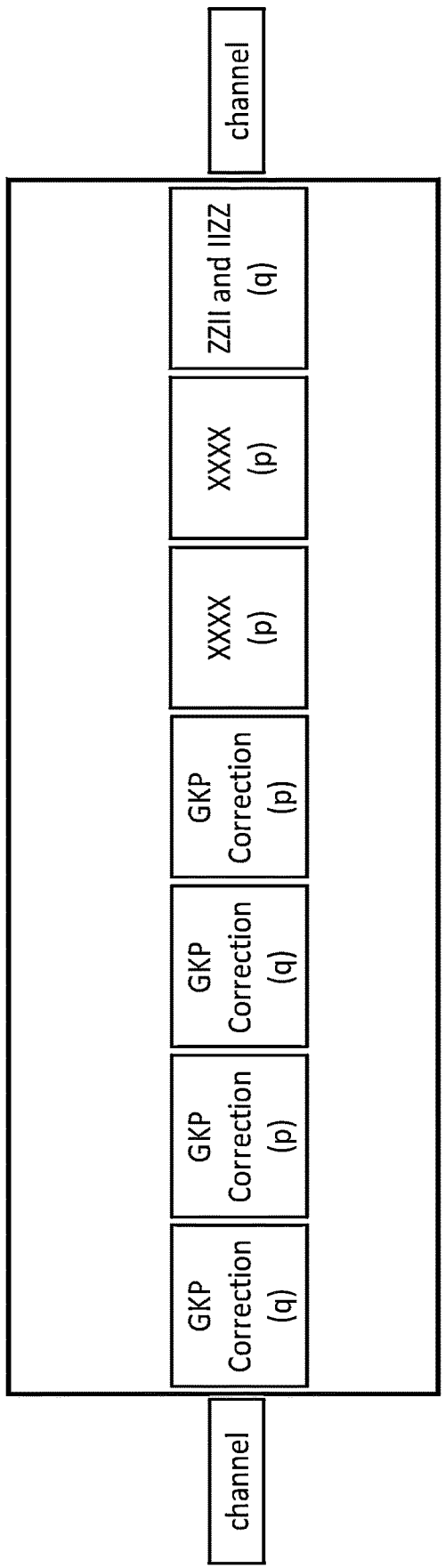
FIG. 15 is a schematic diagram of the operations performed inside a multi-qubit repeater based on the [[4,1,2]] code, in an embodiment.
Figure 16:
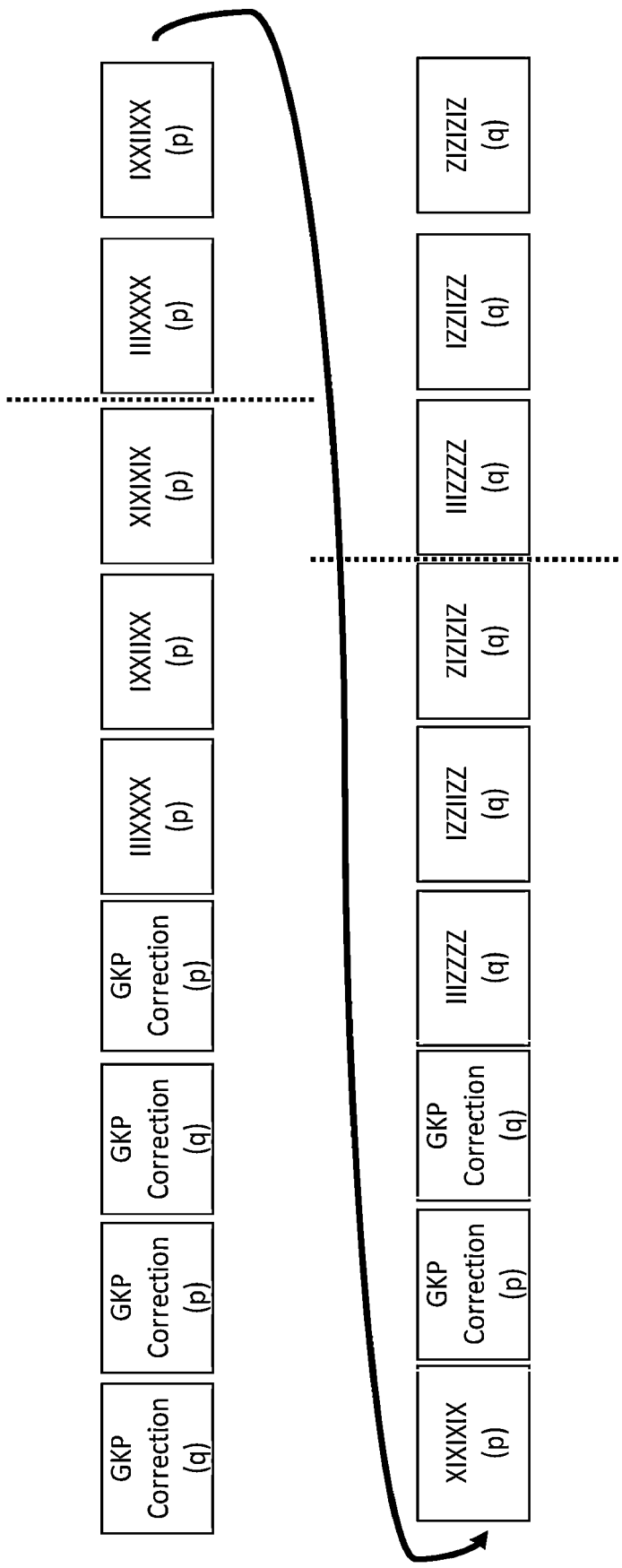
FIG. 16 is a schematic diagram of the operations performed inside a multi-qubit repeater based on the [[7,1,3]] code, in an embodiment.
Figure 17:
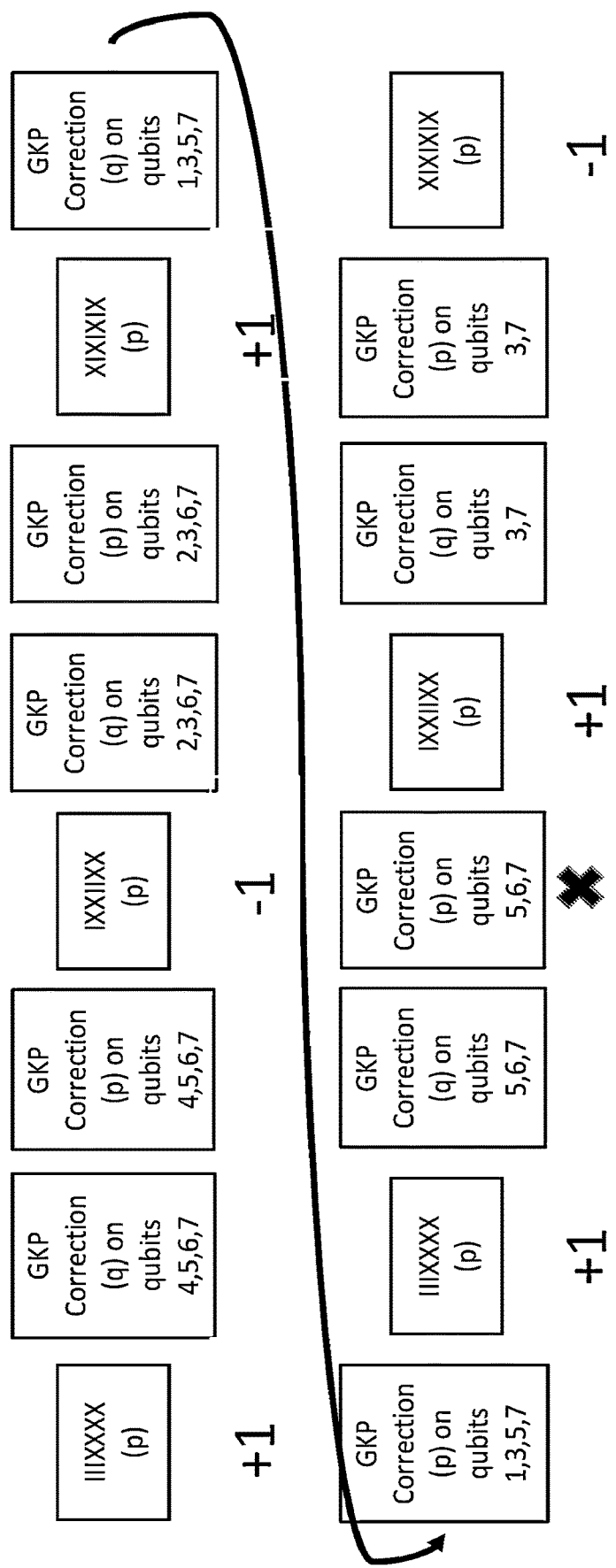
FIG. 17 shows an example of multi-qubit stabilizer outcomes for X-stabilizer measurements inside the multi-qubit repeater based on the [[7,1,3]] code.

In some embodiments, the second-layer quantum repeater 400 uses both the first-layer corrector 464 and the second-layer corrector 466 to implement a more complicated sequence of first-layer and second-layer QEC operations. FIGS. 15-17 give examples of such sequences for the case where the bosonic code is a GKP code.

In some embodiments, the second-layer quantum repeater 400 uses photonic states as the data qubits 416. In this case, the ancilla qubits 418 are used for stabilizer measurements without destroying the data qubits 416. In these embodiments, the quantum repeater 400 may additionally include a source of the ancilla qubits 418, and the qubit processor 420 may include an optical setup for processing the photonic states (i.e., both the data qubits 416 and ancilla qubits 418) to extract syndromes and correct the data qubits 416. For example, the optical setup may apply a SUM gate from the data qubits 416 onto one of the ancilla qubits 418 (see Eqn. S2 below).

In some embodiments, a first-layer quantum repeater is similar to the second-layer quantum repeater 400 except that it only implements first-layer QEC with the first-layer corrector 464, and therefore operates without the second-layer corrector 466, the second-layer syndrome 486, the probabilities 492, the candidates 484, and the top candidate 490. In these embodiments, the first-layer quantum repeater transmits the first-layer syndromes 488 measured therein to an external second-layer quantum repeater (e.g., the second-layer quantum repeater 400) via the classical communication channel 470. Alternatively, the first-layer quantum repeater may transmit the first-layer syndromes 488 to another first-layer quantum repeater that combines these first-layer syndromes 488 with its own. This other first-layer quantum repeater may then transmit all of the first-layer syndromes to the external second-layer quantum repeater. The first-layer quantum repeater may also receive first-layer syndromes from other external first-layer quantum repeaters, such that it may be may be used to form the sequences 202 of FIGS. 2 and 3.

I. Introduction

Quantum cryptographic and quantum computing tasks offer qualitative advantages over their classical counterparts. However, in order to implement these tasks, it is essential to be able to transmit quantum information across long distances. There have been significant efforts in recent years in designing future large-scale quantum networks that could offer such a functionality by overcoming the exponential signal decay with distance in the optical fiber through the use of quantum repeaters. Multiple different types of quantum repeaters have been proposed, utilizing different techniques to overcome losses and operational errors of the devices.

The original repeater proposals utilize heralded entanglement generation between repeater stations. These elementary links can then be connected into end-to-end entanglement using Bell-measurements at the repeaters. The entanglement rate of these schemes is significantly limited by the communication time between repeaters, where the communication is needed to herald success of both elementary link generation and probabilistic entanglement distillation used for correcting operational errors. These limitations can be overcome using one-way quantum repeaters based on forward error correction. Such repeaters are not limited by two-way communication, as a stream of qubits, encoded in a loss-tolerant code, is sent over a multi-hop channel. A repeater station uses quantum decoding and re-encoding operations to near-deterministically correct errors (loss and operational) and forwards the encoded state to the next station. Most of the repeater schemes belonging to the above two categories need quantum memories, which could be substituted by all-photonic entangled states. However, there also exist one-way schemes which do not require any storage of quantum information and where all the operations performed inside the repeaters involve only optical elements. Yet, the use of a few matter qubits in such repeaters could enable for more efficient generation and error correction of the photonic encoded states.

The significant rate improvement of these error-correction-based schemes comes at the cost of large physical resource overhead. Specifically, in order to overcome losses over a 1000 km path, most one-way and all-photonic architectures would require the ability to generate, transfer, store and operate on hundreds or thousands of highly entangled qubits within each repeater.

Figure 5:
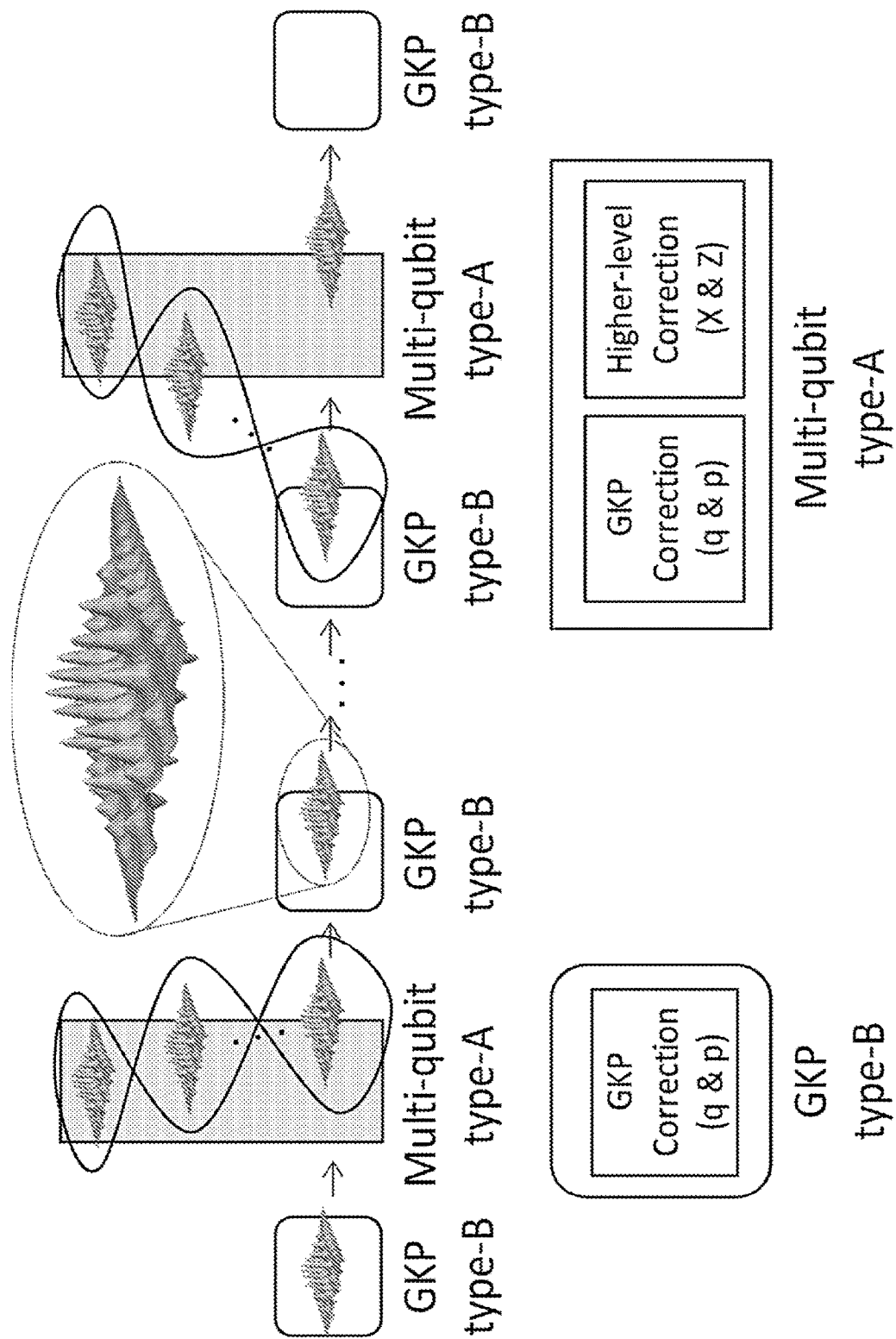
FIG. 5 illustrates the hybrid concatenated-coded repeater architecture, in embodiments.

So far, all existing one-way quantum repeaters only considered quantum error correction based on two-level or multi-level encoding to correct excitation loss errors, without taking advantage of the bosonic nature of the quantum channel. Here we propose a new type of quantum repeater architecture based on concatenated quantum error correction, with continuous-variable (CV) bosonic encoding at the lower level (inner code) and discrete-variable (DV) encoding at the higher level (outer code). The specific bosonic code that we consider here is the single-mode Gottesman-Kitaev-Preskill (GKP) code which has been demonstrated to perform well against photon loss errors given a suitable encoding strategy. We note that while implementation of GKP encodings is challenging, there have been experimental demonstrations of approximate GKP states in trapped ions and the superconducting microwave cavity. While various architectures for quantum computing based on GKP encodings have been proposed, no corresponding quantum communication protocol has yet been considered. Similarly as in the proposed quantum computing architectures with GKP code, we propose to concatenate the GKP code with a higher-level multi-qubit code to boost its performance. We show here that if sufficiently high-quality GKP states can be prepared and operated on, then long-distance quantum communication can be achieved by using only few qubits in the higher-level multi-qubit encoding. Moreover, our repeater architecture is also cost-efficient. This is because we find that in order to maintain high performance it is not necessary for all quantum repeaters to be able to perform error correction on both encoding levels. Specifically, it is sufficient for the more powerful, but at the same time costlier, repeaters correcting errors on both levels to be placed only sporadically, with the majority of repeaters correcting only the lower level errors, as shown in FIG. 5. This enables a significant reduction of the required resources as the repeaters correcting only the lower level errors need to operate only on single GKP data modes at a time.

II. Results

A. GKP Repeater Chain Architecture

In this section we describe a simple repeater architecture in which quantum information is encoded in the GKP code and the GKP repeaters placed along the channel are used to correct errors arising from the communication through a lossy channel. We will see that GKP encoding alone together with a specific considered decoding strategy is not sufficient to achieve long-distance quantum communication, which motivates the introduction of the concatenated-coded scheme, described in Section II.B. Firstly however, we provide some basic information about the fundamental principles behind the GKP error correction.

1. GKP-Qubit Error Correction

Similarly to quadrature amplitude modulation encoding used in classical communication, we may use the quantum GKP encoding to correct loss errors. The basic idea behind the GKP code is that while the exact value of two conjugate continuous observables $\hat{q}$ and $\hat{p}$ cannot be measured simultaneously, the two operators $$\hat{S}_q = \exp(i2\sqrt{\pi}\hat{q}), \hat{S}_p = \exp(-i2\sqrt{\pi}\hat{p}), \quad (1)$$

which are periodic functions of $\hat{q}$ and $\hat{p}$, commute with each other and therefore can be measured simultaneously. The GKP code thus encodes a qubit in a two-dimensional subspace of an infinite-dimensional oscillator space. This subspace is stabilized by these two operators and the GKP state can be visualized as an infinite, periodic grid structure in the (q,p) phase space. For the GKP code based on a square lattice, which we will consider here, the standard basis states are given as:

$$|0_{GKP}\rangle = \sum_{n \in \mathbb{Z}} |q = 2n\sqrt{\pi}\rangle, \quad (2)$$
$$|1_{GKP}\rangle = \sum_{n \in \mathbb{Z}} |q = (2n+1)\sqrt{\pi}\rangle.$$

Similarly the GKP X basis logical states are:

$$|+_{GKP}\rangle = \sum_{n \in \mathbb{Z}} |p = 2n\sqrt{\pi}\rangle, \quad (3)$$
$$|-_{GKP}\rangle = \sum_{n \in \mathbb{Z}} |p = (2n+1)\sqrt{\pi}\rangle.$$

We can see that the grid corresponding to the basis state $|0\rangle$ ($|+\rangle$) is shifted by $\sqrt{\pi}$ along the $\hat{q}$ ($\hat{p}$) quadrature with respect to $|1\rangle$ ($|-\rangle$). Hence, by measuring the two stabilizers, which amounts to measuring both $\hat{q}$ and $\hat{p}$ quadratures of the GKP state modulo $\sqrt{\pi}$, we can detect and correct any small shifts (of size smaller than $\sqrt{\pi}/2$) in both quadratures, in a way that does not reveal the encoded logical information.

The two GKP stabilizers can in fact be measured using additional GKP ancilla modes through a Steane error-correction process. Application of a two-mode operation between the GKP data mode and the GKP ancilla can transfer the information about the noise from the data qubit onto the ancilla in such a way that the logical information is not revealed. Hence measuring the ancilla and applying a feedback displacement based on the measurement outcome enables GKP quantum error correction. More detailed information about this procedure can be found below in Supplementary Note 1.

We note here that an ideal GKP state corresponds to a superposition of infinitely many infinitely squeezed states hence requiring infinite energy. Such states are unphysical and realistic GKP states have finite amount of squeezing, see Section IV.A. This means that the information obtained from the measurement on the GKP ancilla is effectively noisy and therefore the feedback displacement will not bring the data state exactly to the logical space but will leave some residual displacement reflecting the finite amount of squeezing of the GKP ancilla. Here we consider a specific strategy of rescaling the measured GKP syndrome by a real number $c \in (0,1]$ before applying the feedback displacement. The value of c depends on the relation between the channel noise and the amount of GKP squeezing and is chosen such that the variance of the residual displacement after the feedback correction can be minimized, see Supplementary Note 2 for details.

In practice, communication channels are corrupted by loss, not a shift in phase space. Nevertheless, it is known that the GKP code also works well against loss errors. This is because the sender can phase-insensitively amplify the GKP states (with a gain determined by the expected loss) such that the action of the effective channel results in random shift errors which the GKP code is designed to correct for. This strategy is described in more detail in Supplementary Note 3.

2. Repeater Model

In the considered architecture, quantum information encoded in the GKP qubits is sent through the repeater chain as follows. After Alice performs the encoding operation, she applies phase-insensitive amplification and sends the GKP qubit through the lossy channel to the first GKP repeater. The repeater performs GKP correction first in $\hat{q}$ and then in $\hat{p}$ quadrature. After that it again applies phase-insensitive amplification and sends the state to the next repeater. In this way the encoded qubit can effectively be transmitted to Bob. In our model we consider two sources of imperfections apart from loss in the communication channel. Firstly we assume a finite photon in- and out-coupling efficiency $\eta_0$ which quantifies the efficiency of transferring the photon from the fiber to the repeater and back into the fiber. Hence the total transmissivity of the lossy channel between two neighboring repeaters separated by the distance L is:

$$\eta = \eta_0 e^{-L/L_0}, \quad (4)$$

where $L_0$ is the attenuation length of the channel. Here we assume transmission at telecom frequency at which $L_0 = 22$ km. The second imperfection we consider is the finite amount of GKP squeezing. Under finite squeezing the GKP grid does not consist of delta functions but of Gaussian peaks with an overlaying envelope function such that the peaks in the Wigner function decay to zero height in the limit of large quadrature values. The standard deviation of these finitely squeezed Gaussian peaks is given by $\sigma_{GKP}$ and the amount of squeezing can also be quantified by comparing $\sigma_{GKP}$ to the standard deviation of a Gaussian peak of a coherent state given by $1/\sqrt{2}$. Hence squeezing expressed in dB can be defined as:

$$s = -10 \log_{10}(2\sigma_{GKP}^2). \quad (5)$$

In our analysis, similarly to, we consider a conservative error model which allows us to describe a finitely squeezed GKP qubit as an ideal GKP state subjected to a random displacement according to a probability distribution parameterized by $\sigma_{GKP}$, see Section IV.A for details. Since both finite GKP squeezing and the channel noise lead now to random displacement errors, we can reliably approximate the repeater performance by considering perfect error correction using infinitely squeezed ancillas, which however is now performed on the data qubits subjected to an effective communication channel. This effective channel now includes not only the noise coming from $\eta$ defined in Eqn. 4 but also from non-zero $\sigma_{GKP}$. That is we consider an approximation in which the noise from finite squeezing can be effectively incorporated into the channel and combined with the noise due to photon loss. This approximation enables us to construct a simple analytical model through which we can efficiently evaluate repeater performance, including optimization over repeater spacing. We validate this analytical model against a numerical Monte-Carlo simulation, see Supplementary Note 4 and Supplementary Note 5 for more information about the model.

3. Performance of the GKP Repeater Chain

We quantify the performance of our scheme by calculating the achievable secret-key rate in bits per optical mode r'. This is a fundamental information-theoretic quantity that plays a key role in the studies of quantum communication and the units of bits per mode are also often referred to as bits per channel use or bits per channel use per mode. We consider a six-state quantum key distribution (QKD) protocol supplemented with the two-way post-processing scheme called advantage distillation. This scheme enables Alice and Bob to filter out a large fraction of erroneous rounds thus significantly increasing the achievable key rate in the high-noise regime. Specifically, we consider the advantage distillation protocol of which for all noise regimes allows us to generate more key than with standard one-way post-processing. Moreover, since in the GKP error correction we independently correct errors in the $\hat{q}$ and $\hat{p}$ quadratures, the probability of a Y flip is quadratically suppressed. This is because a logical Y-error can only happen if there is both a logical X and Z error. This asymmetry leads to the fact that the quantum bit error rate (QBER) will be much larger in the Y basis than in the X and Z basis. Therefore we can make use of the result of where it is shown that if advantage distillation is used, we will obtain the highest secret-key rate by using the basis with the highest QBER for key generation. See Supplementary Note 8 for more details on the discussed QKD protocol and Supplementary Note 5 for details on evaluating QBER for the GKP repeater chain.

We list the results below in Table 1. Specifically, we list the achievable distances over which secret-key rate in bits per optical mode stays above r'=0.01. We choose this specific value as a threshold as it allows us for an easy comparison of our scheme with the PLOB bound, which corresponds to the two-way assisted capacity of the pure-loss channel. This quantity describes the ultimate limit of repeater-less quantum communication. For perfect devices and as a function of the communication distance $L_{tot}$ it is given by $K(L_{tot}) = -\log_2(1 - \exp(-L_{tot}/L_0))$. While it drops below $K(L_{tot}) = 0.01$ after $L_{tot} = 109$ km, it stays positive for all distances $L_{tot}$. However, the amount of key that can be generated through such direct transmission becomes negligible for large distances. On the other hand, the secret-key rate of our repeater schemes starts dropping rapidly to zero at certain distance $L_{tot}$ such that the distance at which its value is given by r'=0.01 is close to the distance at which it falls to zero. This is due to the fact that the effective channel modelling the transmission through our repeater schemes is the Pauli channel, see Section IV.C and Supplementary Note 8. These features can also be seen in FIG. 8 for our concatenated-coded schemes. Hence the threshold value of 0.01 provides a good reference that allows us to investigate the communication distances for which the amount of generated key is non-negligible.

TABLE 1

| | only GKP | | | | |
|---|---|---|---|---|---|
| | | coupling efficiency $h_0$ | | | |
| | | 0.93 | 0.95 | 0.97 | 0.99 |
| GKP squeezing $S_{GKP}$ | 0.05 (23.0 dB) | <100 | <100 | 869 | >10000 |
| | 0.07 (21.5 dB) | <100 | <100 | 303 | >10000 |
| | 0.09 (17.9 dB) | <100 | <100 | 107 | 2041 |

TABLE 1-continued only GKP

| | coupling efficiency $h_0$ | | | |
|---|---|---|---|---|
| | 0.93 | 0.95 | 0.97 | 0.99 |
| 0.11 (16.2 dB) | <100 | <100 | <100 | 322 |
| 0.13 (14.7 dB) | <100 | <100 | <100 | <100 |

For each set of parameters we optimize the repeater separation such that the generated secret-key rate can be maximized, with the restriction that the minimum repeater separation is 250 m. We find that for all the parameter configurations, for which the achievable distance is larger than 100 km, the optimal repeater spacing that maximizes secret-key rate at that achievable distance is always the minimum separation of 250 m. The main conclusion drawn from the obtained data is that in order to achieve communication over distances of 1000 km and larger, close to perfect photon coupling efficiency is needed with unrealistically high amount of GKP squeezing. This means that for the GKP encoding/decoding strategy based on phase-insensitive amplification, GKP code alone is not sufficient for achieving practical long-distance quantum communication. This motivates us to introduce the second level of encoding.

B. Repeater Architecture Based on Concatenated GKP and Discrete-Variable Codes

Random displacements with components along the q and p axes that are larger in magnitude than $\sqrt{\pi}/2$ are not correctable by the GKP code alone. Therefore we consider a second level of encoding, either with a [[4,1,2]] code which encodes one logical qubit in 4 modes (i.e., 4 GKP qubits) or with [[7,1,3]] Steane code, which encodes one logical qubit in 7 modes (i.e., 7 GKP qubits). This higher-level encoding enables us to correct logical GKP errors and hence effectively to correct displacements with magnitude larger than $\sqrt{\pi}/2$.

1. Concatenated-Coded Repeater Architecture

We consider a hybrid repeater architecture in a linear chain, with N type-A (outer code) repeater nodes and mN type-B (inner code) repeater nodes (where m is an integer we optimise) such that there are m type-B nodes (also referred to as GKP nodes) between consecutive type-A nodes (also referred to as multi-qubit nodes). Distance between consecutive repeater nodes (regardless of their type) is taken to be a constant we optimize. A type-A node waits to receive 4 (7) modes—of a 4-GKP-qubit-encoded (7-GKP-qubit-encoded) single logical qubit in a [[4,1,2]] code ([[7,1,3]] Steane code), corrupted by noise—performs a GKP error correction described in Section II.A.1 on all the modes followed by the outer-code error correction, and transmits in sequence the 4 (7) GKP modes of the 4-mode-entangled (7-mode-entangled) state to the next hop (a type-B node). A type-B node simply applies GKP error correction as in the GKP repeater chain to each received mode, and sends it to the next node (which could be type-A or B).

We note that in order to maximize repeater performance, repeater architecture utilizing only the more powerful type-A nodes would in most cases be sufficient. However, this would necessitate a dense placement of these multi-qubit nodes which require more quantum memory and processing, and are more resource expensive than type-B nodes. Therefore we will show that in order to optimize the performance-cost trade-off, it is beneficial to consider the hybrid architecture consisting of both types of nodes. We depict our repeater architecture in FIG. 5. Further details of our concatenated-coded repeater scheme are described in Supplementary Note 6 and Supplementary Note 7.

FIG. 5 illustrates the hybrid concatenated-coded repeater architecture. At the top of FIG. 5, the Wigner function of the single-mode imperfect GKP state is depicted in the enlarged inset. We propose to use two levels of encoding and on the second level, multiple single-mode GKP qubits are entangled together (marked with a ribbon) to encode a single logical qubit. The repeater architecture makes use of two types of repeaters. The first type are type-B repeaters which can correct small displacement errors on the single GKP qubits that are sequentially transmitted between those stations. A displacement larger than the critical value cannot be corrected by the type-B repeaters and results in a logical error at the GKP level after the GKP correction. Therefore, we sporadically introduce more powerful (and costly) type-A repeaters which store all the subsequently arriving GKP qubits from a given second-level encoded block. By jointly operating on all such qubits, the type-A repeaters can efficiently correct logical errors from the failed GKP corrections at the lower level. The bottom of FIG. 5 is a high-level depiction of the operations performed in each repeater type. Type-B repeater corrects small random displacement errors in both $\hat{q}$ and $\hat{p}$ quadratures by measuring the stabilizers of the GKP code. Type-A repeater additionally corrects higher-level X and Z errors corresponding to the logical errors on the GKP level. These errors are corrected by measuring the Z and X stabilizers of the outer code.

2. GKP Analog Information

The feature of our repeater scheme that enables us to significantly boost its performance with respect to other one-way repeater architectures based on error correction, is the use of analog continuous information from the GKP corrections at both type-B and type-A nodes in order to enhance the correcting capabilities of the outer code. Specifically, measuring the GKP syndrome amounts to measuring each of the quadratures modulo $\sqrt{\pi}$, such that the syndrome is a number from a continuous interval $[-\sqrt{\pi}/2, \sqrt{\pi}/2)$. If the measured value is close to the boundary of this interval, there is a higher probability that the correction back to the logical GKP space will result in a logical error. This observation can be made mathematically rigorous, that is for a given measured syndrome value an error likelihood during correction can be established. This additional syndrome information, when passed from the type-B GKP repeater nodes to the type-A (multi-qubit) repeater nodes, enables the latter to correct more errors that are otherwise not correctable by the [[4,1,2]] and [[7,1,3]] codes. Specifically, for Pauli errors the [[4,1,2]] outer code is only an error-detection code that cannot correct any errors while the [[7,1,3]] outer code can normally correct only single-qubit errors. However, by utilizing the continuous GKP syndrome information the [[4,1,2]] outer code can be transformed into an error-correction code which can correct most of single-qubit errors. We also find that with the analog information the [[7,1,3]] outer code can correct most of both single- and two-qubit errors. See Supplementary Notes 1, 6, and 7 for mathematical details on calculating error likelihood from the analog information for our schemes.

Figure 6:
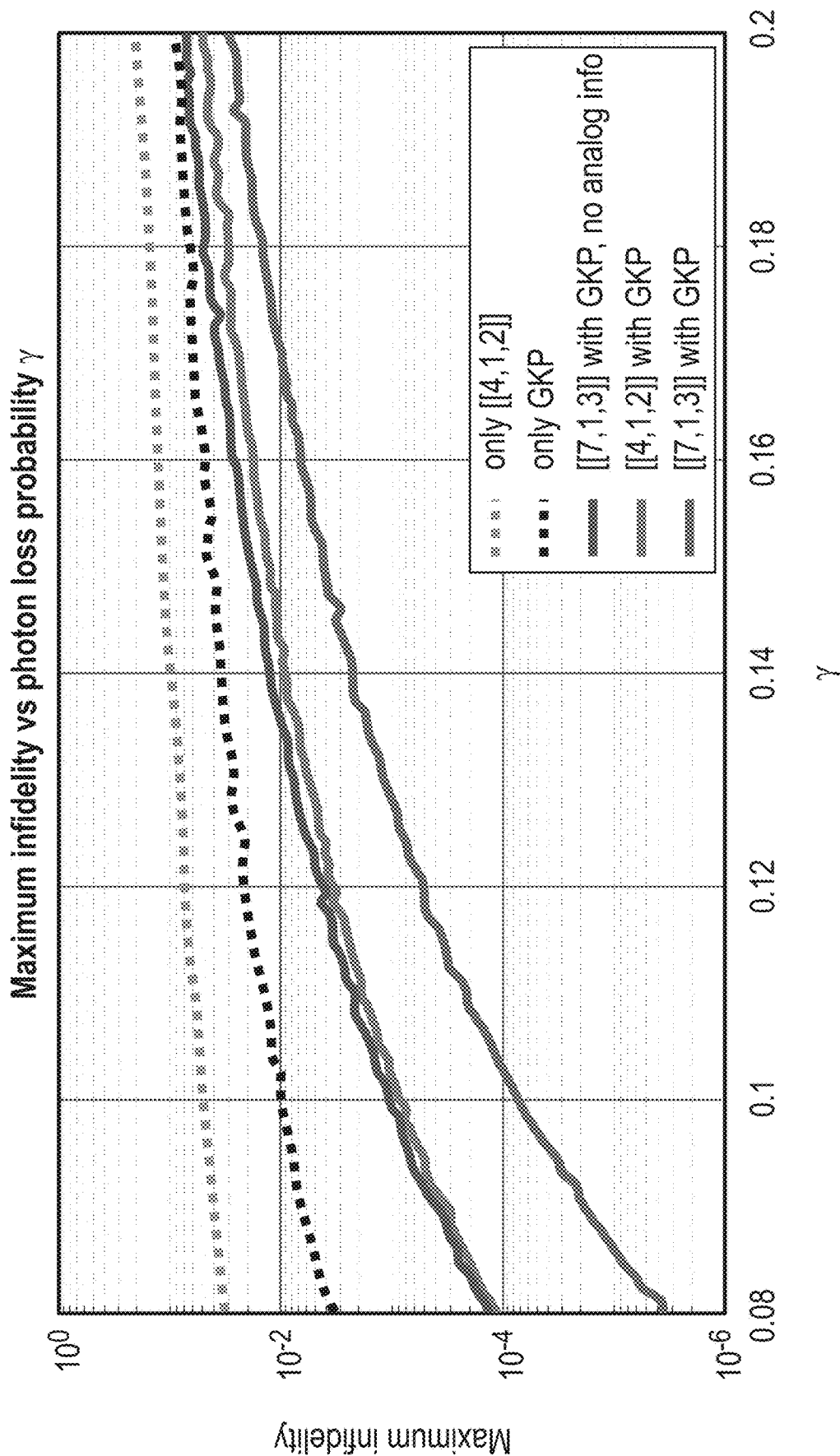
FIG. 6 is a plot of maximum infidelity (maximized over all input states) versus photon loss probability $\gamma$ for the different considered encoding schemes.

We illustrate the benefit of the analog GKP information in FIG. 6, where we consider a simple scenario in which Alice performs perfect encoding, applies phase-insensitive amplification to all the GKP qubits and then transmits the encoded state through the pure-loss channel with photon loss probability $\gamma=1-\eta$. Bob then firstly performs a round of perfect (i.e., using infinitely squeezed ancilla modes) GKP correction on all the GKP qubits followed by the perfect outer-code correction. We then plot the maximum infidelity versus the loss probability γ for the single-mode GKP encoding and the two-level-coded scheme. The maximum infidelity is given by one minus fidelity between the input state of Alice and the output state after transmission and correction of Bob. The specific input state is the state that minimizes the fidelity or equivalently maximizes the infidelity, see Supplementary Note 9 for more details. For the case when the [[7,1,3]] outer code is used we plot separately the scenarios in which we do and do not make use of the additional analog information from the GKP correction round. We see that making use of this information provides a significant performance boost for our two-level-coded scheme. We also see that the concatenated-coded schemes improve the performance with respect to just GKP encoding. Furthermore, we see that for low loss, if we use the [[7,1,3]] outer code but do not make use of the analog information, the performance becomes similar to that of the scheme based on the [[4,1,2]] outer code, as both architectures can then correct only single-qubit errors. For larger losses the scheme based on the [[4,1,2]] outer code performs even better, because less qubits are used resulting in a smaller probability of an uncorrectable two-qubit error after GKP correction. The fact that these two schemes achieve a similar performance further justifies the capability of the analog information to transform the error-detecting code into an error-correcting code.

Additionally we also compare the performance of our GKP-based schemes with a purely discrete-variable qubit scheme based on the [[4,1,2]] code. Specifically, it has been shown that while this code is only an error-detection code against Pauli errors, it can be used for approximate error correction against a qubit amplitude damping channel, which corresponds to the pure-loss channel restricted to the vacuum and single-photon subspace. We see in FIG. 6 that making use of the full infinite-dimensional space with the GKP-based encodings that convert the action of the pure-loss channel into a random displacement channel allows for better performance than using only a qubit space of four optical modes against the amplitude damping channel. We note that we consider this additional strategy based on the purely discrete-variable encoding only in FIG. 6. Therefore in the following sections whenever we refer to the schemes based on the [[4,1,2]] code and the [[7,1,3]] code, we always refer to the concatenated-coded schemes with the GKP encoding at the lower level.

For all plotted schemes in FIG. 6, apart from the "only [[4,1,2]]" scheme, it is the GKP error correction, followed by the second-level error correction for the concatenated-coded schemes. We assume correction using infinitely squeezed ancilla modes, so that after correction the state will be in the code space, either with errors corrected or with a logical error. Additionally, we plot the maximum infidelity of $5\gamma^2$ for the purely discrete-variable scheme based on the [[4,1,2]] code. The curves for all the schemes apart from the "only [[4,1,2]]" scenario have been obtained from the simulated data and the relative error on the maximum infidelity is around 7% for all the data points.

3. Performance of the Concatenated-Coded Repeater Architecture

We again assess the performance of our repeater scheme for the task of generating shared secret key using the six-state QKD protocol with advantage distillation. We note that the two considered outer codes also correct the X and Z errors independently, similarly to the GKP code. This means that the quadratic suppression of Y-errors also applies to the concatenated-coded scheme. Therefore we can continue to maximize the key by extracting it in Y basis. We note that Alice and Bob extract secret keys from the logical qubits. Hence, secret-key rate in bits per mode is calculated by dividing secret-key rates in bits per logical qubit, by 4 for the case of the [[4,1,2]] outer code and by 7 for the case of the [[7,1,3]] outer code. We again refer the reader to Supplementary Note 8 for the discussion of the considered QKD protocol.

We perform Monte-Carlo simulation for the evolution of errors in the $(\hat{q},\hat{p})$ quadratures in our repeater scheme. From the simulation we estimate the quantum bit error rate (QBER) and calculate the expected asymptotic secret-key rate. We run the simulation for different placements of the type-A and type-B repeater nodes. Specifically, we assume at least one type-A station per 10 km. We then consider denser configurations with more type-A stations and for each of these cases we vary m, the number of type-B stations placed between neighboring type-A stations. We consider all such configurations for which, similarly as in the case of the GKP repeater chain, the minimum separation between the neighboring stations is 250 m, that is the sum of the number of type-A and type-B stations per 10 km cannot exceed 40. We describe the details of the simulation in Section IV.C.

In the first step we consider only the repeater performance, that is we look for the repeater placement configuration that maximizes the achievable secret-key rate. We look for the achievable distances with the concatenated-coded schemes, for which the achievable secret-key rate in bits per mode is larger than r'=0.01. The results are presented below in Tables 2 and 3. We see that the achievable distances are much larger and can be attained with more relaxed parameters than for the GKP repeater scheme. Specifically, for $\eta_0=0.97$, the architecture based on the [[4,1,2]] code ([[7,1,3]] code) enables to achieve secret-key rate per optical mode larger 0.01 for total distances larger than 1000 km already with 16.2 dB (14.7 dB) of squeezing. For the [[7,1,3]] code achieving such secret-key rate for total distance close to 1000 km is also possible with much lower photon coupling efficiency of $\eta_0=0.93$ if 17.9 dB of GKP squeezing is considered.

TABLE 2

| [[4,1,2]] code with GKP | | | | | |
|---|---|---|---|---|---|
| | | coupling efficiency $h_0$ | | | |
| | | 0.93 | 0.95 | 0.97 | 0.99 |
| GKP squeezing $S_{GKP}$ | 0.05 (23.0 dB) | 360 | 5440 | >10000 | >10000 |
| | 0.07 (21.5 dB) | 180 | 1970 | >10000 | >10000 |
| | 0.09 (17.9 dB) | <100 | 590 | >10000 | >10000 |
| | 0.11 (16.2 dB) | <100 | 190 | 1750 | >10000 |
| | 0.13 (14.7 dB) | <100 | <100 | 220 | 980 |

TABLE 3

| [[7,1,3]] code with GKP | | | | | |
|---|---|---|---|---|---|
| | | coupling efficiency $h_0$ | | | |
| | | 0.93 | 0.95 | 0.97 | 0.99 |
| GKP squeezing $S_{GKP}$ | 0.05 (23.0 dB) | 7020 | >10000 | >10000 | >10000 |
| | 0.07 (21.5 dB) | 2830 | >10000 | >10000 | >10000 |
| | 0.09 (17.9 dB) | 880 | >10000 | >10000 | >10000 |
| | 0.11 (16.2 dB) | 290 | 2470 | >10000 | >10000 |
| | 0.13 (14.7 dB) | <100 | 320 | 1160 | 4230 |

All the values in Tables 1-3 can also be compared against the PLOB bound introduced in Section II.A.3 and describing the limits of direct transmission. Since its value drops below $K(L_{tot})=0.01$ after $L_{tot}=109$ km, we see that for most considered parameter regimes the concatenated-coded schemes easily overcome the optimal direct transmission. The relaxed hardware requirements, large achievable distances and performance against the PLOB bound show that our concatenated-coded schemes are promising architectures for long-distance quantum communication.

4. Performance Versus Cost Trade-Off of the Concatenated-Coded Repeater Architecture Clearly the costlier denser placement of type-A repeaters results in better performance. Therefore in the second step we also take the repeater cost into account. Specifically, for each end-to-end distance we aim to minimize the normalized cost function defined as $$C' = \frac{\text{Resources used per km}}{\text{achieved secret-key rate per mode}}. \quad (6)$$

The natural way of counting the resources will clearly depend on the physical implementation of our scheme. Here we count the resources by considering the needed number of GKP storage modes and the storage duration needed for these modes in both types of repeater nodes, see Section IV.B for mathematical definition of the cost function. Specifically we consider not only the storage of the data modes but also of the ancilla modes needed for error correction. We consider a discretization of all the operations into time steps, where one time step is needed either for preparing a GKP ancilla state or for performing all the two-mode Gaussian operations between a single data mode and the ancilla mode for the purpose of the inner or outer code stabilizer measurement. We describe the details of our scheduling procedure in Supplementary Note 10. For each of the needed storage modes we count the number of time steps that this mode must be able to store the state for without losing or decohering it. Then we sum the number of these time steps for all the needed storage modes inside each repeater type to obtain the total cost of placing a given repeater. This way of estimating repeater cost applies, for example, to an architecture in which the repeaters would consist of coupled cavities, where each cavity is effectively used as a quantum memory for a single GKP mode during the correction operations. We discuss possible implementations in more detail in Sections III and Section IV.B.

For the above discussed strategy of estimating the resources, the exact cost values are explicitly stated in Section IV.B and derived in Supplementary Note 10. Here we just note that in our architecture we add additional operations inside type-A repeaters which aim at decreasing the noise effect of finite GKP squeezing. This includes performing additional GKP corrections between multi-qubit stabilizer measurements and repeating the measurement of the second-level syndrome for better measurement reliability. As a result we find that for the proposed scheduling of the operations the type-A repeater for the [[4,1,2]] code costs around 17 times more than the type-B repeater, while the type-A repeater for the [[7,1,3]] code costs around 78 times more than the type-B repeater. The numerator in the cost function in Eqn. 6 is just the sum of the costs of Alice's encoding station and all the repeaters in the given configuration (including Bob's decoding station which also performs quantum error correction and can be treated as a type-A repeater, see Supplementary Note 8 for more details) over the total communication distance $L_{tot}$, divided by this distance in km, see Section IV.B for more detail. We note that while we do not specify the scheduling of operations at Alice's encoding station, higher-level encoding from GKP qubits can be achieved by performing the same type of operations as performed inside repeaters. These include CV two-qubit Clifford gates and additional GKP corrections to limit the accumulation of errors due to finite squeezing in GKP modes. We have verified that such a procedure enables reliable higher-level encoding where the probability of a logical error on any of the GKP data qubits during this procedure is smaller than the corresponding probability of error due to performing operations with finitely squeezed GKP ancilla modes during error-correction inside the type-A repeaters. The complexity of such an encoding does not exceed the corresponding complexity of operations performed inside the type-A repeater and therefore in the cost function we assign to the encoding the same cost as to the type-A repeater. In our analysis the cost function is minimized independently for each distance over all the repeater placement configurations.

Figure 7:
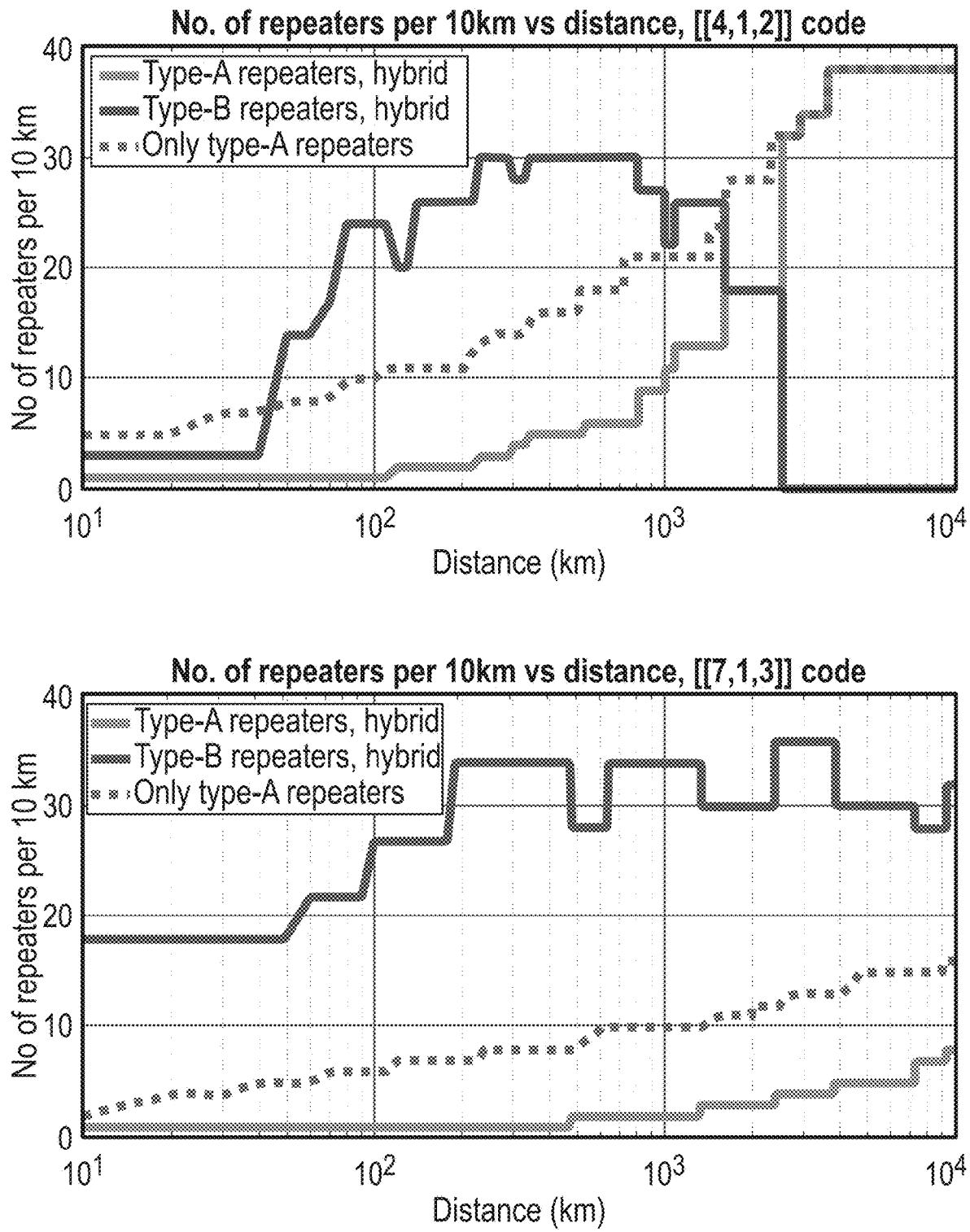
FIG. 7 illustrates an optimal repeater configuration which minimizes the cost function for the concatenated-coded schemes, in embodiments.

Here we perform the cost function analysis for the scenario with $\eta_0=0.97$ and with 17.9 dB of squeezing corresponding to $\sigma_{GKP}=0.09$. In FIG. 7 we depict the optimal repeater placement configuration for each distance for the concatenated-coded architectures. We plot the optimal number of repeaters per 10 km for the hybrid architecture and for comparison for the architecture that uses only type-A repeaters. We see that the hybrid architecture enables us to use less of the expensive type-A repeaters thanks to the help of the cheaper type-B repeaters. Since type-B repeaters are cheap, we see that already for shorter distances it is optimal to place them densely. Moreover, we see that since the [[7,1,3]] code repeaters are more powerful than [[4,1,2]] code repeaters, we need less of the former ones in the first architecture than we need of the latter ones in the second one. We also observe that for the hybrid architectures the optimal number of type-A repeaters increases monotonically with distance and the stepwise increase of this number may result in a stepwise decrease of the optimal number of type-B stations.

We also describe the behavior of the secret key under the cost function minimization. Again, for each of the two second-level codes, we consider two architectures, one using only type-A stations and the second one using both types of repeaters. Let us then consider the amount of secret key in bits per mode r' that can be generated by each of these schemes. We plot r' for all the four architectures in FIG. 8. We see that the architectures based on the [[4,1,2]] code ([[7,1,3]] code) achieve r'>0.02 (r'>0.06) for all the distances up to 10,000 km. While under the cost function minimization the hybrid schemes generate for most distances slightly less key than the corresponding schemes based only on type-A stations, there is no significant difference in performance trend with distance between these two schemes. The overall "zig-zag" shape of the curves is caused by discrete changes in the optimal repeater placement configurations with changing distance. We also see that for most distances the [[4,1,2]] code architectures can generate more key per optical mode than the corresponding [[7,1,3]] code architectures since the former ones need less modes to transmit a logical qubit. However, we see that after around 4,000 km the key starts decaying for the architectures based on the [[4,1,2]] code. This reveals that the [[4,1,2]] code schemes will not be able to sustain secret-key generation for distances much larger than 10,000 km. On the other hand the [[7,1,3]] code architectures maintain a steady r' for all the distances.

This conclusion can be also drawn from the consideration of the simulation error. Specifically, since the simulation data has at most 10% relative error, we have also investigated the corresponding behavior for the upper-bound on the simulated logical X and Z flip probabilities. In particular we have minimized the cost-function and investigated the resulting secret-key rate for the scenario when the obtained X and Z flip probabilities are increased by 10% for all the repeater placement configurations. We find that this does not have any significant effect on the architectures based on the [[7,1,3]] code, that is the secret-key rate still stays such that r'>0.06 for all the distances. However, for the [[4,1,2]] code schemes r' drops below 0.02 for 10,000 km now. This supports the observation that for the considered parameters the [[7,1,3]] code architectures remain robust even at such large distances. On the other hand, the [[4,1,2]] code schemes, which for distances close to 10,000 km require placement of type-A repeaters almost every 250 m, become sensitive to noise at these distances.

Figure 8:
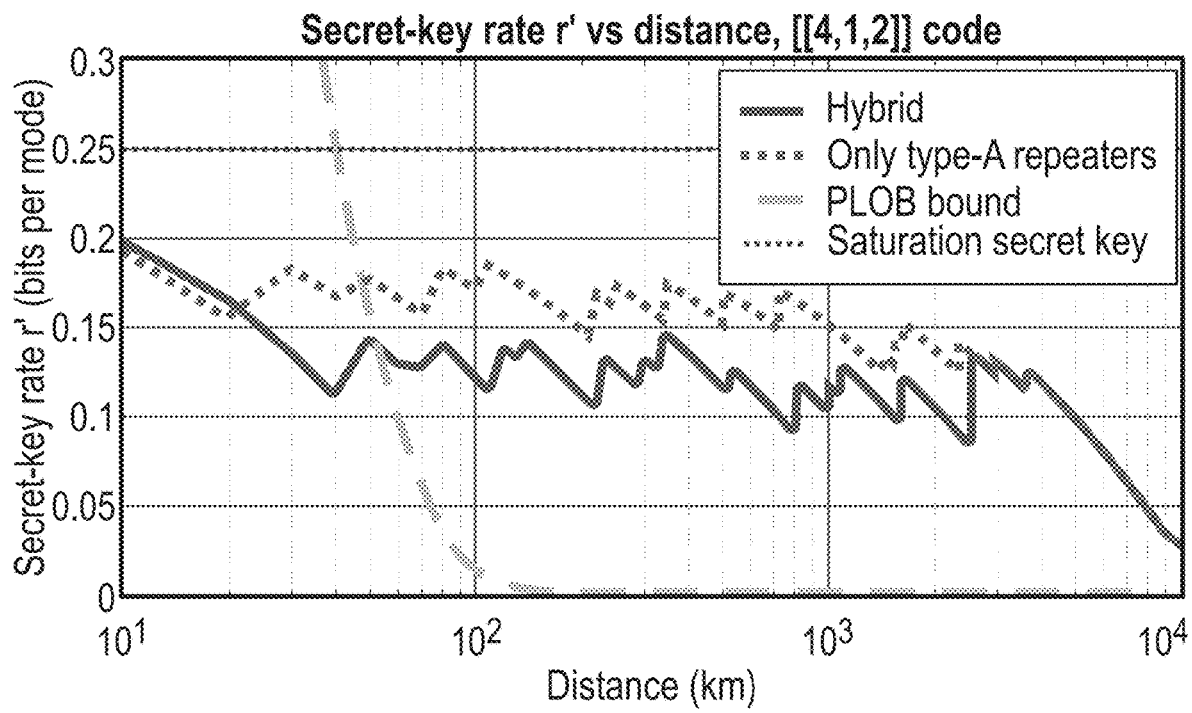
FIG. 8 is a plot of secret-key rate in bits per optical mode r' versus distance for the concatenated-coded schemes.
Figure 8:
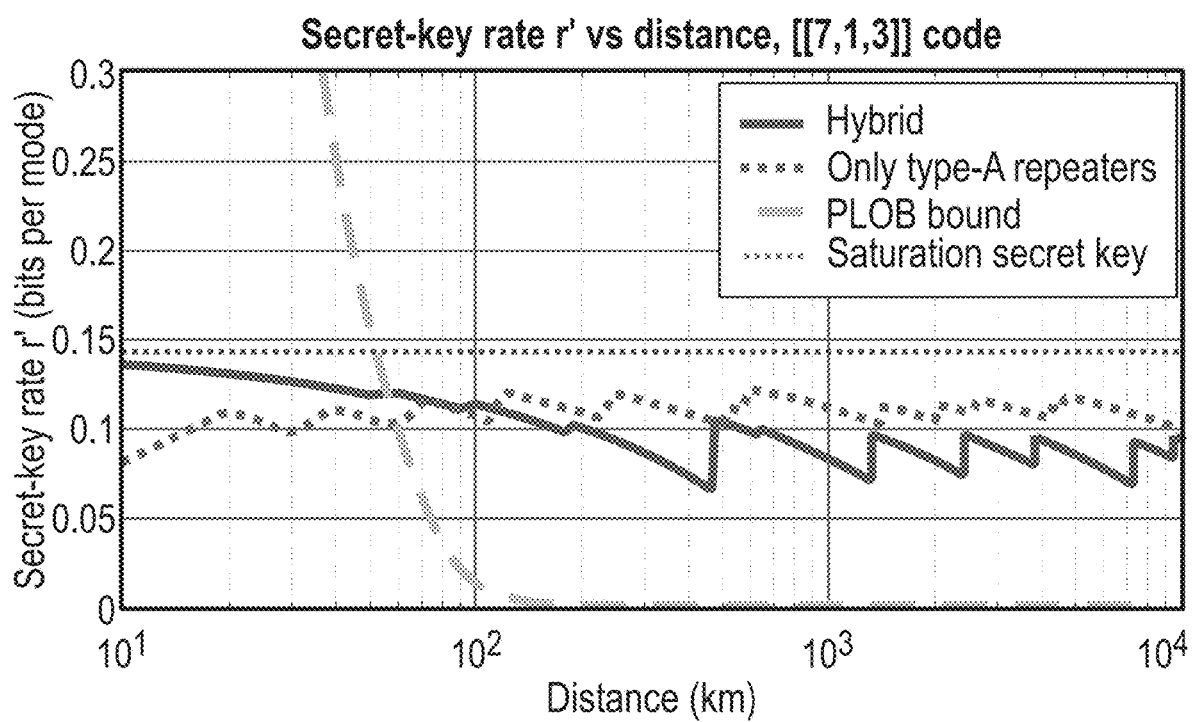

We note that for comparison in FIG. 8 we also plot the PLOB bound. The PLOB bound corresponds to the two-way assisted secret-key capacity of the pure-loss channel and therefore the ultimate limit of repeater-less quantum communication with perfect devices. Finally, we mark the saturation secret key, which is the maximum value $r_{max}'=1/n$ attainable with zero QBER. For the [[4,1,2]] code it is 1/4 and for the [[7,1,3]] code it is 1/7. We observe that the overall trend for the [[7,1,3]] code schemes is that they maintain a steady secret-fraction r' for all the considered distances while for the [[4,1,2]] code architectures the key starts decreasing for larger distances. All the schemes easily overcome the PLOB bound already for distances much less than 100 km.

Figure 9:
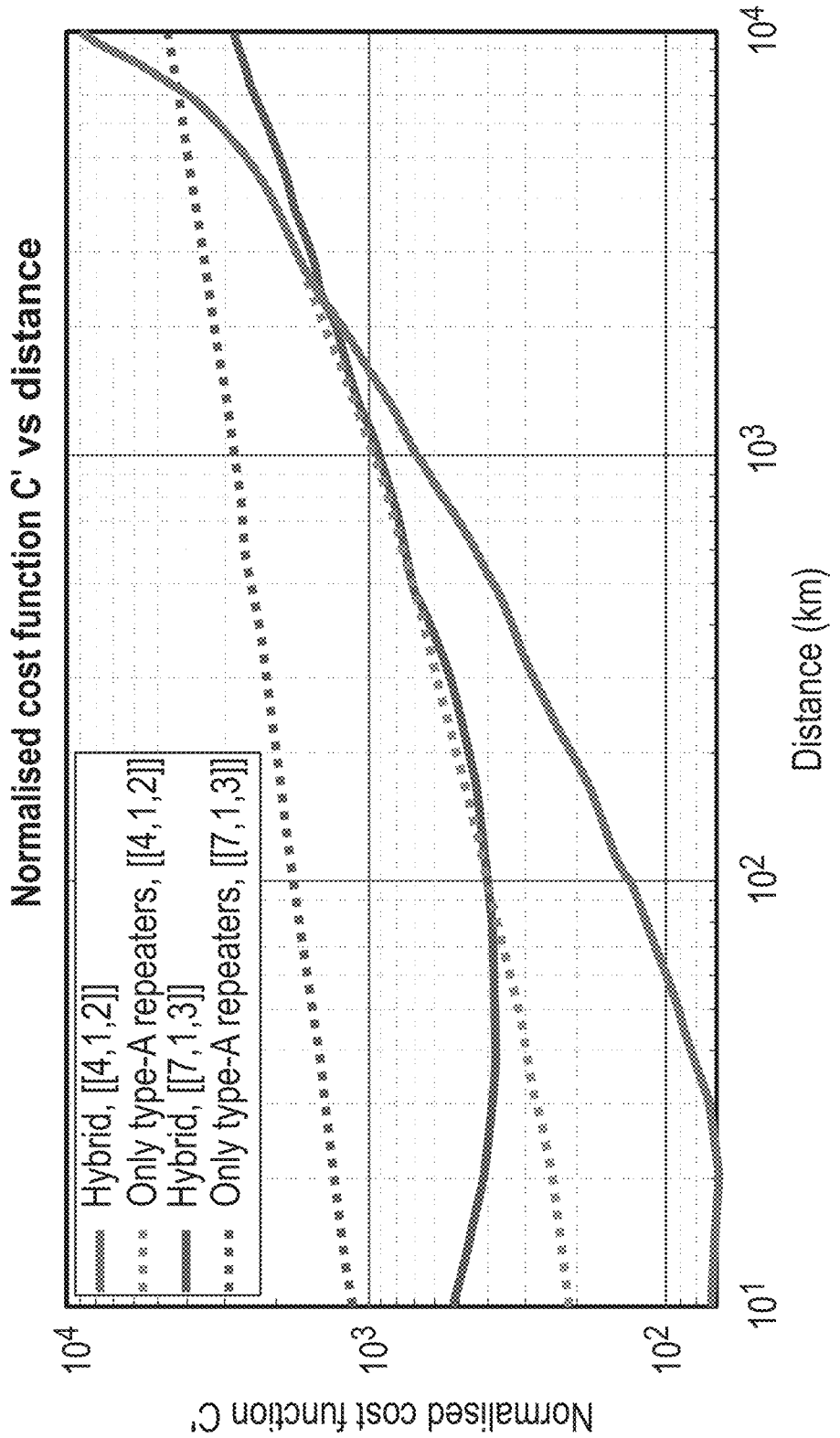
FIG. 9 is a plot of normalized cost function versus distance for the concatenated-coded architectures.

FIG. 9 is a plot of normalized cost function versus distance for the concatenated-coded architectures. The considered parameters are $\eta_0=0.97$ and $\sigma_{GKP}=0.09$. We see that the hybrid scheme enables us to reduce the cost function with respect to the corresponding scheme that uses only type-A repeaters. We also see that for shorter distances it is more efficient to use the architecture based on the [[4,1,2]] code since the type-A repeaters of the [[7,1,3]] code are expensive while their large error correcting capabilities are not needed for these distances. For larger distances, the cost function is smaller for the [[7,1,3]] code architecture because these high error correcting capabilities allow for better performance-cost trade-off than the use of the cheaper but less efficient [[4,1,2]] repeaters. The visible initial decrease of the cost function with distance for the solid blue line is caused by the initial cost of Alice's encoding station. The effect of the simulation error is described in Section IV.C.

The final question is how the costs of these different schemes compare. We plot the normalized cost function for all these schemes in FIG. 9. Since we have already verified that the performances of the hybrid scheme and the scheme utilizing only type-A repeaters are similar, we conclude from this plot that the hybrid architecture enables us to save a lot of resources in comparison to the architecture based only on the more expensive type-A repeaters. This is because the performance benefits of using the more expensive type-A repeaters can be maintained by replacing some of them with the cheaper type-B repeaters. Second, we see that for shorter distances it is more resource-efficient to use the architecture based on the [[4,1,2]] code while for larger distances the [[7,1,3]] architecture is preferable. This is linked to the fact that the type-A repeaters in the [[7,1,3]] code architecture are more expensive but also more powerful than the type-A repeaters in the [[4,1,2]] code architecture. For smaller overall losses at shorter distances these larger powerful repeaters are not necessary while for larger distances they are more efficient at overcoming the overall high losses.

III. Discussion

Let us now discuss the experimental challenges related to our scheme. These will naturally depend on its physical implementation. In our cost-function analysis we have assumed an architecture where all the GKP modes need to be placed in effective quantum memories for the duration of the error-correction operations. A possible implementation of such a CV-quantum memory that allows for preparation of the highly non-classical GKP state as well as GKP error correction is a superconducting microwave cavity, which has been experimentally demonstrated. Storing GKP data and ancilla modes in coupled microwave cavities at the repeater nodes would clearly require an efficient transduction between the telecom optical channel and the microwave regime.

On the other hand one could also consider an all-optical implementation where all the repeaters perform error correction online on the flying GKP qubits stored and coupled to ancilla GKP modes directly in the optical fiber. Such an implementation would be similar in spirit to the all-photonic repeaters. Since storage of additional GKP modes in the same spool of optical fiber does not require additional quantum memories, the resource cost analysis for such an all-optical implementation will clearly differ from the one using the microwave-cavity-based repeaters. Since the all-optical preparation of GKP states remains a significant experimental challenge, the cost analysis presented here and the corresponding scheduling of operations discussed in Supplementary Note 10 are performed with respect to a model which is more suitable for the microwave cavity implementation.

Let us now compare the hardware requirements of our scheme with respect to other error-correction-based repeater proposals. The requirement on the photon coupling efficiency for our scheme is similar as for the proposed error-correction-based repeater architectures utilizing discrete-variable encoding using tree codes and parity codes. On the other hand the need for operating on large number of modes/qubits which is required for these schemes is removed in our scheme at the expense of the requirement for being able to prepare highly non-classical and highly squeezed GKP states in each of these few modes. We note that while for the discrete-variable encodings large number of entangled qubits are needed, the number of required entangled photons can be significantly reduced by multiplexing which allows for encoding multiple qubits in a single photon. In fact, if the average number of photons needed for the encoding is considered to be the main resource, then the relative cost of utilizing such multiplexed schemes versus single-mode GKP encoding for combating photon loss depends on the channel transmissivity.

The experimentally demonstrated amount of GKP squeezing is in the regime 7.5-9.5 dB. Therefore more experimental progress is needed in order to achieve the required levels of squeezing predicted by our analysis. It would also be beneficial to study the effect of finite gate fidelity and finite storage time in our architecture. Furthermore, Steane error correction for GKP qubits has been demonstrated using an ancilla transmon qubit. Hence, experimental procedures for using ancilla GKP modes need to be developed as well as the procedures for encoding and decoding the proposed two-level coded qubits.

We note that our motivation for using the metric of secret-key rate in bits per optical mode as a way of assessing the repeater performance comes from the fact that this figure of merit has a clear operational meaning and quantifies the feasibility of a specific quantum communication task. Moreover, closely related figure of merits are also throughput and latency which quantify how much secret key can be generated per unit time and how long it takes to generate the first raw key bit respectively. We discuss the performance of our schemes with respect to these metrics in Supplementary Note 11. However, the considered repeater schemes can also enable and facilitate implementation of various tasks other than QKD. Specifically, the deterministic nature of these schemes could enable deterministic quantum state transfer as well as deterministic remote entanglement generation.

It is important to mention that the GKP encoding/decoding strategy based on effectively converting the pure-loss channel into the Gaussian random displacement channel using phase-insensitive amplification is an achievable strategy but not an optimal one. There exists a numerical proof based on semi-definite optimization, that a more efficient strategy of using GKP codes against the pure-loss channel exists. It is plausible that under the optimal decoding strategy, the single-mode GKP architecture with coupling efficiency and squeezing levels similar to the ones considered in our concatenated-coded schemes will be sufficient for long-distance quantum communication. However, the numerical nature of this proof makes it difficult to extract from the solution the corresponding decoding procedure. In particular such an optimal decoding procedure might require much more complex operations than phase-insensitive amplification as well as the need to use large number of ancilla systems. Therefore, further study is needed to establish the optimal decoding procedure for correcting loss errors using GKP code and to evaluate its complexity and experimental feasibility.

Let us now summaries the future outlook of this work. First, utilization of microwave cavities in long-distance quantum communication will require experimental realization of highly efficient transduction between the microwave and optical regimes. An alternative solution would be an all-optical realization which would require implementation of GKP state preparation directly in the optical regime. Second, it could also be beneficial to incorporate autonomous GKP error correction into our procedure which does not require active measurements and feedback. This technique could potentially be more efficient than the considered GKP Steane error correction, though it would not provide us with the additional analog information which we have seen plays a crucial role in the performance of the concatenated-coded schemes. Third, additional improvements could come from investigation of the optimal decoding strategy for GKP code used against the action of the pure-loss channel. Fourth, our analysis shows that more experimental progress on GKP squeezing is needed as well as implementation of high photon coupling efficiency in order for the considered schemes to become practical. Finally, given the nature of the concatenated-coded repeater architecture in which multiple GKP qubits from a single outer-code encoding block are transmitted in sequence, it could be valuable to investigate the use of a quantum convolutional code as the outer code, as this would allow for easier online error correction (e.g., in the all-photonic implementation).

IV. Methods

A. Realistic GKP States

Since $|q\rangle$ and $|p\rangle$ eigenstates are unphysical and require infinite amount of squeezing and energy, the ideal GKP states defined in Eqns. 2 and 3 are also unphysical. Therefore we will consider imperfect GKP states corresponding to a finite amount of squeezing. Let $|\psi_{GKP}\rangle$ denote an ideal GKP state. Then an approximate GKP state can be obtained by applying a Gaussian envelope operator $\exp(-\Delta^2 \hat{n})$ to the perfect GKP state. Here $\hat{n}$ is the photon number operator and $\Delta$ describes the width of each peak in the grid-structure of the GKP Wigner function. We can use displacement operators $\hat{D}(\alpha)=\exp[\alpha \hat{a}^\dagger - \alpha^* \hat{a}]$ to rewrite the approximate GKP state $|\psi_{GKP}^\Delta\rangle$ as:

$$|\psi_{GKP}^\Delta\rangle \propto \int \frac{d^2\alpha}{\pi} Tr\left[\exp(-\Delta^2 \hat{n})\hat{D}^\dagger(\alpha)\right]\hat{D}(\alpha)|\psi_{GKP}\rangle \quad (7)$$

$$\propto \int d^2\alpha \exp\left[-\frac{|\alpha|^2}{2\sigma_{GKP}^2}\right]\hat{D}(\alpha)|\psi_{GKP}\rangle.$$

Here $\sigma_{GKP}^2=(1-e^{-\Delta^2})/(1+e^{-\Delta^2})$. We see that an imperfect GKP state can be described as a coherent superposition of randomly displaced ideal GKP states with a Gaussian envelope centered at zero displacement. In our simulation, we consider a more conservative error model for imperfect GKP states. Specifically, let us define the Gaussian random displacement channel as:

$$\mathcal{N}_{disp}[\sigma](\rho) = \frac{1}{\pi\sigma^2}\int d^2\alpha \exp\left[-\frac{|\alpha|^2}{\sigma^2}\right]\hat{D}(\alpha)\rho\hat{D}^\dagger(\alpha). \quad (8)$$

Then by adding further twirling noise to the state in Eqn. 7 we can remove the coherences between the superposition terms with different values of the displacement amplitude $\alpha$. This can be done by applying random displacements by an integer multiple of $2\sqrt{\pi}$ in each quadrature, such that for the relevant amount of GKP squeezing considered here, we obtain a state that can be described as:

$$\rho_{GKP}[\sigma_{GKP}] = \mathcal{N}_{disp}[\sigma_{GKP}](|\psi_{GKP}\rangle\langle\psi_{GKP}|). \quad (9)$$

Hence, we can simulate the imperfect GKP state by sampling displacement values $\xi_q^{GKP}$ and $\xi_p^{GKP}$ along the $\hat{q}$ and $\hat{p}$ quadratures respectively from the normal distribution centered at zero and with standard deviation $\sigma_{GKP}$: $\xi_q^{GKP}$, $\xi_p^{GKP} \sim (0, \sigma_{GKP})$. We then consider an ideal GKP state that has been displaced according to these values.

B. Cost Function

In this section we make the notion of the repeater cost mathematically precise by defining a cost function whose minimization aims at finding the best trade-off between the repeater performance and the resource cost. We also propose a specific scheduling procedure for the operations in all the repeaters and aim to minimize the cost function under this scheduling model.

The resource cost as well as duration and time scheduling of all the operations performed within the proposed repeaters will naturally depend on the physical implementation of our scheme. Two possible implementations for which the scheduling of the operations and the natural way of counting the resources would be very different are repeaters that store GKP modes inside microwave cavities and all-optical stations in which all the operations are performed on the fly while the GKP data and ancilla qubits are stored in the spools of optical fiber. The main difference between the two implementations from the perspective of the scheduling of operations as well as estimating resource cost is the fact that the first implementation entails the use of effective quantum memories that are required for storing the GKP modes. Hence, if the number of such memories (e.g., microwave cavities) is limited, then not all the GKP data modes can be operated on simultaneously, while increasing the number of such available memories will clearly increase the resource cost of the stations. On the other hand, the all-optical implementation does not involve the concept of such quantum memories, as all the modes are operated on in the optical fiber. Hence the main limiting factor with respect to the delay between the consecutive GKP qubits will be in this case the repetition rate of the GKP source. As discussed in the main text, here we perform the analysis under the model of the first implementation involving the CV-quantum memories, motivated by the experimental demonstration of GKP error correction in a superconducting microwave cavity.

For the considered model, the cost of the resources can be measured by the amount of GKP storage modes times the storage time in all the repeaters needed for communication over the distance $L_{tot}$. Let $t_{GKP}$ denote the cost of the single GKP repeater and $t_{multi-qubit}$ the cost of the single multi-qubit repeater. Then for each of these repeater types $$t = \sum_{i=1}^{m} k_i. \tag{10}$$

Here m denotes the number of storage modes (both for data and ancilla GKP qubits) that are required in a given repeater. Then the mode i in that repeater needs to be able to store a GKP qubit for $k_i$ time steps defined below.

These repeater costs depend on the specific scheduling scheme of the operations performed inside the repeaters. Here we consider a specific scheduling scheme based on the following assumptions:

1. We assume full connectivity, that is a two-qubit gate can be performed between any two GKP qubits inside every repeater.
2. We measure time of performing all the operations inside repeaters in time steps. We assume that one time step is the time of performing each of the following procedures:
   preparing an ancilla GKP qubit, and
   applying a two-qubit gate between a data and an ancilla GKP qubit followed by a homodyne measurement of the ancilla and a subsequent feedback displacement of the data qubit; for the first or last operation on a given data mode inside a given repeater, the process of receiving or sending out a GKP qubit is also incorporated in this time step.

Clearly the second procedure involves more steps, but consists solely of Gaussian operations which are experimentally much easier to realize than the first procedure of GKP state preparation. Preparing GKP states requires a source of optical non-linearity as the GKP state is highly non-classical.

The detailed scheduling of all the operations performed inside the repeaters is described in Supplementary Note 10, where it is shown that within our model the cost of the type-B repeater is $t_{GKP}=4$, the cost of the type-A repeater based on the [[4,1,2]] code is $t_{4-qubit}=68$, while the cost of the type-A repeater based on the [[7,1,3]] code is $t_{7-qubit}=311$.

Now we can define the cost function that measures both the performance and cost for the concatenated-coded schemes as:

$$C(L_{tot}, N_{multi-qubit}, N_{all}) = \frac{\frac{L_{tot}}{10}*(t_{GKP}(N_{all} - N_{multi-qubit}) + t_{multi-qubit}N_{multi-qubit}) + t_{multi-qubit}}{r'(L_{tot}, N_{multi-qubit}, N_{all})}. \tag{11}$$

Here r' is the secret-key rate per optical mode defined in Supplementary Note 8 and $t_{multi-qubit}$ can correspond to $t_{4-qubit}$ or $t_{7-qubit}$ depending on the considered architecture. Moreover, the total distance $L_{tot}$ is expressed in km, $N_{all}$ is the number of all repeaters per 10 km and $N_{multi-qubit}$ is the number of multi-qubit repeaters per 10 km. That is, if after a type-A repeater there is a type-B repeater 5 km away and then another type-A repeater after another 5 km, such that the repeater types oscillate every 5 km, then $N_{all}=2$ and $N_{multi-qubit}=1$. Such convention has the nice feature that it is then reasonable to only consider cases when $N_{all}$ is a multiple of $N_{multi-qubit}$ This is because we can think of our architecture as firstly placing multi-qubit repeaters equidistant to each other and then adding GKP repeaters in between such that all the neighboring type-B stations are also equidistant to each other. Moreover, the separation between the consecutive multi-qubit repeaters is then $10/N_{multi-qubit}$ km while the spacing between any two neighboring repeaters (independently of their types) is $10/N_{all}$ km. The choice of 10 km as a reference distance is motivated by the fact that for all parameter regimes that we consider and for $L_{tot}$ of at least 500 km, it turns out that the optimal repeater configuration requires more than one type-A repeater per 10 km, see FIG. 7. Hence, we then only consider configurations in which $N_{multi-qubit}$ and $N_{all}$ are positive integers. We see that in Eqn. 11 we include a residual $t_{multi-qubit}$ term to account for Alice's encoding station which we expect to have a similar cost as the type-A repeater. Bob's decoding station performs multi-qubit error correction and therefore counts as a type-A repeater and is implicitly included in $N_{multi-qubit}$ for the last 10 km segment.

Now, we aim to optimize our repeater configuration by minimizing this cost function over $N_{multi-qubit}$ and $N_{all}$ for each distance $L_{tot}$. We note that for practical terms it can be more informative to minimize a normalized cost function which for a given distance $L_{tot}$ counts resources per km rather than for the total distance:

$$C'(L_{tot}, N_{multi-qubit}, N_{all}) = \tag{12}$$

$$\frac{C(L_{tot}, N_{multi-qubit}, N_{all})}{L_{tot}} = \frac{L_{tot}(t_{GKP}(N_{all} - N_{multi-qubit}) + t_{multi-qubit}N_{multi-qubit}) + 10 t_{multi-qubit}}{10 L_{tot}*r'(L_{tot}, N_{multi-qubit}, N_{all})}.$$

This normalized cost function is plotted in FIG. 9.

C. Monte-Carlo Simulation

Analytical modelling of the performance of the concatenated-coded repeater architectures is challenging. This is due to multiple effects. Firstly, even assuming the use of ideal GKP states, the analog information does not allow us to correct all the single-qubit errors for the [[4,1,2]] code and all the single- and two-qubit errors for the [[7,1,3]] code on the higher level. Specifically, from the simulation we see that the performance of the repeater in correctly identifying those errors depends on the channel parameters, that is, depending on the standard deviation σ of the effective Gaussian random displacement channel between the repeaters we observe a different fraction of the single- and two-qubit logical GKP errors which the higher-level code fails to identify correctly and therefore fails to correct. In general, the larger a, the higher the probability of misidentifying the erroneous qubit(s) on the second level. Moreover, the use of imperfect GKP ancillas together with the rescaling coefficients for the feedback displacement make it impractical to model errors after GKP correction as discrete Pauli errors on GKP qubits. Therefore we evaluate the performance of our scheme using a Monte-Carlo simulation for specific parameters.

We perform numerical Monte-Carlo simulation by tracking the evolution of the errors in the $\hat{q}$ and $\hat{p}$ quadratures. While at the end of the simulation we would like to identify logical errors on the second level, the actual quadrature shifts on all the data qubits are continuous. Specifically, the imperfect squeezing in the GKP ancillas means that the final state of the qubits will in general be neither in the GKP code space nor in the second-level code space. Therefore we finish by applying first a round of virtual perfect GKP correction on all the GKP qubits and then a round of virtual perfect second-level correction, to bring the state to the code space of both codes. As here we just want to identify the closest logical state, we do not consider any analog information for this virtual corrections. These perfect corrections can be thought of as being performed using perfect infinitely squeezed ancilla GKP modes. The perfect GKP correction brings all the GKP data qubits to the nearest state in the code space such that we can now assign to them discrete values quantifying whether a logical X and/or Z error has taken place. Then the perfect multi-qubit correction (now without using the analog information) brings the state to the nearest logical state on the second level such that we can now count whether a logical error on the second level has taken place.

We find that it is not enough to simulate a single link between two consecutive type-A repeaters. When simulating only a single such link, there is a high probability that due to finite ancilla squeezing, before the perfect virtual multi-qubit correction we will be in a state that is outside of the code space on the second level and has, for example, a single GKP data qubit flipped. In the real-life scenario such a residual error on the second level would carry over to the next elementary link. Therefore the perfect virtual multi-qubit correction after a single link could significantly underestimate the error rate by effectively removing all such residual errors. However, we can simulate multiple consecutive links with the virtual correction only at the very end. In that case such a residual error on the second level before the final perfect virtual correction will only occur if there is a failure in correctly identifying the second-level stabilizers in the last link before the simulation end. This probability is always the same, that is, it is independent of the number of links we are simulating. Yet if we simulate multiple links then the total error accumulates so the probability of logical error after large number of links is much larger than after a single link. Therefore we simulate a chain of 100 such links before the virtual correction and in this way, we make the probability of such a residual error negligible relative to the probability of the actual logical error.

For each quadrature we start the simulation directly after the multi-qubit correction in that quadrature in the first repeater assuming that each GKP data qubit carries a residual Gaussian random displacement error from a channel with variance $c_{opt}\sigma_{GKP}^2$ coming from the last GKP correction from the preceding link. Here $c_{opt}$ is the optimal coefficient used to rescale the GKP syndrome during error correction, see Supplementary Note 2 for more details. We then evolve this quadrature following all the error channels and correction operations as described in Supplementary Notes 5, 6, 7, and 10. We finish the simulation directly after the multi-qubit correction in that quadrature after the 100th link. We note that this means that the simulation of the $\hat{q}$ quadrature evolution has its beginning and end shifted with respect to the simulation of the $\hat{p}$ quadrature given that the multi-qubit syndrome measurements in those two quadratures happen at different times. Finally, after the virtual corrections, we read off whether a logical error on the second level has occurred in any of the two quadratures. Hence from the simulation we extract the probabilities of X and Z logical errors $p_{err,X/Z}(\eta_0, \sigma_{GKP}, N_{multi-qubit}, N_{all})$ over such 100 elementary links. We can then discretize these errors, assigning a well-defined probability of a logical error for a single elementary link given by $p_{err,XZ} = (1-(1-2p_{err,X/Z})^{1/100})/2$. Hence, we consider that the logical error over 100 links is given by an odd number of these effective discrete logical errors over single links. We can then use the values of $p_{err,X}$ and $p_{err,Z}$ obtained from the simulation to calculate the total probabilities of X and Z errors over the total distance $L_{tot}$ by considering the probabilities of odd number of such errors over the entire channel. These can be obtained by substituting $P_{err,XZ}$ into the equation:

$$Q_{err,XZ} = \frac{1-(1-2P_{err,XZ})^{L_{tot}/L}}{2}. \tag{13}$$

where L is the length of the single link given by $L = 10/N_{multi-qubit}$. As a result we have that:

$$Q_{err,X/Z}(\eta_0, \sigma_{GKP}, N_{multi-qubit}, N_{all}, L_{tot}) = \\ \frac{1-\left(1-2p_{err,X/Z}\right)^{N_{multi-qubit}L_{tot}/1000}}{2}. \tag{14}$$

Then this leads to an effective channel over $L_{tot}$ given by:

$$\mathcal{D}(\rho) = (1-q_X-q_Z-q_Y)\rho + q_X X\rho X + q_Z Z\rho Z + q_Y Y\rho Y. \tag{15}$$

with $q_X = Q_{err,X}(1-Q_{err,Z})$, $q_Z = Q_{err,Z}(1-Q_{err,X})$, and $q_Y = Q_{err,X} Q_{err,Z}$. This enables us to calculate the secret-key rate per mode as described in Supplementary Note 8 and then the normalized cost function given in Eqn. 12.

For each considered setting of the experimental parameters $\eta_0$ and $\sigma_{GKP}$ we run the simulation for multiple configurations of $\{N_{multi-qubit}, N_{all}\}$. That is, we start with $N_{multi-qubit} = N_{all} = 1$ and then rerun the simulation for the configurations for which $N_{all}$ is a multiple of $N_{multi-qubit}$, where we place a limit of 250 m on the minimum repeater spacing ($N_{all} \leq 40$ and $N_{multi-qubit} \leq 40$). In order to find the achievable distances presented in Tables 1-3 above and Table 4 below, we maximize this secret-key rate for each distance by choosing the setting of $\{N_{multi-qubit}, N_{all}\}$ and the corresponding $p_{err,X/Z}$ which gives the highest secret-key rate for that distance $L_{tot}$. Then we look for the largest distance for which such secret-key rate per mode stays above 0.01. We proceed similarly when calculating the optimal resource-cost trade-off. Then for each distance we minimize the cost function by choosing this setting of $\{N_{multi-qubit}, N_{all}\}$ and the corresponding $p_{err,X/Z}$ which gives the smallest cost function for that distance $L_{tot}$. We also evaluate the cost function for the architecture based solely on multi-qubit stations by imposing the additional constraint $\{N_{multi-qubit} = N_{all}\}$.

In a similar spirit, we also run a Monte-Carlo simulation for a GKP repeater chain to verify the analytical model described in Supplementary Note 5. To include the effect of the residual displacements after GKP correction in a given repeater on the probability of successful correction in the next repeater, also in this case we simulate a chain of 100 elementary links, where this time an elementary link is a single link between the neighboring type-B repeaters. We again simulate the errors in the two quadratures independently, where the simulation in each quadrature starts directly after the corresponding GKP correction, so that the initial error displacement comes from a distribution with variance $c_{opt}\sigma_{GKP}^2$. We then simulate 100 elementary links and apply the virtual perfect GKP correction at the end. We read-off whether there was a logical X or Z error, so that from the statistics we can extract the value of $p_{err,X/Z}$. Here $p_{err,X/Z}$ is the X or Z logical error probability over a chain of 100 GKP repeaters. Analogously to the concatenated-coded architecture, we calculate the logical X and Z error probability for the total distance $L_{tot}$:

$$Q_{err,X/Z}(\eta_0, \sigma_{GKP}, N_{GKP}, L_{tot}) = \frac{1 - (1 - 2p_{err,X/Z})^{N_{GKP}L_{tot}/1000}}{2}, \quad (16)$$

where $N_{GKP}$ is the number of GKP stations per 10 km. We can then extract the corresponding secret-key rate per optical mode r' in the same way as described above for the concatenated-coded scheme. The results of our Monte-Carlo simulation for the GKP repeater chain verify the analytical model from Supplementary Note 5.

Now we also specify how we determine the accuracy of the simulations. When simulating a chain of 100 elementary links, we start with the sample of size k=10 and calculate the estimates of the standard error for the probability of logical X and Z flips $p_{err,X/Z}$ as:

$$\Delta p_{err,X/Z} = \sqrt{\frac{p_{err,X/Z}(1 - p_{err,X/Z})}{k}}, \quad (17)$$

where the numerator is the standard deviation of the Bernoulli distribution. Then we calculate the relative error $\Delta p_{err,X/Z}/p_{err,X/Z}$ and check whether it is smaller than a threshold b which we set. If not, we increase k by a factor of 10 and repeat the procedure. We iterate until the relative error becomes smaller than the threshold b. We then estimate the upper and lower bounds on the achievable distance presented in Tables 1-3 above, and in Table 4 below, by performing the above described optimization of the secret-key rate per mode for each distance $L_{tot}$ not only for the logical error probabilities $\{p_{err,X}, p_{err,Z}\}$ but also for the values $\{(1-b)p_{err,X}, (1-b)p_{err,X}\}$ leading to the upper-bound and $\{(1+b)p_{err,X}, (1+b)p_{err,Z}\}$ leading to the lower-bound. For the simulations of the concatenated-coded schemes in Tables 1-3 we set b=0.1 and for the simulations of the GKP repeater chain in Table 4 we set b=0.02. The optimal repeater placement configuration presented in FIG. 7, the minimized cost function presented in FIG. 9 and the behavior of secret-key rate per mode under cost function minimization shown in FIG. 8 have all been obtained from the simulated data with the accuracy given by b=0.1.

Let us now briefly discuss the effect of minimizing the cost function for the concatenated-coded schemes when taking the simulation error into account, that is when we increase or decrease $\{p_{err,X}, p_{err,Z}\}$ by 10% for the parameters $\eta_0=0.97$ and $\sigma_{GKP}=0.09$. We have already mentioned in Section II.B.4 that increasing the logical error probabilities by 10% leads to a visible decrease of the secret-key rate for the [[4,1,2]] scheme for 10000 km. We also find that decreasing the logical error probabilities by 10% for this scheme leads to a visible increase of the secret-key rate above r'=0.03 for that distance. Moreover, when varying the logical error probabilities within this confidence interval we find a visible change in behavior for the first 200 km for both concatenated-coded schemes based on only type-A repeaters. Specifically, for distances up to around 100 km when the logical error probabilities are decreased by 10%, the optimal repeater configuration for these schemes requires only a single multi-qubit repeater per 10 km, which also significantly lowers the achievable secret-key rate in that regime, yet allows to significantly decrease the cost function relative to the values shown in FIG. 9. Finally, there is also a visible change in behavior for the hybrid schemes when varying the logical error probabilities within the confidence interval, yet again only for the first 200 km. This change corresponds to the change of the optimal number of type-B repeaters within that distance regime which for the scheme based on the [[4,1,2]] code also affects the amount of generated secret key and the cost function in that distance regime.

Finally, we note that we also run a simple simulation of a single elementary link with channel loss γ and ideal GKP and higher-level correction at the end in order to obtain the data presented in FIG. 6. As in this case there are no residual errors after correction, it is then sufficient to simulate only a single such elementary link rather than 100 consecutive links. For this single link we extract from the simulation the probabilities of logical X and Z flips, $p_{err,X/Z}$. These probabilities are then used to calculate the maximum infidelity given by:

$$\epsilon_{max} = q_X + q_Z, \quad (18)$$

where: $q_X = p_{err,X}(1-p_{err,Z})$ and $q_Z = p_{err,Z}(1-p_{err,X})$, as shown in the Supplementary Note 9. We similarly use Eqn. 17 to calculate the standard error on $p_{err,Z}$ and $p_{err,X}$ and again require the corresponding relative errors to be smaller than b. We can then calculate the relative error on $\epsilon_{max}$ as follows. Firstly, the relative error on $q_X$ is bounded by:

$$\frac{\Delta q_X}{q_X} = \sqrt{\left(\frac{\Delta p_{err,X}}{p_{err,X}}\right)^2 + \left(\frac{\Delta p_{err,Z}}{1-p_{err,Z}}\right)^2} \leq b\sqrt{1 + \left(\frac{p_{err,Z}}{1-p_{err,Z}}\right)^2}. \quad (19)$$

Similarly:

$$\frac{\Delta q_Z}{q_Z} \leq b\sqrt{1 + \left(\frac{p_{err,X}}{1-p_{err,X}}\right)^2}. \quad (20)$$

Let us define now $$u = 1 + \left(\frac{p_{err,Z}}{1-p_{err,Z}}\right)^2 \text{ and } v = 1 + \left(\frac{p_{err,X}}{1-p_{err,X}}\right)^2.$$

From here we can bound the relative error on the maximum infidelity as:

$$\frac{\Delta\epsilon_{max}}{\epsilon_{max}} \le b\frac{\sqrt{uq_X^2+vq_Z^2}}{q_X+q_Z}. \tag{21}$$

Since u and v are close to one, we see that the relative error on $\epsilon_{max}$ is smaller than b. In the simulation we set b=0.1. We then run the simulation for 101 values of $\gamma$ in the interval [0.08, 0.02]. We find that the relative error on $\epsilon_{max}$ is around 7% for all the data points.

Supplementary Note 1: GKP Error Correction

In this Supplementary Note we will describe the GKP error correction procedure. We will first describe how measuring the two stabilizers $\hat{S}_q$ and $\hat{S}_p$ allows us to correct errors caused by small displacements in phase space. Then we will describe how to perform these stabilizer measurements using ancilla GKP states. We will first focus on the scenario of error correction with perfect ancillas and then describe the imperfections arising from the use of ancillas with finite squeezing.

Correcting Random Displacement Errors

GKP code allows us to correct small random displacement errors from the logical subspace. The ideal error correction procedure for square lattice GKP code can be performed by measuring the two stabilizers $\hat{S}_q$ and $\hat{S}_p$. Such measurements are equivalent to measuring $\hat{q}$ and $\hat{p}$ modulo $\sqrt{\pi}$ producing the outcomes $\{q_0, p_0\}$, each of which belongs to the interval $[-\sqrt{\pi}/2, \sqrt{\pi}/2)$. The errors are then corrected by implementing the displacement $(\hat{q},\hat{p})\to(\hat{q}-q_0, \hat{p}-p_0)$. Hence, if the error displacement had the two components smaller in magnitude than $\sqrt{\pi}/2$, that is if the measured $\{q_0, p_0\}$ are exactly the error displacements, then the errors are successfully corrected. However, if e.g. the error displacement $\xi_q$ ($\xi_p$) was in the interval $[\sqrt{\pi}/2, 3\sqrt{\pi}/2)$, then $q_0=\xi_q-\sqrt{\pi}(p_0=\xi_p-\sqrt{\pi})$ and so the error channel followed by the correction operation would evolve the quadrature as: $\hat{q}\to\hat{q}+\xi_q-q_0=\hat{q}+\sqrt{\pi}(\hat{p}\to\hat{p}+\xi_p-p_0=\hat{p}+\sqrt{\pi})$. This net shift by $\sqrt{\pi}$ would then lead to a logical X (Z) error. In general, we see that if for the error displacement $\xi_q$ ($\xi_p$) we have that $|\xi_q-n\sqrt{\pi}|<\sqrt{\pi}/2$ ($|\xi_p-n\sqrt{\pi}|<\sqrt{\pi}/2$) for an odd integer n then the correction operation $\hat{q}\to\hat{q}-q_0(\hat{p}\to\hat{p}-p_0)$ will result in the logical X (Z) error.

Let us consider the scenario where the errors come from the Gaussian random displacement channel, such that $\rho = \mathcal{N}_{disp}[\sigma](|\psi_{GKP}\rangle\langle\psi_{GKP}|)$ and let us focus on the $\hat{q}$ quadrature in the following example. Then after measuring the syndrome $q_0$ we can calculate the probability that the correction operation will result in the logical error. Specifically, we know that although by construction of the measurement, the measured $q_0$ belongs to the interval $[-\sqrt{\pi}/2, \sqrt{\pi}/2)$, it actually corresponds to a sample from the Gaussian distribution centered at $n\sqrt{\pi}$ for some integer n. If n is even, then the correction operation successfully corrects the error otherwise it results in a logical X error. Hence the probability of the logical X for a given measured $q_0$ and for the strength of the Gaussian displacement channel given by the standard deviation $\sigma$ is given by:

$$p[\sigma](q_0) = \frac{\sum_{n\in\mathbb{Z}}\exp[-(q_0-(2n+1)\sqrt{\pi})^2/(2\sigma^2)]}{\sum_{n\in\mathbb{Z}}\exp[-(q_0-n\sqrt{\pi})^2/(2\sigma^2)]}. \tag{S22}$$

For a given $\sigma$ the error probability increases with the $|q_0|$ until it reaches maximum at $|q_0|=\sqrt{\pi}/2$. Intuitively the error correction is less reliable if the measured syndrome is close to the decision boundary, that is the distance to $|\psi_{GKP}\rangle$ and to $X|\psi_{GKP}\rangle$ is similar. We note that in this work we only consider deterministic repeater schemes without post-selection. In such case this information about the probability of error during the correction operation cannot help us during the single mode GKP correction. However, it can facilitate error correction at the second level. Specifically, if after the GKP correction we measure the syndrome of the second-level code and we find that some GKP qubits have undergone a logical error, this analog information from the GKP correction can help us identify which GKP qubits need to be corrected on the second level.

Stabilizer Measurement Using GKP Ancilla Qubit

Figure 10:
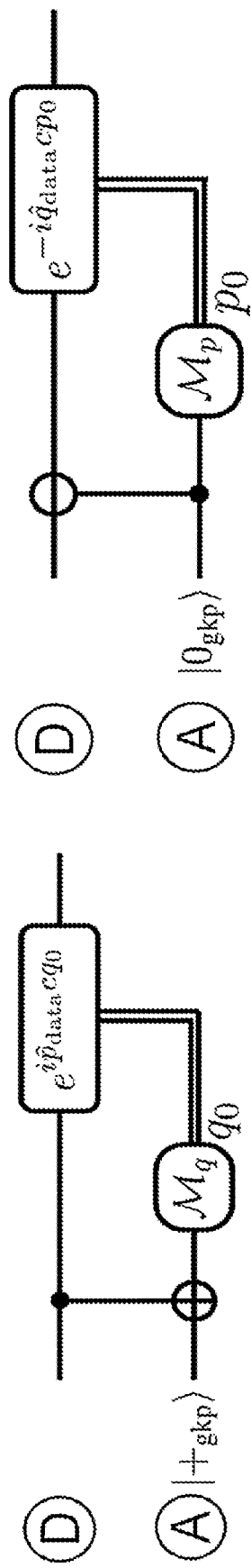
FIG. 10 illustrates Steane error correction of a data qubit using a Gottesman-Kitaev-Preskill (GKP) ancilla qubit, in embodiments.

FIG. 10 illustrates Steane error correction of a data qubit using a GKP ancilla qubit. The data qubit is indicated in FIG. 10 as "D". The ancilla qubit is indicated in FIG. 10 as "A", and may be simply referred to as "the ancilla". To measure $\hat{S}_q$, we prepare the ancilla in the state $|+_{GKP}\rangle$ and apply a sum gate:

$$SUM_{j\to k}=\exp[-i\hat{q}_j\hat{p}_k], \tag{S23}$$

from the data qubit onto the ancilla (see left side of FIG. 10). In FIG. 10, the sum gate of Eqn. S2 is denoted as controlled-$\oplus$ from the data qubit onto the ancilla. This gate shifts the $\hat{q}_{anc}$ quadrature of the ancilla by the amount $\hat{q}_{data}$ of the data qubit. At the same time, it shifts the $\hat{p}_{data}$ quadrature of the data qubit by the amount $-\hat{p}_{anc}$. Since $|+_{GKP}\rangle = \sum_{n\in\mathbb{Z}}|p=2n\sqrt{\pi}\rangle$, the effect on the data mode is effectively the application of $\hat{S}_q$, under which the data mode is invariant. At the same time, since $|+_{GKP}\rangle = \sum_{n\in\mathbb{Z}}|q=n\sqrt{\pi}\rangle$, measuring the ancilla mode after the action of the sum gate using homodyne detection results in precisely measuring $\hat{q}_{data}$ modulo $\sqrt{\pi}$. This can be seen as follows: since after preparation the ancilla was periodic $\hat{q}_{ancilla}=0$ modulo $\sqrt{\pi}$, the only information we can infer from the outcome is the deviation from this periodicity, that is $q_0$, which is the measured value modulo $\sqrt{\pi}$ and which has been imprinted on the ancilla by the data qubit. Therefore from now we will refer to $q_0$ as the outcome of this measurement. As described before, the data mode is subsequently displaced back by the measured amount $q_0$. The procedure to measure $\hat{S}_p$ is similar. It requires a GKP ancilla in the state $|0_{GKP}\rangle$ and the action of the inverse SUM gate $SUM_{j\to k}^{-1}=\exp[i\hat{q}_j\hat{p}_k]$, this time from the ancilla onto the data mode. Subsequent measurement of the ancilla allows us now to measure $\hat{p}_{data}$ modulo $\sqrt{\pi}$.

Let us now consider the scenario where the ancilla GKP states are imperfect. As explained in Methods in the main body of the paper we can model such states as ideal GKP states that have been displaced by some small amount $(\xi_q^{GKP}, \xi_p^{GKP})$, where both of these quantities follow a Gaussian distribution with mean zero and standard deviation $\sigma_{GKP}$. These imperfections cause additional errors. Let us consider the measurement of $\hat{S}_q$. Firstly, measuring the ancilla results now in measuring $(\hat{q}_{data}+\xi_q^{GKP})$ modulo $\sqrt{\pi}$. Thus now, even if the error displacement on the data mode and the measured $q_0$ were smaller in magnitude than $\sqrt{\pi}/2$, the correction displacement will correct the original error but will also imprint a new residual displacement of $-\xi_q^{GKP}$ on the data mode. Secondly, there will be a back-action onto the $\hat{p}_{data}$ quadrature of the data mode, which after the SUM gate will undergo a transformation $\hat{p}_{data} \to \hat{p}_{data} - \xi_p^{GKP}$. Similarly measuring $\hat{S}_p$ with imperfect ancilla will result in measuring $p_{data} + \xi_p^{GKP}$ modulo $\sqrt{\pi}$ and in a back-action error of $\hat{q}_{data} \to \hat{q}_{data} - \tau_q^{GKP}$.

Supplementary Note 2: Overcoming Finite GKP Squeezing by Rescaling the GKP Syndrome In this Supplementary Note, we describe a procedure of reducing the noise contributed by finite GKP squeezing during the correction feedback displacement. The error resulting from measuring $\hat{q}_{data} + \xi_q^{GKP}$ modulo $\sqrt{\pi}$ rather than $\hat{q}_{data}$ modulo $\sqrt{\pi}$ (and similarly for the $\hat{p}$ quadrature) can be significantly reduced by rescaling the subsequent displacement operation, as shown in FIG. 10. Specifically, let $$R_s(x) = x - s\left\lfloor \frac{x}{s} + \frac{1}{2} \right\rfloor. \tag{S24}$$

That is $R_{\sqrt{\pi}}(x)$ denotes the value of x modulo $\sqrt{\pi}$ shifted to the interval $[-\sqrt{\pi}/2, \sqrt{\pi}/2)$. Then the measured value of the syndrome in the $\hat{q}$ quadrature is:

$$q_0 = R_{\sqrt{\pi}}(\hat{q}_{data} + \xi_q^{GKP}). \tag{S25}$$

We can now improve the performance of our error correction procedure by applying the displacement in the $\hat{q}$ quadrature not by $-q_0$ but rather by $-cq_0$. Here c is the constant that depends on the distribution governing the data and ancilla errors. The idea of rescaling the syndrome to compensate for the ancilla noise has been previously used to combine it with post-selection based on the syndrome outcome to reduce the error probability. In this work, by contrast, we always perform the recovery operation and output the corrected state. We know that the ancilla error $\xi_q^{GKP}$ comes from a normal distribution with mean zero and standard deviation $\sigma_{GKP}$. Similarly let us assume that the error on the data qubit comes also from an action of a Gaussian random displacement channel with standard deviation $\sigma_{data}$ and let us denote it as $\xi_q^{data}$. Then we want to find c that minimizes the variance of the error after correction, that is we want to minimize $\text{Var}(\xi_q^{data} - cq_0)$. Since for the error distributions that we consider in our simulations, in most cases the sum of the samples of the data and ancilla errors will be in the interval $[-\sqrt{\pi}/2, \sqrt{\pi}/2)$, and since we are only looking for a heuristic method for optimizing c, for the purpose of this calculation we shall approximate $q_0 \approx \xi_q^{data} + \xi_q^{GKP}$. Since the error distributions for the data and ancilla errors are independent we can easily establish that $\text{Var}(\xi_q^{data} - c(\xi_q^{data} + \xi_q^{GKP}))$ is minimized for $$c_{opt} = \frac{\sigma_{data}^2}{\sigma_{data}^2 + \sigma_{GKP}^2}, \tag{S26}$$

and such minimum variance is:

$$\text{Var}(\xi_q^{data} - c_{opt}(\xi_q^{data} + \xi_q^{GKP})) = c_{opt}\sigma_{GKP}^2. \tag{S27}$$

We note that since $\xi_q^{data}$ and $\xi_q^{GKP}$ follow a normal distribution with mean zero, $\xi_q^{data} - c_{opt}(\xi_q^{data} + \xi_q^{GKP})$ also follows a normal distribution with mean zero. Of course the actual distribution of the residual displacements after correction is given by $\xi_q^{data} - c_{opt}R_{\sqrt{\pi}}(\xi_q^{data} + \xi_q^{GKP})$ which is not Gaussian. From the formulas given in Eqns. S5 and S6, we see that the reduction of errors by using $c_{opt}$ rather than $c=1$ is greater, the smaller $\sigma_{data}$ relative to $\sigma_{GKP}$. We have also numerically verified in our simulation that the above heuristic is a good estimate for the optimal c and enables us to significantly improve our GKP error correction procedure.

We have seen that the value of the optimal rescaling coefficient depends on $\sigma_{data}$, the standard deviation of the effective Gaussian random displacement channel describing all the processes that could have shifted the state away from the code space. If we have a sequence of error correction rounds, then $\sigma_{data}$ will include the residual displacement error from the previous correction round. In other words the residual displacement with variance $c_{opt}\sigma_{GKP}^2$ after a given error correction round can be seen as coming from a noise process contributing to $\sigma_{data}$ used to calculate $c_{opt}$ for the next correction round. Therefore the optimal rescaling coefficients at consecutive rounds depend on each other. Below we provide a recipe how to track these coefficients for a sequence of error correction rounds.

Translationally Invariant Sequence

First, let us consider a simple scenario where we have a translationally invariant symmetry in our sequence of error correction operations. That is, the error channel between two consecutive GKP correction rounds is always the same and so the system is translationally invariant with respect to any number of correction rounds. In this case, the value of $c_{opt}$ will be the same at every correction round. This means that $\sigma_{data}(c_{opt})$ depends on exactly the same $c_{opt}$ that we want to calculate in Eqn. S5. Hence, the relation can be solved for $c_{opt}$ as follows. First, we note that $\sigma_{data}^2$ will have a contribution from the residual displacement after imperfect error correction and from the noise added between the correction rounds whose standard deviation we will denote as $\sigma_{noise}$. Therefore:

$$\sigma_{data}^2 = c_{opt}\sigma_{GKP}^2 + \sigma_{noise}^2. \tag{S28}$$

Substituting this formula into Eqn. S5 and solving for $c_{opt}$ we obtain:

$$c_{opt} = \frac{\sigma_{noise}}{2\sigma_{GKP}^2}\left(-\sigma_{noise} + \sqrt{\sigma_{noise}^2 + 4\sigma_{GKP}^2}\right) \tag{S29}$$

This is the value of $c_{opt}$ that should be then used during each correction round.

General Case

The difficult situation arises if the system is not translationally invariant with respect to each GKP correction round as in that case $c_{opt}$ will assume a different value after each correction round. In this scenario the optimization problem is more complex due to all the dependencies of $c_{opt}$ between consecutive correction rounds.

We will start by solving a simpler problem, in which we have a chain of GKP syndrome measurements but we postpone the correcting displacement operation until the end of the chain and we aim to minimize the quadrature noise variance only at the end of the chain. For each quantity w for a scenario in which the feedback displacement is applied immediately after syndrome measurement, we will use $\tilde{w}$ to denote the corresponding quantity for such a postponed scenario. Then we will show how to minimize the variance $\text{Var}(\tilde{\xi}_{final})$, where $$\tilde{\xi}_{final} = \tilde{\xi}_{data} - \sum_{i=1}^{n} \tilde{c}_i \tilde{\xi}_{ancilla}^{(i)}. \tag{S30}$$

Here $\xi_{data}$ denotes the error displacement accumulated until the end of the chain of n error channels and syndrome extractions and $\xi_{ancilla}^{(i)}$ denotes the total noise on the $i^{th}$ ancilla GKP mode which consists of the consecutive GKP error shifts accumulated along the chain from the beginning of the chain until the $i^{th}$ syndrome extraction together with the imperfect ancilla GKP noise. We depict the corresponding quantum circuit on the top in FIG. 11. We see that at the end we apply a displacement operation where the displacement value is given by the sum of $\xi_{ancilla}^{(i)}$ weighted by the rescaling coefficients which we want to optimize over. We again note that we linearized the problem by assuming that we know $\xi_{ancilla}^{(i)}$ for each i, while in fact we only measure the noise displacements modulo $\sqrt{\pi}$. In the postponed scenario this is not a valid approximation, while in the scenario where the displacement operation is applied directly after each round of syndrome extraction this approximation can be justified by the fact that by giving the immediate feedback we keep each $\xi_{ancilla}^{(i)}$ small. However, we will show that the simpler problem with a postponed displacement scenario can be in fact mapped onto a real-time-feedback scenario. Therefore, we will start by solving the postponed scenario.

Quadratic Problem in the Postponed Scenario

We note that the variance $\text{Var}(\xi_{final})$ can be written as:

$$\text{Var}(\xi_{final}) = \text{Var}(\xi_{data}) - \tilde{c}_i \sum_{i=1}^{n} \text{Cov}\left(\xi_{data}, \xi_{ancilla}^{(i)}\right) - \quad (S31)$$

$$\tilde{c}_i \sum_{i=1}^{n} \text{Cov}\left(\xi_{ancilla}^{(i)}, \xi_{data}\right) + \sum_{i,j=1}^{n} \tilde{c}_i \tilde{c}_j \text{Cov}\left(\xi_{ancilla}^{(i)}, \xi_{ancilla}^{(j)}\right).$$

By noting that $\text{Cov}(\xi_{data}, \xi_{ancilla}^{(i)}) = \text{Cov}(\xi_{ancilla}^{(i)}, \xi_{data})$, we can write this function as:

$$\text{Var}(\xi_{final}) = a + \vec{b}^T \vec{x} + \vec{x}^T A \vec{x}, \quad (S32)$$

where $$a = \text{Var}(\xi_{data}), \quad (S33)$$

$$\vec{b} = -2\begin{pmatrix} \text{Cov}\left(\xi_{data}, \xi_{ancilla}^{(1)}\right) \\ \text{Cov}\left(\xi_{data}, \xi_{ancilla}^{(2)}\right) \end{pmatrix},$$

and A is the covariance matrix between all the $\xi_{ancilla}^{(i)}$. Finally, $\vec{x}$ is the vector of the rescaling coefficients $\{\tilde{c}_i\}_i$ over which we want to minimize the total variance. Now we note that $$\text{Cov}(\xi_{data}, \xi_{ancilla}^{(i)}) = \text{Var}(\xi_{ancilla}^{(i)}) - \sigma_{GKP}^2,$$

$$a = \text{Var}(\xi_{ancilla}^{(n)}) - \sigma_{GKP}^2. \quad (S34)$$

The first line in Eqn. S13 follows from the fact that the noise $\xi_{ancilla}^{(i)}$ accumulated on the ancilla includes a part of $\xi_{eta}$, namely the noise transferred using a SUM gate during the $i^{th}$ syndrome measurement, and the noise from the preparation of the ancilla GKP state with standard deviation $\sigma_{GKP}$. The transferred noise appears both on the data and the ancilla qubits, while the preparation noise contributes only to the ancilla. Hence the covariance is exactly the noise transferred using the SUM gate, whose variance is given by $\text{Var}(\xi_{ancilla}^{(i)}) - \sigma_{GKP}^2$. The second line in Eqn. S13 follows the same argument with respect to the last syndrome measurement denoted with index n.

Now we need to establish some basic properties of A. Since A is a covariance matrix, it is symmetric and positive-semidefinite. Moreover, it is the covariance matrix between the GKP ancillas and each GKP ancilla has a contributing noise factor from an imperfect GKP state preparation. These preparation noise contributions are independent for each ancilla. Therefore the total noise distributions on all the ancillas are independent which means that A is positive definite. This implies that the minimized variance is given by:

$$\min \text{Var}(\xi_{final}) = a - \frac{1}{4}\vec{b}^T A^{-1} \vec{b}, \quad (S35)$$

and the values of optimal $\{\tilde{c}_{i,opt}\}_i$ coefficients are given by:

$$\vec{x}_0 = \frac{-1}{2} A^{-1} \vec{b}. \quad (S36)$$

Real-Time Resealing Factors

Figure 11:
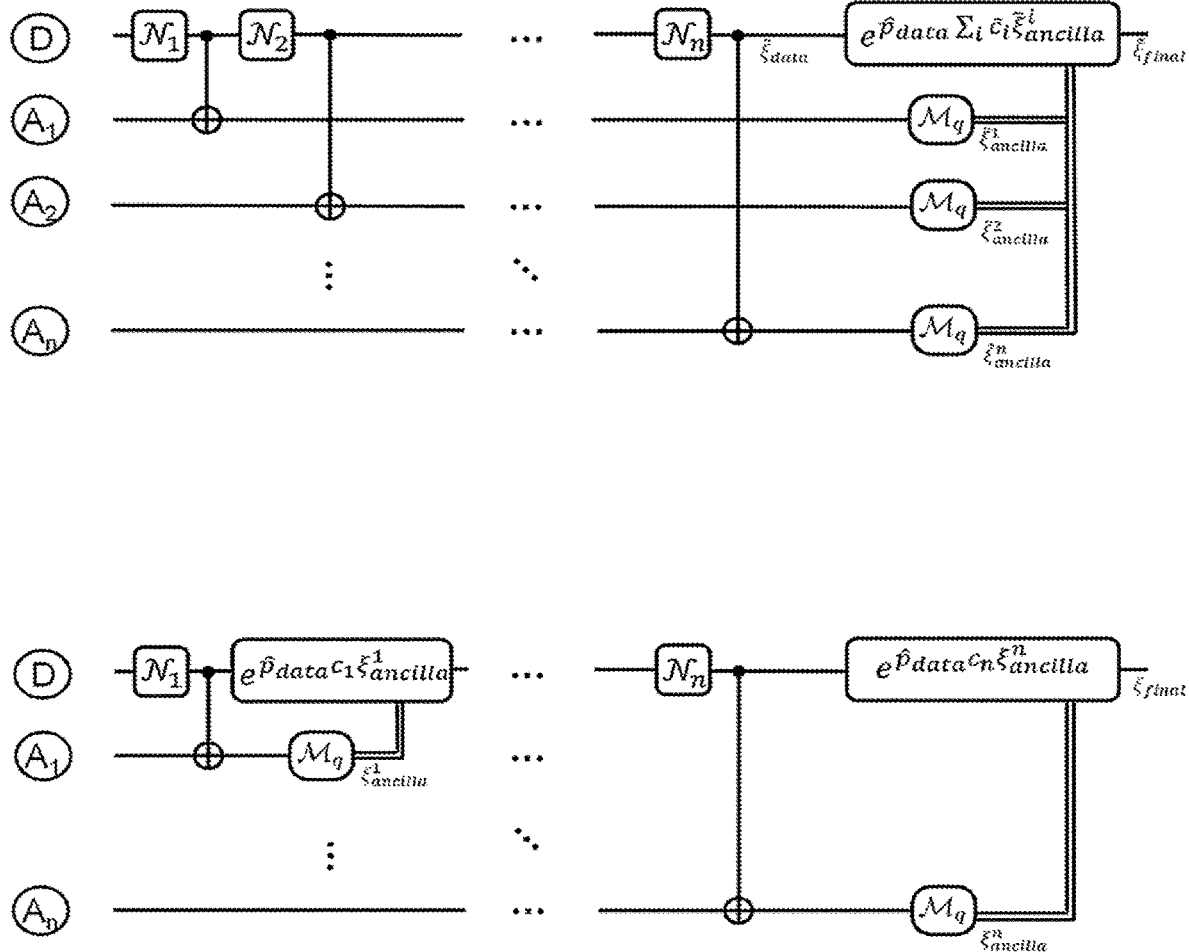
FIG. 11 illustrates a sequence of GKP syndrome measurements with feedback displacement using rescaling coefficients, in embodiments.

Now we will show that the above problem of finding postponed coefficients enables us to also find the real-time coefficients for the case in which the displacement operation is applied directly after each GKP syndrome measurement, as shown on the bottom in FIG. 11. Hence, we will show how to find the optimal real-time coefficients $c_{opt}$ as a function of the optimal postponed coefficients $\tilde{c}_{opt}$.

We will start by finding $\{\tilde{c}_i\}_i$ as a function of $\{c_i\}_i$ and then invert the relation. We will also denote $\xi_{ancilla}^{(i)}$ the total noise on the GKP ancilla i in the real-time scenario. To be able to map the real-time problem onto the postponed problem we need to be able to express $\xi_{ancilla}^{(i)}$ in terms of $\tilde{\xi}_{ancilla}^{(i)}$. This can be done using the following recurrence relation:

$$\xi_{ancilla}^{(k)} = \tilde{\xi}_{ancilla}^{(k)} - \sum_{i=1}^{k-1} c_i \xi_{ancilla}^{(i)}. \quad (S37)$$

That is the noise accumulated on the ancilla in the real-time scenario is given by the corresponding noise in the postponed scenario plus all the corrections that have been done real time up to the $k^{th}$ syndrome measurement (corrections have a negative sign). Those corrections again depend on the real-time syndromes measured in the previous GKP syndrome measurement rounds. Since the noise channels $\{\mathcal{N}_i\}_i$ acting on the data GKP qubit are the same in both scenarios, we can think that $\xi_{data} = \tilde{\xi}_{data}$ stays the same, but the effective sum of all the correction displacements has value $-\Sigma_{i=1}^{n} c_i \xi_{ancilla}^{(i)}$ for the real-time scenario now. To find the relation $\tilde{c}_k = f_k(\{c_i\}_i)$, we need to find the functions $f_k$ such that:

$$\sum_{i=1}^{n} c_i \xi_{ancilla}^{(i)} = \sum_{i=1}^{n} f_i(\{c_j\}_j) \tilde{\xi}_{ancilla}^{(i)}. \quad (S38)$$

Substituting $\xi_{ancilla}^{(i)}$ from Eqn. S16 into $\Sigma_{i=1}^{n} c_i \xi_{ancilla}^{(i)}$, we now investigate the coefficients in front of the $\tilde{\xi}_{ancilla}^{(k)}$ term. Firstly there will be the term $c_k$ coming from the term with i=k in the sum $\Sigma_{i=1}^{n} c_i \xi_{ancilla}^{(i)}$. Then there will be contributions from the terms in which i>k in that sum. In this case we will have the terms that look like $-c_i c_k$ times the product of −c's with subscripts in the range from k+1 to i−1 and without repetition. The sum includes the terms with all the distinct choices of the subscripts as well as the term with the choice of no subscripts in which case −$c_i c_k$ is just multiplied by 1. If i=k+1 we only have a single term with just −$c_i c_k$.

Hence, the functions $f_k$ can be written as:

$$\tilde{c}_k = f_k(\{c_i\}_i) = c_k \left( 1 - \sum_{i=k+1}^{n} c_i \sum_{j=1}^{2^{i-1-k}} \prod_{l \in W_{k,i}^j} l \right), \text{ for } k < n, \quad (S39)$$

$$\tilde{c}_n = c_n.$$

Here let us denote by $W_{k,i}$ the set such that:

$$W_{k,i} = \begin{cases} \{1, -c_{k+1}, -c_{k+2}, \ldots, -c_{i-1}\} & \text{if } i > k+1, \\ \{1\} & \text{if } i \le k+1 \end{cases}. \quad (S40)$$

Then by $W_{k,i}^j$, where $j \in \{1, 2, \ldots, 2^{i-1-k}\}$ and $i \ge k+1$ we denote the $2^{i-1-k}$ distinct subsets of $W_{k,i}$ such that:

$W_{k,i}^j \subseteq W_{k,i}$ and $1 \in W_{k,i}^j \forall j \in \{1,2,\ldots,2^{i-1-k}\}, W_{k,i}^j \ne W_{k,i}^l$ for $j \ne l$. \quad (S41)

The final step is to invert the relation in Eqn. S18, to find the function $c_k = g_k(\{\tilde{c}_i\}_i)$. For k<n this can be done as follows:

$$\tilde{c}_k = c_k \left( 1 - c_{k+1} - \sum_{i=k+2}^{n} c_i \sum_{j=1}^{2^{i-1-k}} \prod_{l \in W_{k,i}^j} l \right)$$

$$= c_k \left( 1 - c_{k+1} - \sum_{i=k+2}^{n} c_i \left( -c_{k+1} \sum_{j=1}^{2^{i-2-k}} \prod l_{l \in W_{k+1,i}^j} + \sum_{j=1}^{2^{i-2-k}} \prod l_{l \in W_{k+1,i}^j} \right) \right)$$

$$= c_k \left( 1 - c_{k+1} \left( 1 - \sum_{i=k+2}^{n} c_i \sum_{j=1}^{2^{i-2-k}} \prod l_{l \in W_{k+1,i}^j} \right) - \sum_{i=k+2}^{n} c_i \sum_{j=1}^{2^{i-2-k}} \prod l_{l \in W_{k+1,i}^j} \right)$$

$$= c_k \left( 1 - \tilde{c}_{k+1} - \sum_{i=k+2}^{n} c_i \sum_{j=1}^{2^{i-2-k}} \prod l_{l \in W_{k+1,i}^j} \right)$$

$$= \ldots$$

$$= c_k \left( 1 - \tilde{c}_{k+1} - \tilde{c}_{k+2} - \sum_{i=k+3}^{n} c_i \sum_{j=1}^{2^{i-3-k}} \prod l_{l \in W_{k+2,i}^j} \right)$$

$$= c_k \left( 1 - \sum_{i=k+1}^{n} \tilde{c}_i \right). \quad (S42)$$

Here, in the second line we split the $$\sum_{j=1}^{2^{i-1-k}} \prod_{l \in W_{k,i}^j}$$

l expression into two terms: the term that includes −$c_{k+1}$ and the one which does not. For the term which includes −$c_{k+1}$, we take it out and for both terms the sum over j now involves only the sets $W_{k+1,i}^j$. In the fourth line, we notice that the second term inside the outer brackets in the third line is just $\tilde{c}_{k+1}$.

Hence:

$$c_k = \frac{\tilde{c}_k}{1 - \sum_{i=k+1}^{n} \tilde{c}_i}. \quad (S43)$$

Since we have established one-to-one relations:

$c_k = g_k(\{\tilde{c}_i\}_i),$ $\tilde{c}_k = f_k(\{c_i\}_i),$ \quad (S44)

it follows that the optimal real-time rescaling factors are given by $c_{k,opt} = g_k(\{\tilde{c}_{i,opt}\}_i)$. This is because if we assume that there exists a set of real-time coefficients $\{c_i\}_i$ which leads to smaller variance than $g_k(\{\tilde{c}_{i,opt}\}_i)$, then for this $\{c_i\}_i$ we could calculate $\tilde{c}_k = f_k(\{c_i\}_i)$ for all k which would give the same variance in the postponed scenario and that variance would be smaller than given in Eqn. S14, which is a contradiction. Therefore, the optimal real-time rescaling factors are given by $c_{k,opt} = g_k(\{\tilde{c}_{i,opt}\}_i)$.

Moreover, although we know that the obtained rescaling coefficients minimize the final variance at the end of the chain of GKP syndrome measurements and GKP correction operations, we know from Eqns. S5 and S6, that the minimum variance at the end is obtained for the scenario in which the final $c_{n,opt}$ is the smallest. This is achieved when $\sigma_{data}^2$ before the last correction round was minimized for the fixed $\sigma_{GKP}^2$. Since this $\sigma_{data}^2$ has a contribution from $c_{n-1} \sigma_{GKP}^2$, minimizing $\sigma_{data}^2$ corresponds to minimizing the residual variance $c_{n-1} \sigma_{GKP}^2$ after the penultimate correction. This recursive dependency shows that minimizing the variance at the end in the real-time scenario corresponds to actually minimizing it after each GKP correction round. This guarantees than the variance stays as low as possible all the time and justifies the application of our linearized model to the actual scenario in which we do not measure the actual noise displacement, but only its value modulo $\sqrt{\pi}$. When the variance is kept low at all times, we make sure that the probability that the actual noise displacement differs from the noise displacement modulo $\sqrt{\pi}$ is as low as possible, hence making the optimal real-time rescaling coefficients obtained in the linearized model applicable to the actual scenario.

Comment about Numerical Evaluation

An important observation is that the optimal rescaling coefficients in the postponed scenario can differ by many orders of magnitude. In general, the last coefficient is of the order of magnitude of $\tilde{c}_{n,opt} \sim 10^{-1}$, while for around n=40 syndrome measurements in the chain, the first optimal coefficient will be of the order $\tilde{c}_{1,opt} \sim 10^{-31}$. This behavior is intuitive, since for a long chain of noisy channels and syndrome measurements, in the postponed scenario more weight will be given to the last syndromes which carry more information about the total noise than the initial syndromes. When converting the postponed coefficients to the real-time ones, all the real-time coefficients are again of the order $10^{-1}$. This is because for the first few real-time coefficients, in the Eqn. S22 we divide a small $\tilde{c}_k$ by an also small $1 - \Sigma_{i=k+1}^{n} \tilde{c}_i$. This means that the rescaling factors $\{\tilde{c}_i\}_i$ need to be calculated with very high level of accuracy in order to obtain reliable values of $\{c_i\}_i$. Mathematically, the difficulty arises at the step of taking the inverse of the matrix A whose eigenvalues differ by four orders of magnitude. Hence the crucial step is to calculate A to very high accuracy before calculating its inverse. In our analysis we find one scenario in which this issue becomes a limitation, namely for the parameters considered in FIG. 4 in the main body of the paper we find that we can reliably calculate a chain of maximum 48 rescaling coefficients. This means that for the hybrid architecture based on the [[7,1,3]] code, for the scenario with one type-A repeater per 10 km, we can directly calculate the chain of only up to 34 type-B repeaters per 10 km. Therefore, for the cases with 35 to 39 type-B repeaters per 10 km we obtain the near-optimal rescaling coefficients by extrapolating from shorter chains.

Supplementary Note 3: Application of the GKP Code for Quantum Communication

We have already shown the usefulness of the GKP code for correcting errors arising from the action of the Gaussian random displacement channel. Yet the absorption or scattering of photons in the optical fiber does not correspond to such a channel. In this Supplementary Note, we therefore describe how we can effectively transform the action of a lossy optical fiber into such a Gaussian random displacement channel.

Transmission through the optical fiber can be modelled by a pure-loss channel whose action is given by:

$$\mathcal{N}_{loss}[\eta](\rho) = \text{Tr}_B[\hat{B}(\eta)(\rho_A \otimes |0\rangle \langle 0|_B) \hat{B}^\dagger(\eta)]. \tag{S45}$$

Here $\hat{B}(\eta)$ is the unitary corresponding to the action of a beam-splitter with transmissivity $\eta$ acting on the two input modes corresponding to states $\rho$ and the vacuum state $|0\rangle$. For optical fiber the transmissivity decays exponentially with communication distance L, such that we can write the transmissivity as:

$$\eta = \eta_0 e^{-L/L_0}. \tag{S46}$$

Here $\eta_0$ is the efficiency of coupling the photons in and out of the fiber and $L_0$ is the attenuation length of the fiber. For commercially available fiber at telecom frequency we have $L_0 = 22$ km. Let us now also define a quantum-limited amplification channel whose action can be described as:

$$\mathcal{A}_{amp}[G](\rho) = \text{Tr}_B[\hat{S}_2(G)(\rho_A \otimes |0\rangle \langle 0|_B) \hat{S}_2^\dagger(G)]. \tag{S47}$$

Here $\hat{S}_2(G)$ is the two-mode squeezing unitary with gain G. Now, if the sender knows the transmissivity of the pure-loss channel and before sending the state $\rho$, they first apply the quantum-limited amplification with $G=1/\eta$, then the effective action of both channels is precisely the Gaussian random displacement channel:

$$\mathcal{N}_{loss}[\eta] \cdot \mathcal{A}_{amp}[1/\eta] = \mathcal{N}_{disp}[\sigma = \sqrt{1-\eta}]. \tag{S48}$$

This shows the usefulness of the GKP code in our quantum communication scenario.

Supplementary Note 4: Approximations for Performance Estimates of GKP Repeater Chain Analytical modeling of the quantum repeater chain based on concatenated GKP and discrete-variable codes would be a very challenging task. Therefore we have developed a detailed numerical simulation to investigate this complex behavior. On the other hand, the scenario of a GKP repeater chain in which we only consider one level of encoding based on the GKP code is much simpler to analyze. Therefore, for that case we develop an analytical model that enables us to efficiently evaluate its performance for different parameter sets. In this Supplementary Note, we describe the details of this analytical model and describe the approximations that allow us to easily integrate finite GKP squeezing into the model.

Logical Error Probability for Ideal GKP States

Here we provide simple estimates of the logical error probability of the square lattice GKP code for error correction. Let us first focus on ideal correction using infinitely squeezed ancilla GKP states. For the errors resulting from the Gaussian random displacement channel with standard deviation $\sigma$ defined in Methods in the main body of the paper, the logical error probability can be approximated by finding the probability that in one of the $(\hat{q}, \hat{p})$ quadratures the displacement is larger in magnitude than the critical value $$\frac{\sqrt{\pi}}{2}:$$

$$P_{err}(\sigma) = \frac{1}{2\pi\sigma^2} \int_{|q|>\sqrt{\pi}/2 \vee |p|>\sqrt{\pi}/2} dq\,dp\, \exp\left[-\frac{q^2+p^2}{2\sigma^2}\right]. \tag{S49}$$

In fact, this formula is an upper bound on the logical error probability, since displacements in $\hat{q}$ or $\hat{p}$ whose magnitude lies in the interval $$\left[\frac{3\pi}{2}, \frac{5\pi}{2}\right)$$

or any other subsequent interval of length $\pi$ with an even multiple of $\pi$ at its center can also be corrected. However, the probability of so large error displacements is generally negligible for the values of a that we will consider here.

The function $P_{err}(\sigma)$ can be approximated by integrating it over a circular rather than square boundary. In particular, we can overestimate the error by performing the integration over the region outside of a circle centered at the origin with radius $\sqrt{\pi}/2$. This leads to an upper bound on $P_{err}(\sigma)$ which has been calculated in the prior art. On the other hand by considering a larger circle with radius equal to half of the diagonal of the square, $\sqrt{\pi/2}$ we can establish a lower bound on this logical error probability. Unfortunately, we find that the gap between these two bounds is too large to be useful for our practical estimates. Therefore we will consider here a numerical evaluation of the integral. Specifically, we will consider separately the probability of X and Z error. Since by symmetry this probability is the same for both errors we will denote it as:

$$P_{err,XZ}(\sigma) = \frac{1}{\sqrt{2\pi}\sigma} \int_{|x|>\sqrt{\pi}/2} dx \exp\left[-\frac{x^2}{2\sigma^2}\right] = \text{erfc}\left(\sqrt{\frac{\pi}{8\sigma^2}}\right), \quad (S50)$$

where $$\text{erfc}(z) = \frac{2}{\sqrt{\pi}} \int_z^\infty e^{-t^2} dt$$

is me complementary error function.

Incorporating Finite GKP Squeezing into the Channel Noise

Now let us consider error correction using imperfect GKP ancillas. We will show that this case can be approximated by a scenario in which perfect GKP correction is performed using an infinitely squeezed ancilla, however with additional Gaussian random displacement channels preceding and following the error correction procedure. Let us start by considering error correction using a finitely squeezed ancilla with its squeezing parameterized by the standard deviation $\sigma_{GKP}$. Let us consider error correction in the $\hat{q}$ quadrature and let $\xi_q^{GKP}$ denote the displacement error on the GKP ancilla due to finite squeezing. Then after the error correction procedure, the $\hat{q}$ quadrature has undergone the transformation:

$$EC_{exact}: \hat{q}_{data} \to \hat{q}_{data} - cR_{\sqrt{\pi}}(\hat{q}_{data} + \xi_q^{GKP}). \quad (S51)$$

Here we will show that in the relevant case, we can approximate this evolution by a different transformation, namely:

$$EC_{approx}: \hat{q}_{data} \to (\hat{q}_{data} + \xi_q^{GKP}) - R_{\sqrt{\pi}}(\hat{q}_{data} + \xi_q^{GKP}) - \alpha \xi_q'^{GKP}. \quad (S52)$$

Here $\xi_q^{GKP}$ and $\xi_q'^{GKP}$ are independent Gaussian random variables with zero mean and standard deviation $\sigma_{GKP}$ and $\alpha$ is a coefficient we will optimise. The importance of this approximation step is that the transformation $EC_{approx}$ can be interpreted as follows. Before the correction operation, the quantum state has been subjected to a Gaussian random displacement channel with standard deviation $\sigma_{GKP}$. Then ideal GKP correction has been performed, such that the quantum state has been brought back into the code space. Finally, the quantum state has been subjected to another Gaussian random displacement channel with standard deviation $\alpha\sigma_{GKP}$. Hence, under this model we transfer the imperfection of the GKP ancillas into the channel acting on the data mode.

In order to make the approximation reliable we want to find a such that the approximate distribution is as close to the exact distribution as possible. Clearly the mean of both distributions is the same and is equal to zero. Yet both the exact and the approximate distributions are non-Gaussian because of the $R_{\sqrt{\pi}}$ component, which however differs from identity function only in the less likely scenarios in which its argument has an absolute value larger than $\sqrt{\pi}/2$. Therefore we will look for the optimal a again under the assumption that we can approximate $q_0$ given in Eqn. S4 as $q_0 \approx \xi_q^{data} + \xi_q^{GKP}$. In this case both the exact and approximate distributions become Gaussian and so to make them the same we need to find a such that they both have the same variance. The variance of the approximate distribution is then simply: $\text{Var}_{approx} = \alpha^2 \sigma_{GKP}^2$. In general the variance of the exact distribution is $\text{Var}_{exact} = (1-c)^2 \sigma_{data}^2 + c^2 \sigma_{GKP}^2$. However, we have already seen that for the optimal rescaling coefficient $c=c_{opt}$ given in Eqn. S5, the variance is given by Eqn. S6. Since here we are only interested in the case where the optimal rescaling coefficient is used, we can obtain the same variance for the approximate distribution by setting $\alpha=\sqrt{c_{opt}}$. Hence, the considered approximation leads to a probability distribution with the same mean as the exact transformation, it has the same condition for the logical $\sqrt{\pi}$ shift as the exact transformation and under the linearization approximation it also has the same variance as the exact distribution.

Thus we have constructed an analytical model of the GKP error correction with imperfect ancilla modes by approximating it with perfect correction that brings the state back to the code space. In this approximation however, before and after the correction the data mode is additionally subjected to Gaussian random displacement channels with standard deviations $\sigma_{GKP}$ and $\sqrt{c_{opt}}\sigma_{GKP}$ respectively, where $c_{opt}$ is the optimal rescaling coefficient used during the correction operation. We numerically verify the reliability of this approximation in the relevant parameter regime. Specifically, the analytical model of a GKP repeater chain which is based on this approximation is validated against a numerical Monte-Carlo simulation. We refer the reader to Supplementary Note 5 for the details of the analytical model and to Section IV above for the details on the corresponding Monte-Carlo simulation.

Supplementary Note 5: GKP Repeater Chain Architecture

Figure 12:
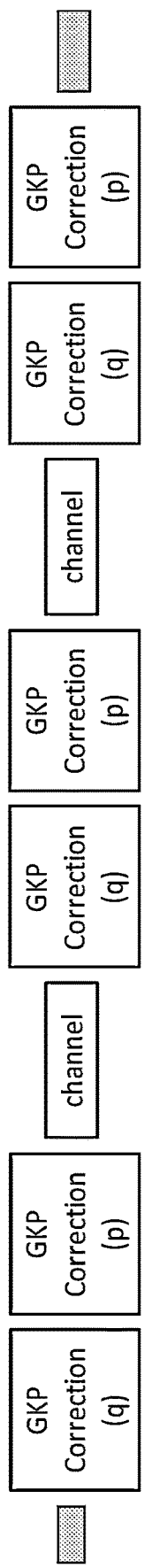
FIG. 12 is a schematic diagram of a GKP repeater chain architecture, in an embodiment.

Now we will consider a specific repeater architecture in which each GKP data qubit is transmitted between subsequent GKP correction stations. These stations in sequence perform first correction in $\hat{q}$ quadrature and then in $\hat{p}$ quadrature, as shown in FIG. 12. We can now establish the total noise channel that combines the effects of both the pure-loss channel during transmission and error correction using finitely squeezed ancillas. We note that we use the approximation of transferring the noise from the imperfect ancilla modes into the channel described in Supplementary Note 4 only for the purpose of obtaining estimates of the performance of the GKP repeater chain. In the Monte-Carlo simulations of our repeater schemes we consider the finite squeezing of the ancilla modes inside repeaters and the lossy communication channels separately.

Let us now consider the $\hat{q}$ quadrature and all the errors arising between two consecutive corrections in that quadrature. In our GKP repeater station we firstly correct errors in $\hat{q}$ quadrature and then in $\hat{p}$ quadrature. Hence, the first error process that takes the state outside of the code space is the noisy channel directly after the correction as described in Supplementary Note 4. The random displacement corresponding to this noise process has magnitude $\sqrt{c_{opt}}\xi_q^{GKP}$, where $\xi_q^{GKP}$ comes from a Gaussian distribution with standard deviation $\sigma_{GKP}$. Then we have another $\xi_q'^{GKP}$ from the back-action during the $\hat{p}$ quadrature correction followed by the error from the transmission channel $\xi_q^{trans}$ and finally the last $\xi_q^{GKP}$ again due to the imperfect ancilla in the $\hat{q}$ quadrature correction as described in Supplementary Note 4. Since all these four errors come from four independent Gaussian random displacement channels, they could be combined into a single channel by noting that a sum of independent normally distributed random variables is itself a normal random variable with the mean and the variance given by the sum of the means and variances respectively of the individual distributions. Hence, we can model our repeater architecture as consisting of ideal GKP (type-B)

repeaters that correct errors arising due to the action of a Gaussian random displacement channel with variance $\sigma_{\it{eff}}^2$ given by:

$$\sigma_{\it{eff}}^2 = \sigma_{trans}^2 + (2+c_{opt})\sigma_{GKP}^2 = (1-\eta_0 e^{-L/L_0}) + (2+c_{opt})\sigma_{GKP}^2, \quad (S53)$$

where $$\sigma_{trans}^2 = 1 - \eta_0 e^{-L/L_0} \quad (S54)$$

Here $\eta_0$ is the photon coupling efficiency at the repeaters, L is the repeater spacing and $L_0$ is the attenuation length of the optical fiber. Now let us evaluate the rescaling coefficient $c_{opt}$. The considered GKP repeater chain is an example of a translationally invariant scenario described in Supplementary Note 2. Hence, to establish $c_{opt}$ we need to establish $\sigma_{noise}^2$ which is the variance of the effective Gaussian noise contributed by the environment between two consecutive GKP correction rounds. We note that $\sigma_{noise}^2$ is not evaluated under the model of transferring noise from the GKP ancilla into the channel, as $c_{opt}$ is calculated by comparing the error accumulated on the data qubit up to the correction operation relative to the error on the imperfect ancilla. Hence, we have that:

$$\sigma_{noise}^2 = \sigma_{GKP}^2 + \sigma_{trans}^2. \quad (S55)$$

The two terms include the error due to back-action of the GKP correction in the other quadrature and the error due to the communication channel.

Plugging this into the formula for $c_{opt}$ in Eqn. S8 gives:

$$c_{opt} = \frac{-\sigma_{GKP}^2 - \sigma_{trans}^2 + \sqrt{(\sigma_{GKP}^2 + \sigma_{trans}^2)(5\sigma_{GKP}^2 + \sigma_{trans}^2)}}{2\sigma_{GKP}^2}. \quad (S56)$$

Thus when using $c_{opt}$ in our model of transferring the ancilla noise into the channel, the effective variance becomes:

$$\sigma_{\it{eff}}^2 = \sigma_{trans}^2 + (2 + c_{opt})\sigma_{GKP}^2 = \quad (S57)$$
$$\frac{1}{2}\left(3\sigma_{GKP}^2 + \sigma_{trans}^2 + \sqrt{(\sigma_{GKP}^2 + \sigma_{trans}^2)(5\sigma_{GKP}^2 + \sigma_{trans}^2)}\right).$$

Clearly this effective variance is the same for correction both in $\hat{q}$ and $\hat{p}$ quadratures. This is because the channel between two consecutive $\hat{q}$ corrections involves the same noise processes as the one between two consecutive $\hat{p}$ corrections. The order of these noise processes is different in the two cases, as for the correction in $\hat{q}$ quadrature we firstly have the back action from the syndrome measurement in the opposite quadrature and then the communication channel while in $\hat{p}$ quadrature the order of these two processes is reversed. However, the overall effective channel depends only on the variances of these processes and not on their order.

The effective logical error rate in $\hat{q}$ or $\hat{p}$ can be obtained by substituting the above $\sigma_{\it{eff}}^2$ for the variance in Eqn. S29. In this way we obtain a relation for the estimate of the logical X or Z flip for a single link as a function of $\eta_0$, $\sigma_{GKP}$ and the repeater spacing L:

$$P_{err,XZ}(\eta_0, \sigma_{GKP}, L) = \text{erfc}\left(\sqrt{\frac{\pi}{8\sigma_{\it{eff}}(\eta_0, \sigma_{GKP}, L)^2}}\right). \quad (S58)$$

Since an even number of X/Z errors can cancel the error, the probability of X/Z error for the total distance $L_{tot}$ is the probability of odd number of errors given by:

$$Q_{err,XZ}(\eta_0, \sigma_{GKP}, L, L_{tot}) = \frac{1 - (1 - 2P_{err,XZ}(\eta_0, \sigma_{GKP}, L))^{L_{tot}/L}}{2}. \quad (S59)$$

Then the total channel acting on our quantum state during transmission over distance $L_{tot}$ is:

$$\mathcal{D}(\rho) = (1 - Q_{err,XZ})^2 \rho + Q_{err,XZ}(1 - Q_{err,XZ})(X\rho X + Z\rho Z) + Q_{err,XZ}^2 Y\rho Y. \quad (S60)$$

We note that in quantum key distribution we estimate the quantum bit error rate (QBER) which is the probability that Alice's and Bob's bits do not agree in the given basis. We consider three bases {X, Y, Z} and the logical Pauli error $P_i$, where $i \in \{1,2,3\}$ and $P_1=X$, $P_2=Y$, $P_3=Z$, will flip a bit encoded in one of the two $P_j$ bases, where $j \neq i$ and will leave the bit encoded in the $P_i$ basis unaffected. Hence the QBER in the three bases is given by:

$$e_X = e_Z = Q_{err,XZ}(1 - Q_{err,XZ}) + Q_{err,XZ}^2 = Q_{err,XZ},$$

$$e_Y = 2Q_{err,XZ}(1 - Q_{err,XZ}). \quad (S61)$$

We provide details how to calculate secret-key rate in bits per mode r' in Supplementary Note 8. After establishing the secret-key rate as a function of the repeater spacing L for a given total distance $L_{tot}$ and for fixed parameters $\eta_0$, $\sigma_{GKP}$, we numerically maximize the secret-key rate over L restricted to the interval between 250 meters and 1.5 kilometer. Then we look for the largest total distance $L_{tot}$ for which with the optimal L the secret-key rate in bits per mode is still larger than r'=0.01. We search for this achievable distance using the binary search method.

Finally, to verify the validity of the above described analytical method, we compare its estimate to the Monte-Carlo simulation of the GKP repeater chain (the details of the simulation are described in Methods in the main body of the paper). In this verification we consider scenarios with $\eta_0 = 0.98$ and multiple different values of $\sigma_{GKP}$. For each case we consider the minimum allowed repeater spacing of 250 m which based on the analytical model is the optimal spacing for all these parameters. In Table 4, we show the maximum achievable distance over which secret-key rate in bits per optical mode stays above r'=0.01 as predicted by the analytical model and the Monte-Carlo simulation. We see that the analytical model closely agrees with the simulation for the considered parameters.

TABLE 4

|  | GKP squeezing $s_{GKP}$ | | | | | |
| --- | --- | --- | --- | --- | --- | --- |
|  | 0.05 | 0.06 | 0.07 | 0.08 | 0.09 | 0.1 |
| Analytical | 7920 | 3525 | 1572 | 713 | 342 | 166 |
| Simulation | 7850 | 3530 | 1590 | 720 | 340 | 180 |
|  | (−160, 160) | (−70, 70) | (−30, 30) | (−20, 10) | (−0, 10) | (−10, 0) |

Supplementary Note 6: Second Level Coding

In this Supplementary Note we explain in more detail how to concatenate the GKP code with the higher-level qubit codes. Specifically, we consider two small qubit codes, namely the [[4,1,2]] code and the [[7,1,3]] Steane code. That is the logical qubit is now encoded in a quantum state consisting of respectively four and seven GKP qubits.

[[4,1,2]] Code

The [[4,1,2]] code enables us to detect a single-qubit Pauli error by measuring its stabilizers $\{Z_1Z_2, Z_3Z_4, X_1X_2X_3X_4\}$. The logical operations on this code-space are defined such that: $X_L=X_1X_2=X_3X_4$ and $Z_L=Z_1Z_3=Z_1Z_4=Z_2Z_3=Z_2Z_4$. However, on its own this code does not allow us to correct any errors. That is, if measuring one of the stabilizers triggers an error, we do not know which qubit needs to be corrected, e.g. if measuring $Z_1Z_2$ results in the measurement outcome $-1$, we do not know whether the X error happened on the first or the second qubit. If we apply the X correction on the wrong qubit, we effectively apply $X_1X_2=X_L$, hence causing a logical error. However, as we have discussed in Supplementary Note 1 we can use analog information from lower-level GKP corrections to help us identify errors on this higher level. Specifically let us consider a repeater architecture in which four GKP qubits encoding one logical qubit through the [[4,1,2]] code are sent through a Gaussian random displacement channel to a repeater station which firstly performs GKP correction on all the four GKP qubits and then measures the joint stabilizers of the [[4,1,2]] code. Let us first assume the scenario with perfect GKP correction. Then, if the [[4,1,2]] code detects an error, this must have been caused by a failure to correct an error on the GKP level, e.g. if $Z_1Z_2$ measurement gives $-1$ outcome, then this X error on one of the first two qubits must have been caused by the fact that the Gaussian displacement channel resulted in the $\hat{q}$ quadrature shift on the first or second qubit which was larger in magnitude than $\sqrt{\pi}/2$. This was an uncorrectable error which resulted in a logical X flip after the GKP correction. However, as discussed in Supplementary Note 1 the probability that the GKP correction failed and caused the logical error given the GKP syndrome $q_0$ is known and is given by the function given in Eqn. S1. This error probability $p[\sigma](q_0)$ grows with the magnitude of $q_0$ reaching its maximum at the decision boundaries $\pm\sqrt{\pi}/2$. Hence it is clear that in this case on the second level there is a higher probability of error on this one of the first two qubits for which $|q_0|$ during the GKP correction was larger. This is the qubit which we decide to correct in this case. We proceed similarly during the measurement and error correction of the other two stabilizers.

[[7,1,3]] Steane Code

The [[7,1,3]] Steane code can detect two errors and correct one by measuring the stabilizers $\{Z_4Z_5Z_6Z_7, Z_2Z_3Z_6Z_7, Z_1Z_3Z_5Z_7, X_4X_5X_6X_7, X_2X_3X_6X_7, X_1X_3X_5X_7\}$. The logical Pauli operators take a simple form $X_L=X^{\otimes 7}$ and $Z_L=Z^{\otimes 7}$. For this code every syndrome for Z and X stabilizers can uniquely identify a single-qubit error if such occurred. If a two-qubit Z or X error occurs, this cannot be distinguished from a single-qubit error happening on another qubit. Since single-qubit errors are more likely, one will in this case proceed to correct the single-qubit error thus causing effectively a three-qubit error which will implement a logical X/Z operation on the encoded qubit. Although single-qubit errors are in general more likely, one can again use the analog information from the preceding GKP correction. Then again considering the scenario in which some of the Z stabilizers produced outcome $-1$, we can now use the GKP correction syndrome $q_0$ from all the seven qubits to identify whether the single or two-qubit error is more likely in this scenario. Specifically for every syndrome for Z (X) stabilizers there is 1 single and 3 two-qubit X (Z) errors consistent that could have produced this syndrome. We can then calculate the probability of each of these four events using the analog information $q_0$ ($p_0$) and correct the most likely one. Though the information provided by the analog syndrome is probabilistic, we find that in most cases it allows for successful correction of both single- and two-qubit errors.

Higher-Level Stabilizer Measurement Using Ancilla GKP

Figure 13:
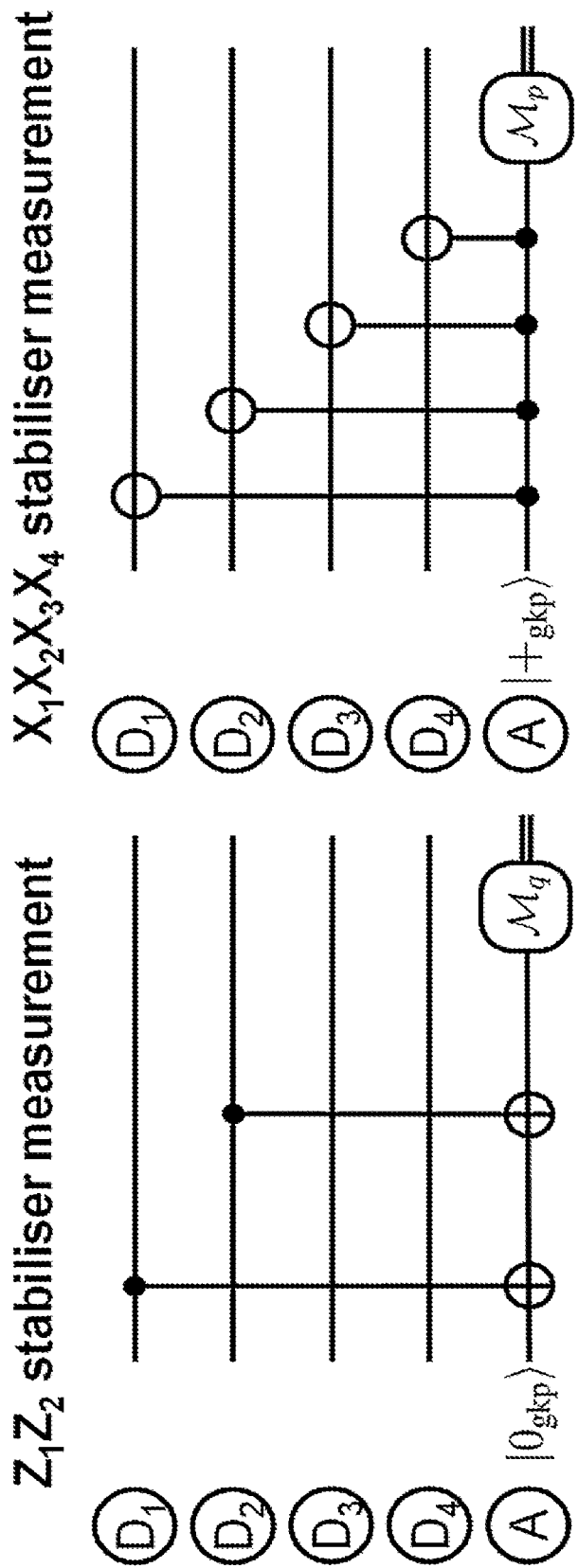
FIG. 13 shows quantum circuits for measuring outer-code stabilizers, in embodiments.

Now we will briefly describe how to measure the stabilizers of the higher-level code. In fact, this can be done in a similar way as in the GKP correction, using a GKP ancilla and the SUM gate for measuring Z stabilizers for identifying X errors due to $\hat{q}$ quadrature shifts and the inverse SUM gate for measuring X stabilizers for identifying Z errors due to $\hat{p}$ quadrature shifts as shown in the examples in FIG. 13. In FIG. 13, we depict the circuit for the measurement of the Z-type $Z_1Z_2$ stabilizer (left) and an X-type $X_1X_2X_3X_4$ stabilizer (right) for the second-level [[4,1,2]] code with GKP encoding on the first level. The four data qubits are denoted by "$D_i$" and the ancilla qubit by "A".

For measuring the Z stabilizers we in sequence apply the SUM gate from the corresponding data qubits onto the GKP ancilla and then measure the ancilla. The main difference is that in the GKP correction we aimed for correcting only small shifts without revealing the GKP encoded information. For that purpose we needed to measure the data qubit modulo $\sqrt{\pi}$. Now measuring the Z stabilizers amounts to measuring whether an even or odd number of X errors occurred on the corresponding qubits. Since such individual errors are caused by a $\sqrt{\pi}$ shift in the $\hat{q}$ quadrature, to determine the parity, we need to be able to measure the ancilla modulo $2\sqrt{\pi}$ in the interval $[-\sqrt{\pi}, \sqrt{\pi})$. Such measurement can be performed by preparing the ancilla in the state $|0_{GKP}\rangle = \sum_{n\in\mathbb{Z}} |q=2n\sqrt{\pi}\rangle$ which is periodic modulo $2\sqrt{\pi}$ in the $\hat{q}$ quadrature. Moreover, since $|0_{GKP}\rangle = \sum_{n\in\mathbb{Z}} |p=n\sqrt{\pi}\rangle$, the back-action of the sum gate is that it also shifts the $\bar{p}$ quadrature of the data mode by a superposition of integer multiples of $\sqrt{\pi}$. However, this back-action is the same on all the data qubits involved in the stabilizer measurement and shifting the $\hat{p}$ quadrature of all these data qubits by the same integer multiple of $\sqrt{\pi}$ effectively implements the action of exactly the Z stabilizer which we are measuring. Since our encoded state is by construction invariant under this transformation, the data modes remain untouched (we note that even though the individual GKP qubits in the block could be displaced from the eigenspace of the stabilizers of the second-level code, the displacement operators commute up to a phase which in this case would be global and hence irrelevant, thus we can see the back-action as acting on the eigenstates of the second-level stabilizers followed by the residual displacements). Finally, the ancilla is measured using homodyne detection and we will consider the measured value modulo $2\sqrt{\pi}$ which we will denote here as $q_0^{SL} \in [-\sqrt{\pi}, \sqrt{\pi})$, where SL refers to the second level of coding in our scheme. The stabilizer value is inferred from $q_0^{SL}$ according to the rule:

$$S(q_0^{SL}) = \begin{cases} 1, & \text{for } |q_0^{SL}| \leq \sqrt{\pi}/2, \\ -1, & \text{for } |q_0^{SL}| \geq \sqrt{\pi}/2 \end{cases} \quad (S62)$$

We note that for perfect GKP ancillas, if before the multi-qubit syndrome measurement the GKP correction was performed, then $q_0^{SL}$ can only take one of two discrete values $\{-\sqrt{\pi}, 0\}$. However if GKP ancillas are noisy then $q_0^{SL}$ can take any value from the interval $[-\sqrt{\pi}, \sqrt{\pi})$. Finally, after all the Z stabilizers are measured, and using the syndrome of the second-level code as well as the analog information it is established which GKP qubits need to be corrected, the $\sqrt{\pi}$ shift in the $\hat{q}$ quadrature is applied to these GKP qubits to correct the errors. The procedure to measure X-stabilizers involves inverse SUM gates, as in the case of individual GKP correction, and is analogous to the Z-stabilizer measurement.

We note that the use of finitely squeezed ancillas leads two types of errors. Firstly, the back-action from the ancilla onto the data qubits means that the small residual displacement on the ancilla due to its finite squeezing will propagate onto all the data qubits involved in the measurement of that stabilizer. However, as we will see these small displacements can later be corrected by subsequent GKP corrections. Secondly the measurement outcome of the ancilla used to measure the higher-level stabilizers is given by:

$$q_0^{SL} = R_{2\sqrt{\pi}}\left(\sum_i \hat{q}_{data,i} + \xi_{q,anc}^{GKP}\right). \quad (S63)$$

The summation index i runs over all the data qubits measured by the specific stabilizer. We have already established in Eqn. S6 the variance on each GKP data qubit after GKP correction for the most likely scenario in which there was no logical error on the GKP level, only a small residual displacement. For this most likely case of no logical error on any of the GKP qubits during the GKP correction directly preceding the measurement of the second-level stabilizer, we can approximate the variance of $q_0^{SL}$ as:

$$\text{Var}(q_{0,no\ error}^{SL}) \approx \left(\sum_i c_{opt,i} + 1\right)\sigma_{GKP}^2. \quad (S64)$$

Clearly for the no-error case we ideally would like to have that $S(q_{0,no\ error}^{SL})=1$. However, we see that the higher the weight of the stabilizer measured, the larger the summation range of the index i and hence the larger the variance. This large variance means that the residual errors accumulated on the ancilla after all the SUM gates can result in a flip of the higher-level stabilizer so that we erroneously observe $S(q_{0,no\ error}^{SL})=-1$. Here we find that already for weight-four stabilizers this measurement error probability can become a hindrance and therefore we will later discuss how we can overcome this problem by repeating the measurement of the same syndrome twice.

Supplementary Note 7: Multi-Qubit Repeaters

Figure 14:
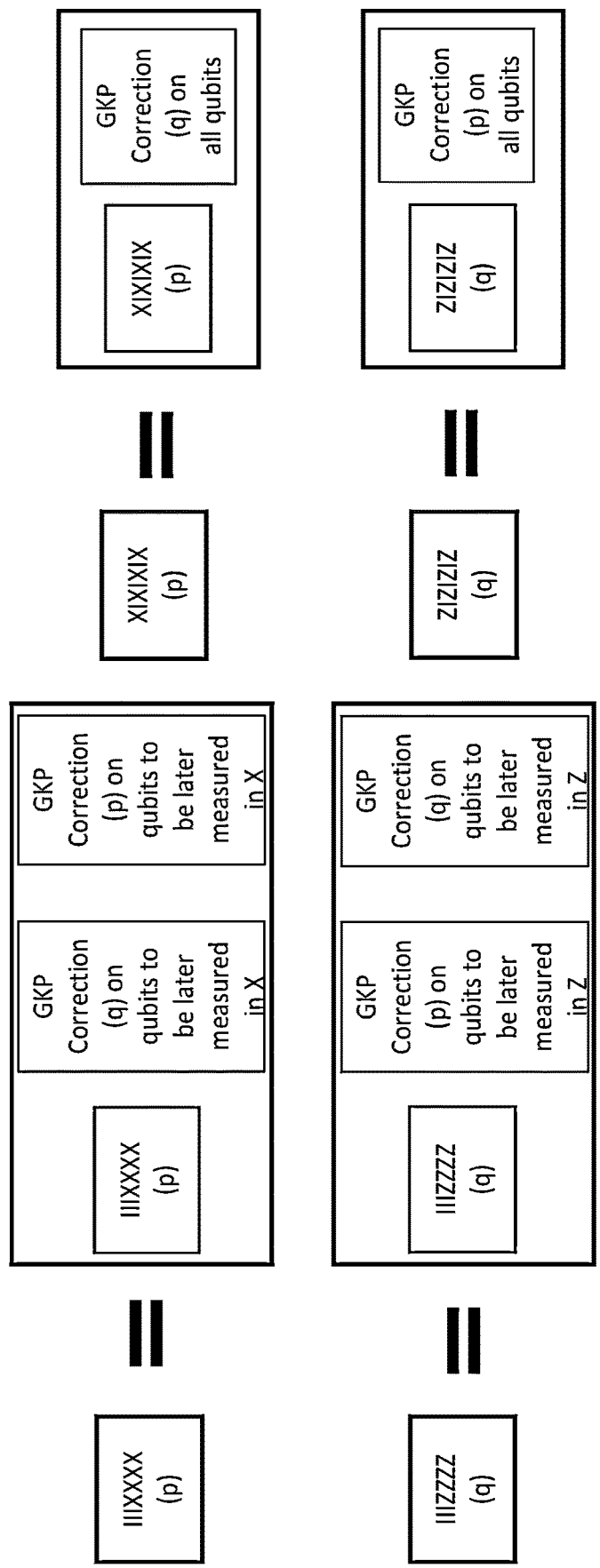
FIG. 14 is a schematic diagram of building block operations performed inside type-A (multi-qubit) repeaters, in an embodiment.

Now we will describe the repeater architecture which uses multi-qubit (type-A) repeater nodes that aim to correct both lower and higher-level errors. Specifically such stations will firstly perform single-mode GKP correction on all the physical GKP qubits followed by the measurement of the second-level stabilizers and the corresponding higher-level correction. However, as already discussed, the use of imperfect ancillas results in errors that can accumulate and therefore it is vital to perform these correction operations in such a way as to minimize the overall error probability. Specifically, residual displacements accumulated on the data qubits can effectively flip the ancilla used for the measurement of the higher-level stabilizer, thus leading to the measurement error. During such a measurement, these residual errors from all the measured data qubits are transferred onto that ancilla. Therefore measurements of higher weight stabilizers are more prone to errors. This also justifies why it is vital to make the residual displacements on the data qubit as small as possible immediately before the measurement of the higher-level stabilizer. Therefore now we motivate and describe in detail all the operations performed in the multi-qubit repeaters that help us to increase the reliability of the higher-level stabilizer measurements. These operations follow a basic set of rules:

1. Whenever a data qubit participates in a higher-level stabilizer measurement $M_i(\hat{x}_1)$ for correcting errors in the quadrature $\hat{x}_1$, and in the same repeater that data qubit will later again participate in some higher-level stabilizer measurement $M_j(\hat{x}_1)$ again in the same quadrature $\hat{x}_1$, then after the measurement of $M_i(\hat{x}_1)$ on that data qubit we apply two GKP corrections to it. First, we perform a GKP correction GKP ($\hat{x}_2$) in the quadrature $\hat{x}_2$, that is the opposite quadrature to $\hat{x}_1$, in order to eliminate the back-action error from that higher-level measurement. Then we apply a GKP correction GKP ($\hat{x}_1$) in the $\hat{x}_1$ quadrature, to eliminate the noise from the back-action during GKP ($\hat{x}_2$) and hence to prepare the data qubit for the measurement of $M_j(\hat{x}_1)$. This is illustrated on the left in FIG. 14.

2. In a quadrature in which weight-four stabilizers need to be measured on the higher level, we measure all the stabilizers twice. That is we perform two consecutive measurement rounds where in each round we measure all the different stabilizers. We describe below how we use majority voting over these two rounds of outcomes to reliably estimate the value of the higher-level syndrome.

3. After measuring the last higher-level stabilizer of a given quadrature, say $\hat{x}_1$, all the data qubits are subjected to the GKP correction in the opposite quadrature $\hat{x}_2$ in order to remove all the back-action effects, e.g. after the last measurement of the last X stabilizer for detecting $\hat{p}$ errors, we need to apply GKP($\hat{q}$) to all the data qubits in order to remove the residual errors caused by the back-action during the X-stabilizer measurements. This is illustrated on the right in FIG. 14.

4. The first operations in the type-A repeater are the GKP corrections in both quadratures aiming at correcting the communication channel noise. If directly after these GKP corrections we proceed to measure weight-four stabilizers, then instead of performing these GKP corrections once, we repeat them again before measuring these higher-level stabilizers. That is, the GKP corrections are performed twice in the alternate fashion: GKP($\hat{q}$)—GKP($\hat{p}$)—GKP($\hat{q}$)—GKP($\hat{p}$). Repeating such GKP corrections twice enables for better suppression of the residual displacements. This follows from Eqns. S5 and S6. The residual displacement after GKP correction is smaller, if the contributed noise before the correction operation was smaller relative to $\sigma_{GKP}$. The communication channel adds significant amount of noise, hence e.g. the residual displacement after the second GKP ($\hat{p}$) will be smaller than after the first GKP($\hat{p}$). This is because the amount of noise added between the two GKP ($\hat{p}$) is small comparing to the channel noise, namely it only comes from the residual displacement during GKP ($\hat{q}$).

5. When switching from measuring one quadrature to the other, if the quadrature to be measured includes measuring weight-four stabilizers, we repeat GKP corrections similarly to the previous case, e.g. when switching from measuring X to Z, we will apply GKP($\hat{q}$)—GKP($\hat{p}$)—GKP($\hat{q}$) instead of just GKP($\hat{q}$). Similar to the previous case, the residual displacements after second GKP ($\hat{q}$) will be smaller than after the first one.

The additional repeated GKP corrections described in points 4 and 5 are marked in FIGS. 15 and 16.

We now focus on the multi-qubit repeater nodes based on the [[4,1,2]] code and then on those based on the [[7,1,3]] code.

Multi-Qubit Repeaters Based on the [[4,1,2]] Code

We depict the operations performed inside the multi-qubit repeater in FIG. 15. A type-A repeater based on the [[4,1,2]] code first performs GKP corrections on the four individual GKP modes (e.g., to overcome the errors from the communication channel). This operation is repeated to reduce the residual displacement before measuring the weight-four X-stabilizer twice. Then we proceed to measure the $Z_1Z_2$ and $Z_3Z_4$ stabilizers. This is followed by a decoding procedure which we describe in more detail below. Finally, the four GKP qubits are subjected to phase-insensitive amplification and sent sequentially to the next repeater station.

Multi-Qubit Repeaters Based on the [[7,1,3]] Code

The procedure inside the type-A repeater based on the [[7,1,3]] code is similar and is depicted in FIG. 16. Here, we measure weight-four stabilizers both in X and in Z, therefore we add the additional GKP corrections before measuring both X and Z stabilizers. We also measure both the X and the Z stabilizers in two rounds. Specifically, we start by performing the GKP correction, once for $\hat{q}$ and once for $\hat{p}$. We then repeat the GKP correction to reduce the residual displacement. Then we measure all the X-stabilizers in two rounds. Then we switch to measuring Z-stabilizers. To do that, we again add the additional GKP corrections first, in order to reduce the residual displacement in $\hat{q}$. Finally, we measure all the Z-stabilizers in two rounds. The black dashed lines separate the two rounds of measuring the stabilizers of a given quadrature.

Decoding Procedure at Multi-Qubit Repeaters Using Analog Information

Here we will describe the procedure of identifying the errors based on the information obtained from the GKP and multi-qubit syndrome measurements. Our decoding procedure consists of two steps: first we want to reliably estimate the second-level syndrome, and second we want to identify the most likely errors consistent with that syndrome. Before we go into more detail into these two steps we expand on the ideas described in Supplementary Note 1 and explain how we establish the error likelihood during a GKP and multi-qubit syndrome measurements.

We have already established in Eqn. S1 how to calculate the error likelihood during the GKP correction for a given measured GKP syndrome $q_0$. For that we need to know standard deviation $\sigma$ of the distribution from which the measured GKP syndrome was effectively drawn. Hence a needs to include all the processes that contribute to $q_0$ which will include the residual displacement after the previous GKP correction (with variance $c_{opt}'\sigma_{GKP}^2$), the noise added by the environment before the GKP correction (with variance $\sigma_{noise}^2$) and the noise of the GKP ancilla used for measuring the GKP stabilizer (with variance $\sigma_{GKP}^2$). Hence:

$$\sigma^2 = (c_{opt}'+1)\sigma_{GKP}^2 + \sigma_{noise}^2, \quad (S65)$$

where $c_{opt}'$ denotes the value of $c_{opt}$ used during the previous GKP correction round.

We can follow a similar strategy to establish an error likelihood during a multi-qubit syndrome measurement. In this case, the syndrome is in the interval $q_0^{SL} \in [-\sqrt{\pi}, \sqrt{\pi})$ and the discrete stabilizer value is assigned according to the rule given in Eqn. S41. Hence, we can calculate $R_{\sqrt{\pi}}(q_0^{SL})$ which does not reveal the information about the discrete stabilizer value, but similarly as in the case of GKP stabilizer measurement, can provide us with a likelihood of error during this assignment of the discrete stabilizer value. The error likelihood can then also be established using Eqn. S1, where we now replace $q_0$ with $R_{\sqrt{\pi}}(q_0^{SL})$, that is we want to calculate $p[\sigma](R_{\sqrt{\pi}}(q_0^{SL}))$. Since we always measure the multi-qubit stabilizers directly after a GKP correction in the same quadrature, the corresponding $\sigma$ will include the residual errors from all the data qubits involved and the errors from the ancilla. That is:

$$\sigma^2 = \left(\sum_i c_{opt,i} + 1\right)\sigma_{GKP}^2. \quad (S66)$$

Here $c_{opt,i}$ denotes the rescaling coefficient used at the last GKP correction on $i^{th}$ data qubit involved in this multi-qubit stabilizer measurement and the sum is taken over all the data qubits involved in this measurement. The additional plus one term comes from the noise contributed by the ancilla.

Having established how to calculate error likelihood $p[\sigma]$ during a GKP and multi-qubit syndrome measurement, we proceed to describe how this information can be used to identify the errors.

Step 1: Estimating Multi-Qubit Stabilizer Values

The first step is to reliably assign the multi-qubit stabilizer values. For weight-two stabilizers measured for the case of the [[4,1,2]] code, in general the error distribution given in Eqn. S45 will be narrow because the sum is taken only over two values of i. Hence the probability of error during a measurement of the weight-two stabilizer will be small and so we just keep the discrete value obtained by applying the rule from Eqn. S41 to the measured $q_0^{SL}$.

In the case of weight-four stabilizer, a will be much larger as the summation index i will now run over four values corresponding to four data qubits rather than two. This means that the probability of measurement error is much higher, and therefore, as discussed, we make two rounds of measuring all such stabilizers. If in both rounds the discrete value of the stabilizer is the same, we assign that value. However, if the two values are different, we consider three error possibilities. Either there was a measurement error during the first or the second time this stabilizer was measured or there was a logical error during one of the GKP corrections on the relevant qubits in that quadrature somewhere between the two multi-qubit stabilizer measurements. We then use the analog error likelihood to establish the most likely possibility. This we can do through the following steps:

1. First, we compare $p[\sigma](R_{\sqrt{\pi}}(q_0^{SL})$ from the two multi-qubit stabilizer measurements with the likelihood of an error on one of the intermediate GKP corrections given by $1-\Pi_i(1-p[\sigma_i](q_{0,i}))$, where the product is taken over all the GKP corrections in the same quadrature and on the relevant qubits, performed between the two rounds of measuring a given multi-qubit stabilizer. If the most likely possibility is the error during one of the two rounds of the multi-qubit stabilizer measurements, we simply assign the discrete value corresponding to the outcome of the other measurement which we assume was not erroneous.

2. If the most likely possibility is an error during one of the intermediate GKP corrections, then we aim to identify the most likely qubit on which the error happened. That is, we compare the values of $1-\Pi_i(1-p[\sigma_i](q_{0,i}))$, where now the product is taken over all the GKP corrections in the same quadrature but now only on a single qubit. We calculate this likelihood for all the qubits that were measured during the concerned multi-qubit stabilizer measurement and identify the qubit with highest error likelihood.

3. This procedure is repeated for all the other stabilizers. If for some other stabilizer we also find that the two rounds of measurements resulted in different outcomes and that the most likely cause of this error is an error during an intermediate GKP correction, we assume that this is the same error which we have identified as the most likely for the case of the previous stabilizer. That is we assume that there was at most one logical error during all the intermediate GKP corrections performed after the first measurement of the first multi-qubit stabilizer and before the second measurement of the last multi-qubit stabilizer. Hence if for both stabilizers we find that there was an intermediate error, we assume that this is the same error which affected both of the stabilizers. In case we find that for both of the two discussed stabilizers the most likely is the error on an intermediate qubit but on a different qubit for each of these two stabilizers, we still assume that there was only a single error and that error was on the one of these two qubits for which the error likelihood is higher. However, we see in our simulation that the discrepancy between the most likely qubit with an error almost never arises, that is whenever the processing of the outcomes for two or more stabilizers points towards a high likelihood of an error during an intermediate GKP correction, almost always they all point to the error on the same data qubit.

4. Finally, after identifying the most likely data qubit with an error during an intermediate GKP correction as well as the stabilizers it has affected, we flip the value of certain stabilizers so that we can effectively have that error reflected in the final syndrome. Specifically, we flip those stabilizers which involved measuring the qubit that we expect had an error and for which both of the measurement rounds occurred before this most likely intermediate GKP error. For the stabilizers which were affected by that intermediate error (that is that error happened on a relevant qubit between the first and the second round of measuring that stabilizer) we assign the value from the second measurement. In this way we effectively include that error in the final second-level syndrome.

To better understand this procedure we provide an example based on the measurement of X-stabilizers for the [[7,1,3]] code. The specific scenario is depicted in FIG. 17. In the considered example, we find that both measurements of the IIIXXXX stabilizer produced the same value, while the two rounds of measurement of the IXXIIXX and XIXIXIX produced opposite outcomes as marked by the numbers "+1" and "−1" in FIG. 17. Moreover, let us assume that the likelihood analysis shows that for both of these last two stabilizers the most likely source of this error is an error during an intermediate GKP correction on qubit 7. Therefore we conclude that there is a high likelihood of an error at the location marked with the cross "x", as that error would affect the measurements of the stabilizers IXXIIXX and XIXIXIX but would not affect the measurements of the IIIXXXX stabilizer which also measures qubit 7 but for which both measurements took place before the location marked with the cross. Then we assign to the stabilizers IXXIIXX and XIXIXIX the values obtained from the second measurements, i.e. +1 and −1, respectively, while we also flip the value of the IIIXXXX stabilizer to −1. In this way, we effectively include the error at location marked with the cross into our syndrome.

Here, we want to comment why we simply do not apply a Z flip on qubit 7 to correct the error if we know from our likelihood analysis its most likely location. In particular, we see from our simulation that the method described here that does not involve such a correction flip gives better performance. We believe that this is because in case our likelihood analysis has failed to correctly identify the error, the correcting Z flip would result in a new error that we cannot correct. However, if we do not correct this error, there are specific configurations in which a misidentification of such an intermediate GKP error can still be corrected in the second decoding step described below. If the Z flip for correction is wrongly applied, it cannot be corrected in this second step.

Step 2: Finding the Most Likely Errors

The second step in our decoding procedure is to find the most likely error consistent with our reliably established stabilizer values. For that we use the analog information from all the GKP corrections in the relevant quadrature from a single segment between two consecutive multi-qubit syndrome measurements in two consecutive type-A repeaters (including also the intermediate GKP corrections placed between multi-qubit stabilizer measurements which we used in Step 1 and including the GKP corrections in the type-B stations in the hybrid architecture). Specifically let $p[\sigma_{i,j}]$ $(q_{0,i,j})$ denote the error likelihood of $i^{th}$ GKP correction on qubit j. We can then use these single-qubit error likelihoods to identify the most likely error qubit(s) consistent with the multi-qubit syndrome. For the case of the [[4,1,2]] code, we are looking to identify only a single-qubit error. Therefore for each of the relevant qubits we calculate the probability that there was no effective logical error after all the GKP corrections which corresponds to the probability of an even number of errors:

$$p_{no\ error,j} = \frac{1 + \prod_i (1 - 2p[\sigma_{i,j}](q_{0,i,j}))}{2}. \tag{S67}$$

Then we find j for which $p_{no\ error,j}$ is the smallest. This is the qubit with the highest error likelihood and which we will correct.

For the case of the [[7,1,3]] code, we also aim to correct two-qubit errors. Specifically for each multi-qubit syndrome there is one single-qubit and three two-qubit errors that are possible. To identify the most likely possibility, for each case we calculate the probability of odd number of errors on the erroneous qubits multiplied by the probability of the even number of errors on the non-erroneous qubits. This is our error likelihood for each of these cases. We then choose the case with largest error likelihood. We can then correct the relevant qubits corresponding to that case.

Supplementary Note 8: Repeater Performance: Secret Key Generation and Advantage Distillation The repeater performance is measured by its ability to generate shared secret key and here we provide the details of the specific quantum key distribution (QKD) protocol which we propose to implement on the considered repeater architectures. Specifically, we consider a prepare-and-measure version of the six-state QKD protocol supplemented with a two-way advantage distillation scheme. In this protocol Alice chooses one of the three mutually unbiased qubit bases {X, Y, Z} at random and then uniformly at random prepares one of the basis states of that chosen basis, encoding the bit value of 0 or 1. In our architectures this state becomes then encoded in the GKP or the two-level code and is sent to Bob through the repeater chain. After arriving to Bob, he decodes the state and measures it in one of the three {X, Y, Z} bases at random. In this way Alice and Bob establish a shared raw bit of the secret key. Such raw bits need to be post-processed. The first step in such postprocessing is sifting in which Alice and Bob discard bits for the rounds in which they have chosen different bases. Yet it has been shown that in the asymptotic limit of n→∞, where n is the number of protocol rounds, the key generation basis can be chosen with probability approaching one, without compromising security. Thus, effectively a negligible fraction of raw bits will be discarded during sifting. We call such a protocol a fully asymmetric protocol. In the next step Alice and Bob perform parameter estimation to evaluate the quantum bit error rate (QBER) {$e_X$, $e_Y$, $e_Z$} which corresponds to the probability that in the given basis their bits have a discrepancy. Then Alice and Bob apply the advantage distillation procedure in which they use two-way communication in order to discard some sets of bits which contribute to the error. As a result the error in the key generation basis can be significantly decreased especially in the high-noise regime. Then Alice and Bob perform a standard one-way error correction and privacy amplification.

Both the GKP code and the multi-qubit codes which we use here have the nice feature that they aim to independently correct X and Z errors. This means that the Y error is quadratically suppressed as Y error will arise only if we failed to correct both the X and the Z error. The effective channel induced by our encoded transmission is the Pauli channel:

$$\mathcal{D}(\rho) = (1-q_X-q_Z-q_Y)\rho + q_X X\rho X + q_Z Z\rho Z + q_Y Y\rho Y. \quad \text{(S68)}$$

As we have already discussed in Supplementary Note 5, a flip in a given basis affects only the QBER in the other two six-state protocol bases. Hence:

$$e_X = q_Z + q_Y,$$

$$e_Z = q_X + q_Y,$$

$$e_Y = q_X + q_Z. \quad \text{(S69)}$$

Since $q_Y$ is quadratically suppressed with respect to $q_X$ and $q_Z$, $e_Y$ is much larger than $e_X$ and $e_Z$. The fact that we have one basis with much higher QBER allows us to use the observation that when using advantage distillation, we can extract more key if the key is generated in the basis with the highest QBER.

We note here that in our analysis we assume that Bob also performs a final round of quantum error correction on both levels before measuring the encoded qubit. However, if he chooses to measure the logical qubit in the X (Z) basis, then he does not need to correct X (Z) Pauli errors. This means that for the considered GKP and multi-qubit codes, in these cases he in principle only needs to measure the X (Z) stabilizers which can be done on the classical level. That is Bob could first measure all the GKP qubits in the relevant basis and then perform error correction (still using analog information) on the classical values which he obtained from these measurements. Such classical error correction would not require ancilla modes hence eliminating the noise coming from finite squeezing. Unfortunately that strategy does not work if he chooses to perform the measurement in the Y basis as then he needs to correct both X and Z errors. Therefore, in our analysis we treat Bob's station as a repeater that also performs full quantum error correction in both quadratures.

After error correction, Bob can measure the encoded qubit in a chosen basis. For the concatenated-coded schemes he needs to measure the logical X, Z or Y operator of the outer code. For the case of the [[7,1,3]] code this corresponds to measuring all the GKP qubits in the chosen basis and then applying XOR to all the 7 bits to obtain the final logical outcome. For the case of the [[4,1,2]] code the situation is more complex. Since, the logical Z operator can be written as $Z_L = Z_1 Z_3$, measurement in the standard basis corresponds to measuring the first and third qubit in the standard basis followed by the XOR of the resulting two bits to obtain the final logical outcome. Similarly to perform the measurement in the X-basis, he needs to measure the first and second qubit in the X basis since $X_L = X_1 X_2$. Logical Y operator on the other hand is $Y_L = iX_L Z_L = Y_1 X_2 Z_3$. Hence measurement in the Y basis corresponds to measuring the first qubit in Y basis, second in X basis and third in Z basis followed by the XOR of the resulting three bits. Since these physical qubits are actually GKP qubits, measuring them in a given basis can be implemented by the homodyne detection along the q, p or the diagonal axis in phase space corresponding to the measurement in the Z, X and Y basis respectively.

Now we describe how to calculate secret key using an advantageous distillation protocol. The expressions below correspond to the entanglement-based scheme. However, they can also be used to describe a prepare-and-measure implementation as the entanglement-based scheme can be considered as the virtual purification of the prepare-and-measure scheme. That is, a possible way of implementing the prepare-and-measure scheme is for Alice to generate locally a maximally entangled state and measure one of the qubits in one of the protocol bases. This effectively prepares the second qubit in one of the prepare-and-measure protocol states, so that the second qubit can then be sent to Bob. We denote the four Bell states as $$|\psi(x,z)\rangle = \frac{1}{\sqrt{2}}(|0\rangle|0+x\rangle + (-1)^z|1\rangle|1+x(\text{mod}2)\rangle), \quad \text{(S70)}$$

for $x, z \in \{0,1\}$. The Bell-diagonal state can then be written as $$\rho_{AB} = \sum_{x,z \in \{0,1\}} p_{xz} |\psi(x,z)\rangle\langle\psi(x,z)|. \quad \text{(S71)}$$

Here the four Bell-diagonal coefficients $p_{xz}$ define the probability distribution $P_{XZ}$. If we implement the fully asymmetric six-state protocol for key extraction in the Z basis and supplement this protocol with two-way post-processing, then the resulting secret-key rate is given by:

$$r_{six-state} = \max\left\{1 - H(P_{XZ}) + \frac{P_{\overline{X}}(1)}{2} h\left(\frac{p_{00}p_{10} + p_{01}p_{11}}{(p_{00}+p_{01})(p_{10}+p_{11})}\right), \quad \text{(S72)}\right.$$
$$\left. \frac{P_{\overline{X}}(0)}{2}[1 - H(P'_{XZ})]\right\},$$

where $$P_{\overline{X}}(0) = (p_{00} + p_{01})^2 + (p_{10} + p_{11})^2, \quad \text{(S73)}$$

-continued $$P_{\overline{X}}(1) = 2(p_{00} + p_{01})(p_{10} + p_{11}),$$

$$p'_{00} = \frac{p_{00}^2 + p_{01}^2}{(p_{00} + p_{01})^2 + (p_{10} + p_{11})^2},$$

$$p'_{10} = \frac{2p_{00}p_{01}}{(p_{00} + p_{01})^2 + (p_{10} + p_{11})^2},$$

$$p'_{01} = \frac{p_{10}^2 + p_{11}^2}{(p_{00} + p_{01})^2 + (p_{10} + p_{11})^2},$$

$$p'_{11} = \frac{2p_{10}p_{11}}{(p_{00} + p_{01})^2 + (p_{10} + p_{11})^2},$$

and $H(P_{XZ})$ denotes the Shannon entropy of the distribution $P_{XZ}$.

The Bell-diagonal coefficients $p_{xz}$ can be expressed in terms of the QBER $\{e_X, e_Y, e_Z\}$ established during the parameter estimation step of the protocol. For a prepare-and-measure scheme, the QBER in a given basis is the fraction of the bits encoded by Alice and measured by Bob in that basis for which there is a discrepancy between the bit value encoded by Alice and the one measured by Bob. For the purifying entanglement-based scheme we need to assume a specific target Bell-state. Let us assume here that the target state that Alice and Bob aim to generate is $|\psi(0, 0)\rangle$. For key generation in the Z basis, $e_i$ will be equal to the sum of the Bell-diagonal coefficients $p_{xz}$ which contribute to the error in the basis $i \in \{X, Y, Z\}$ relative to the correlations of $|\psi(0, 0)\rangle$, e.g. $e_Z = p_{10} + p_{11}$, as the state $|\psi(0, 0)\rangle$ is correlated in the Z basis while the states $|\psi(1, 0)\rangle$ and $|\psi(1, 1)\rangle$ are anti-correlated. Note that $|\psi(0,0)\rangle$ is correlated both in the Z and X bases, but is anti-correlated in the Y basis.

However, as mentioned earlier, we would like to calculate the amount of key that can be extracted if the key is generated in the Y basis. The amount of generated key in a different protocol basis than the Z basis can still be calculated using the same function of the Bell-diagonal coefficients $p_{xz}$. However, in the relation between the Bell-diagonal coefficients and the QBER obtained for the case when the key is extracted in the Z basis we now need to permute the individual QBERs. As a result for the key generation in the Y basis we obtain the following relations:

$$p_{00} = 1 - \frac{e_X + e_Z + e_Y}{2},$$ (S74)

$$p_{01} = \frac{e_X + e_Z - e_Y}{2},$$

$$p_{10} = \frac{-e_X + e_Z + e_Y}{2},$$

$$p_{11} = \frac{e_X - e_Z + e_Y}{2}.$$

Finally, we note that in information theory the crucial figure of merit with regard to generation of secret key is the amount of such key that can be generated per optical mode. Each of our GKP qubits occupies a single optical mode and in order to transmit and reconstruct one logical qubit, we need to transmit n GKP qubits, where n is the number of physical qubits encoding one logical qubit in the second-level code. Hence, we can calculate the secret-key rate in bits per optical mode for our scheme as:

$$r' = \frac{r}{n},$$ (S75)

where n=4 for the architecture based on the [[4,1,2]] code and n=7 for the architecture based on the [[7,1,3]] code. For the GKP repeater chain n=1.

Supplementary Note 9: Transmission Infidelity

The performance metric we chose for FIG. 6 is the transmission infidelity for the worst-case scenario. That is, it is the infidelity maximized over all the possible pure qubit states $|\psi\rangle$ which we may want to transmit. In this Supplementary Note, we provide the expressions for this maximum transmission infidelity for all the encodings considered in FIG. 6.

Let $\mathcal{D}$ denote the effective qubit channel comprising the encoding by the sender, transmission through the pure-loss channel and the decoding at the receiver. Then the transmission fidelity $F(|\psi\rangle)$ between the input state $|\psi\rangle$ and the output state $\mathcal{D}(|\psi\rangle\langle\psi|)$, is given by:

$$F(|\psi\rangle) = \langle\psi|\mathcal{D}(|\psi\rangle\langle\psi|)|\psi\rangle.$$ (S76)

Let us now define the minimum fidelity as:

$$F_{min} = \min_{|\psi\rangle} F(|\psi\rangle).$$ (S77)

Then the maximum infidelity is simply $\epsilon_{max} = 1 - F_{min}$.

Let us now describe this maximum infidelity for all the strategies considered in FIG. 2. Firstly, let us consider the discrete-variable encoding using the [[4,1,2]] code. This encoding can be used for approximate error correction against amplitude damping channel. It is known in the art that for the specific considered decoding strategy, the maximum infidelity expressed in terms of the photon loss probability $\gamma$ is given by:

$$\epsilon_{max} = 5\gamma^2 + \mathcal{O}(\gamma^3).$$ (S78)

Now let us consider the maximum infidelity for the GKP-based schemes. Specifically, we shall calculate that maximum infidelity in terms of the logical X and Z flip probabilities $p_{err,X/Z}$ after a single elementary link, obtained from the simulation as discussed in Methods in the main body of the paper. As we have already seen, for these encoding strategies the effective channel $\mathcal{D}$ is the Pauli channel given in Eqn. S47. In FIG. 6, we simulated only a single link, so $q_X = p_{err,X}(1 - p_{err,Z})$, $q_Z = p_{err,Z}(1 - p_{err,X})$, $q_Y = p_{err,X} p_{err,Z}$. The crucial feature of these coefficients is that the probability of a Y flip is suppressed, that is $q_Y < q_X$ and $q_Y < q_Z$.

Now, let $|\psi\rangle = a|0\rangle + \sqrt{1-a^2}e^{i\theta}|1\rangle$ where $a \in [0,1]$ and $\theta \in [0, 2\pi)$. Then the infidelity $\epsilon = 1 - F$ becomes:

$$\epsilon = q_X + q_Y + 4a^2(1-a^2)(q_Z - q_X + (q_X - q_Y)\sin^2\theta).$$ (S79)

Since $q_Y < q_X$ and $q_Y < q_Z$, the maximum infidelity can be obtained by setting $\theta = \pm \pi/2$ and $a = 1/\sqrt{2}$. The resulting maximum infidelity is then:

$$\epsilon_{max} = q_X + q_Z.$$ (S80)

We see that the maximum infidelity is obtained after transmission of the Y basis states $$|\psi\rangle = \frac{1}{\sqrt{2}}(|0\rangle \pm i|1\rangle).$$

Supplementary Note 10: Scheduling of Operations

In this Supplementary Note, we propose a specific scheduling procedure for the operations in all the repeaters and then establish the cost of each repeater type. These costs based on the number of GKP modes needed in each repeater as well as the number of time steps needed for storing the state are then used in the cost function minimization as described in Section IV above.

Let us first describe the scheduling of the operations inside a GKP repeater. Since we would like to use a minimal amount of resources for the operations performed inside this type of repeater, we consider an architecture that can store only a single data GKP mode at any given time. Such a repeater will then perform GKP correction in both quadratures on this data qubit. Since after measuring a GKP syndrome in one quadrature we will need a fresh GKP ancilla for measuring the syndrome in the other quadrature, we assume that the GKP repeater can simultaneously store two GKP ancilla modes such that when one is being used for syndrome measurement, the GKP ancilla is re-prepared in the other mode and vice versa. Hence such a repeater stores one data GKP mode for two time steps and uses two ancilla modes, each of which stores a GKP qubit for only one unit giving the total cost as $t_{GKP}=4$. We depict this scheduling of the syndrome measurement inside a GKP repeater in FIG. 18.

Figure 18:
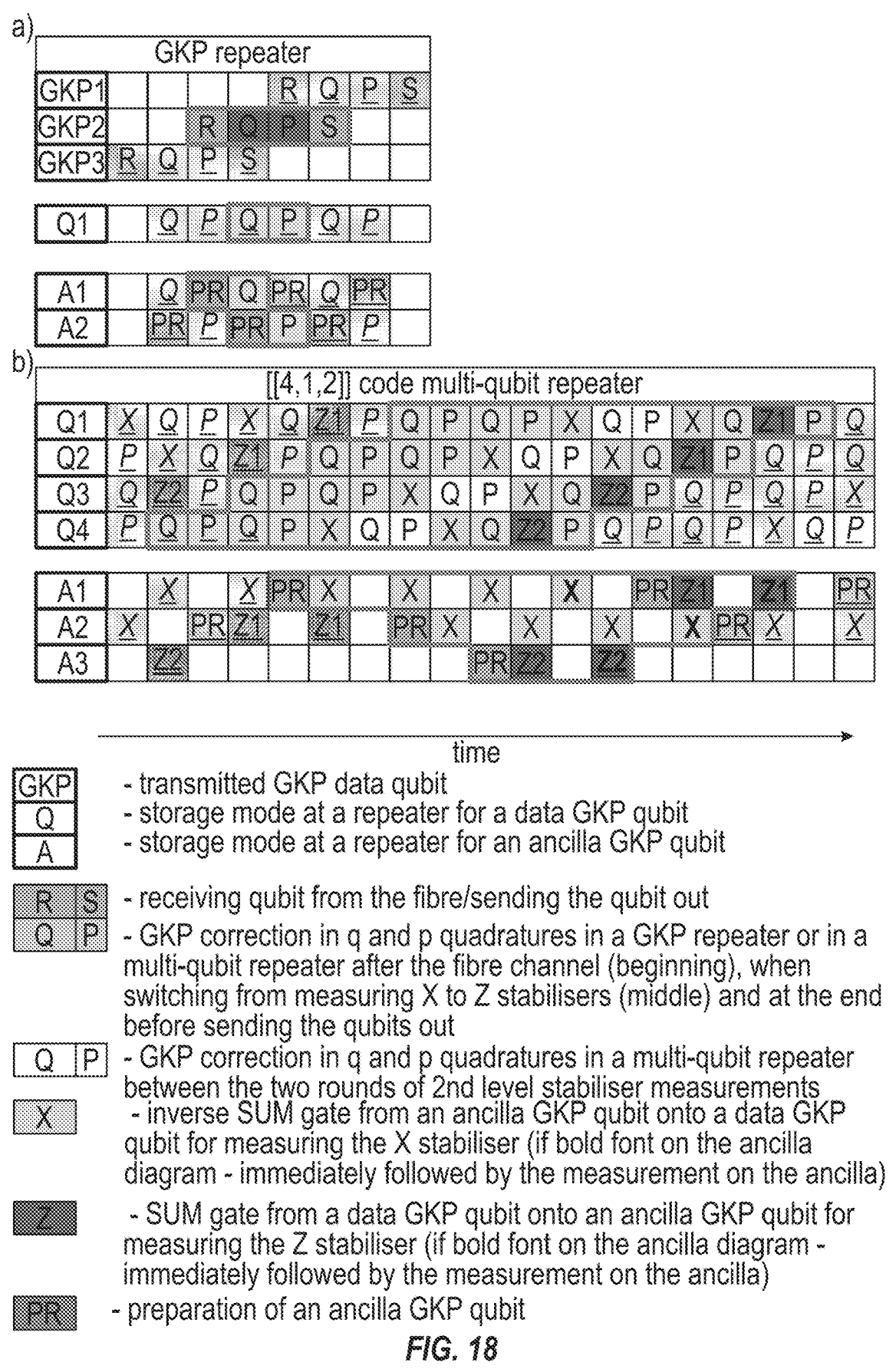

As we have seen in Supplementary Note 7, type-A repeaters require many more operations than type-B repeaters. In FIG. 18, we depict the operations performed inside the multi-qubit repeater based on the [[4,1,2]] code. The stairs-like shape of this diagram comes from the fact that the data qubits are received and sent in sequence, due to the fact that the type-B stations can operate only on individual GKP modes at a time (we maintain that scheduling also for the architecture which makes use of only type-A repeaters). We see that firstly we perform the GKP correction on each data qubit in each quadrature twice, then we measure the XXXX stabilizer twice followed by the measurement of the two Z stabilizers with additional GKP corrections in between. We see that each data mode needs to be stored for eleven time steps inside the repeater. Additionally, we need three ancilla modes for measuring multi-qubit stabilizers. Two modes are used for measuring each round of XXXX stabilizer, each requiring storage for seven time steps and one mode for measuring the IIZZ stabilizer requiring storage for three time steps. The ancilla mode used for the first measurement round of the XXXX stabilizer can be reused to measure the ZZII stabilizer. Additionally, seven modes are needed to measure the GKP stabilizers. This can be seen by considering the largest number of GKP corrections in two neighboring time steps. For GKP corrections in non-neighboring time steps, we can reuse the previous storage mode as it takes one time step to re-prepare the ancilla GKP states. These ancilla modes for GKP correction need to be able to store the GKP state for only one time step. We also show that the repeater receives and starts operating on a data GKP qubit from a new block immediately after sending the GKP qubit from the old block out. This is important for the throughput consideration. This gives the total cost as $t_{4\text{-}qubit}=68$.

Figure 19:
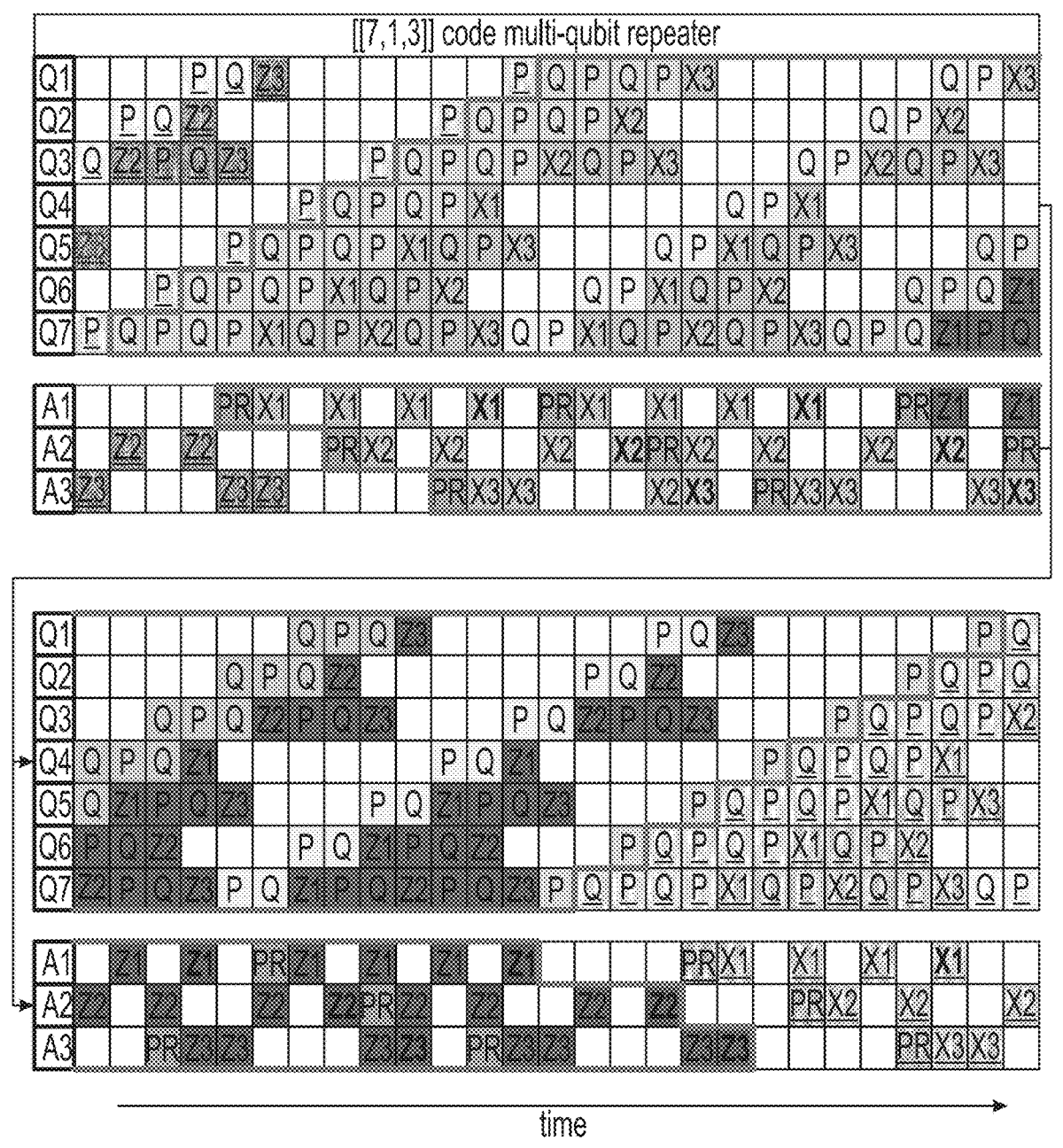

The number of operations performed in the type-A repeater based on the [[7,1,3]] code is even larger as can be seen in FIG. 19. First, we measure the GKP stabilizers in both quadratures twice on each data qubit, then we perform two rounds of measuring X stabilizers. After that we measure the Z-stabilizers twice. Again we place additional GKP corrections in between as discussed in Supplementary Note 7. Since some of the data qubits are measured more often than the others, the less frequently measured qubits will need to stay idle for some time. We introduced these idle time slots at such locations so as to make the structure of the time ordering of the operations clear. In this case, we have seven data modes stored for 40 time steps. We need three ancilla modes for measuring multi-qubit stabilizers. Two of them need to be stored for seven time steps, one for eight time steps. Finally we require nine ancilla modes for measuring the GKP stabilizers. This gives the total cost as $t_{7\text{-}qubit}=311$.

We note here that in FIGS. 18 and 19 we have not marked when the feedback displacement for correcting second-level errors should be performed. This displacement is a displacement by $\sqrt{\pi}$ on the relevant qubits. After measuring X stabilizers the corresponding displacement is along the $\hat{p}$ quadrature as it implements a Z flip while after measuring the Z-stabilizers the displacement is along the $\hat{q}$ quadrature which implements an X flip. Clearly it might not be possible to implement these displacements directly after the relevant multi-qubit stabilizer measurements, as we see in FIGS. 18 and 19 that, e.g., after finishing the measurement of the last stabilizer, some of the data qubits that should be corrected might have already been sent out. Fortunately, up to a global irrelevant phase, these Z and X correction flips commute with all the GKP corrections as well as Gaussian random displacement channels and multi-qubit stabilizer measurements in the opposite quadrature. Hence, this displacement could be implemented later, e.g., in one of the GKP stations or the following multi-qubit repeater. The only constraint is that it needs to be implemented before measuring the same stabilizers in the next type-A repeater. By counting the relevant time steps in FIGS. 18 and 19, one can verify that even if the two neighboring repeaters are both type-A stations, there is enough time for the information which qubit(s) to correct to reach the second multi-qubit repeater before measuring the same stabilizers there, without the need to delay any of the data qubits.

For the GKP repeater at the top of FIG. 18, we first illustrate GKP correction on three consecutively arriving GKP data qubits, marked GKP1, GKP2, and GKP3. The boxes marking the time slots for receiving and sending out the modes are marked only for clarity; we assume that these processes are negligible in duration relative to all the other operations and can be incorporated into the beginning of the first operation time step (receiving) or into the end of the last operation time step (sending out). We see that immediately after sending out the qubit GKP3, the qubit GKP2 is received and operated on. We then show the scheduling from the perspective of the storage modes at a repeater. A single storage mode (Q1) is used to store and correct errors on the GKP qubits using two ancilla modes (A1 and A2).

For the [[4,1,2]] code type-A repeater at the bottom of FIG. 18, we illustrate the scheduling for the four needed storage modes and three ancilla modes used for measuring second-level stabilizers. Ancilla modes A1 and A2 need to be able to store the state for seven time steps as they are used for the X stabilizer measurements. Additionally they are also used for Z1 measurement. Ancilla mode A3 has a required storage of only three time steps as it is only used for measuring Z2. Additionally seven ancilla modes are needed for the GKP corrections inside the [[4,1,2]] code multi-qubit repeater (not shown). For both repeaters in FIG. 18, we mark with the contour a single round of operations, which corresponds to a correction on a single GKP data qubit for the GKP repeater and all the operations on the four GKP data qubits from a single encoded block for the [[4,1,2]] code type-A repeater. The stair-like shape of the contour is due to the sequential transmission of the consecutive GKP data modes.

FIG. 19 is a schematic diagram of time scheduling of the operations performed in the [[7,1,3]] code multi-qubit repeater. In FIG. 19, the use of the symbols is the same as in FIG. 18. We note that in this repeater, we have additional GKP corrections within each round of measuring the higher-level syndrome. We now need seven data storage modes and again three ancilla storage modes for the measurements of the second-level stabilizers. However, two of the ancilla modes have a storage requirement of seven time steps and one of eight time steps. Additionally, we require nine ancilla modes for GKP corrections inside the repeater (not shown), which require storage of only one time step each.

Supplementary Note 11: Throughput and Latency

In our analysis, we have focused on the performance of our scheme in its ability to generate secret key in secret bits per optical mode. From the practical perspective two other important figures of merit will be the throughput and latency. Throughput tells us how much secret key in secret bits can be generated per unit time and latency how long it takes to generate the first raw bit of key, which for our scheme amounts to the transmission time from Alice to Bob of a single encoded qubit. These figures of merit will depend on how fast the encoded states can be generated at Alice, decoded and measured at Bob and the duration of the operations in the type-B and type-A repeaters. Based on our considered time-scheduling model suitable for the microwave cavity implementation, we can make the estimate of these figures as a function of the duration of one time step introduced above. Clearly the duration of such a time step $\tau_0$ will depend on the experimental parameters.

To maximize throughput, we assume that each repeater receives a new GKP mode as soon as the corresponding old mode is sent out, e.g. as soon as the 7th GKP qubit of one [[7,1,3]]-code-encoded block is sent out, in its place a 7th GKP qubit of the next block is received, see Supplementary Note 10. It is clear that the limiting factor will be the processing time $\tau_{multi-qubit}$ at type-A repeaters. This quantity is the duration over which we need to store each data mode in the type-A repeater and it is equal to $\tau_{4-qubit}=11\tau_0$ and $\tau_{7-qubit}=40\tau_0$. For the type-B repeaters the corresponding value is $\tau_{GKP}=2\tau_0$. Since the throughput of the concatenated-coded architecture could be approximated as $$R \approx \frac{r}{\tau_{multi-qubit}},$$

where r is the secret-key rate, we see that using larger codes can be a significant limitation. If the high parameter requirements of the GKP repeater chain architecture could be achieved, then its throughput $$R \approx \frac{r}{\tau_{GKP}}$$

could be higher than for the concatenated-coded scheme. To overcome this limitation of the concatenated-coded scheme one can consider multiplexing such that every type-A repeater can start receiving and processing new GKP modes, before the corresponding old ones are sent out. In general this might significantly increase the repeater cost as in order to reduce the relevant time-scale from $\tau_{multi-qubit}$ by a factor of k, a type-A repeater will require k times as many equivalent storage modes, which will increase the repeater cost k times. We note that in this section we consider the secret-key rate r, not the secret-key rate per optical mode, as for this metric it is not important how many optical modes per logical qubit are required to generate the secret key.

Moreover, we expect then that latency of the schemes using two levels of coding will be limited by the number of the type-A repeaters. Specifically, the transmission time of the first encoded qubit can be written as:

$$t_l = \frac{L_{tot}}{c} + (N+1)\tau_{multi-qubit} + (mN + (n-1))\tau_{GKP}. \quad (S81)$$

Here we have contributions from Alice's encoding, the communication time, storage time in all N type-A and mN type-B repeaters, and the additional overhead due to sequential transmission of the GKP modes, so that after having processed the first GKP qubit from the block, Bob needs to wait additional $(n-1)\tau_{GKP}$ to finish processing the remaining GKP qubits, where n is the size of the outer code. We note that as described in the cost analysis in the main body of the paper, we expect the storage time needed for encoding at Alice's station to be approximately $\tau_{multi-qubit}$ which is accounted for in the +1 pre-factor before the $\tau_{multi-qubit}$ term in Eqn. S60. Since Bob also performs quantum error correction, his decoding station is also counted as a type-A repeater (see Supplementary Note 8), and therefore is included in N. We see from Eqn. S60 then that the hybrid architecture in which N can be reduced by increasing m will, in most practical cases, also have significantly smaller latency than the architecture consisting solely of type-A repeaters (for which N is large and m=0). Again for comparison, we expect the latency of the GKP repeater chain to be $$t_l = \frac{L_{tot}}{c} + (m_{GKP} + 1)\tau_{GKP},$$

where $m_{GKP}$ is the total number of repeaters in this architecture and the +1 term accounts for Alice's encoding. The latency of this scheme could clearly be shorter than for the schemes based on two levels of coding.

Combination of Features

Features described above as well as those claimed below may be combined in various ways without departing from the scope hereof. The following examples illustrate possible, non-limiting combinations of features and embodiments described above. It should be clear that other changes and modifications may be made to the present embodiments without departing from the spirit and scope of this invention:

(A1) A method for concatenated quantum error correction includes first-layer correcting each of a plurality of data qubits into one of a plurality of first-layer-corrected qubits. Each of the plurality of data qubits encodes a first-layer logical qubit according to a first-layer code, and the plurality of data qubits block-encode a second-layer logical qubit according to a second-layer code concatenated with the first-layer code. The method also includes receiving the plurality of first-layer-corrected qubits from a quantum communication channel as a plurality of received qubits, and second-layer correcting the plurality of received qubits.

(A2) In the method denoted (A1), said first-layer correcting includes extracting one of a plurality of first-layer syndromes from each of the plurality of data qubits, said second-layer correcting includes extracting a second-layer syndrome from the plurality of received qubits, the method further comprises receiving the plurality of first-layer syndromes from a classical communication channel, and said second-layer correcting is based on error probabilities determined from the plurality of first-layer syndromes and the second-layer syndrome.

(A3) In the method denoted (A2), said second-layer correcting includes determining a second-layer physical error based on the second-layer syndrome, determining a set of candidates by identifying each subset of the plurality of received qubits that would generate the second-layer syndrome if each of the received qubits of said each subset had a first-layer logical error, and determining, for each of the set of candidates, one of the error probabilities based on the plurality of first-layer syndromes and the second-layer syndrome. Said second-layer correcting also includes identifying, from the set of candidates, a top candidate having a highest of the error probabilities, and correcting the second-layer physical error by transforming each of the received qubits in the top candidate to undo its first-layer logical error.

(A4) In any one of the methods denoted (A1) to (A3), said second-layer correcting includes transforming the plurality of received data qubits into a plurality of second-layer corrected qubits. The method further includes transmitting the plurality of second-layer corrected qubits into a second quantum communication channel.

(A5) In any one of the methods denoted (A1) to (A4), the first-layer code is a Gottesman-Kitaev-Preskill (GKP) code, the second-layer code is a discrete-variable code, and the plurality of data qubits comprises a plurality of GKP qubits. Said first-layer correcting includes extracting, from each GKP qubit of the plurality of GKP qubits, one of a plurality of first-layer syndromes indicating a shift in a first quadrature. Said first-layer correcting also includes displacing, based on the shift, said each GKP qubit along the first quadrature. Said second-layer correcting includes receiving the plurality of first-layer syndromes from a classical communication channel, extracting a second-layer syndrome from the plurality of received qubits, and determining, based on the second-layer syndrome, a second-layer physical error of the second-layer logical qubit in the first quadrature. Said second-layer correcting also includes determining a set of candidates by identifying each subset of the plurality of received qubits that would generate the second-layer syndrome if each of the received qubits of said each subset had a first-layer logical error in the first quadrature, and determining, based on the plurality of first-layer syndromes and the second-layer syndrome, error probabilities for the set of candidates. Said second-layer correcting also includes determining, from the set of candidates, a top candidate with a highest of the error probabilities, and correcting the second-layer physical error by displacing each of the received qubits in the top candidate along the first quadrature to undo its first-layer logical error.

(A6) In the method denoted (A5), said extracting the second-layer syndrome includes coupling one or more of the plurality of received qubits to an ancilla qubit, measuring the ancilla qubit to obtain a total displacement in the first quadrature, and determining the second-layer syndrome based on the total displacement.

(A7) In any one of the methods denoted (A1) to (A6), the method further comprises first-layer correcting each of the plurality of received qubits into one of a second plurality of first-layer-corrected qubits. Said second-layer correcting includes second-layer correcting the second plurality of first-layer-corrected qubits.

(A8) In the method denoted (A7), said first-layer correcting each of the plurality of data qubits includes extracting one of a first plurality of first-layer syndromes from each of the plurality of data qubits, said first-layer correcting each of the plurality of received qubits includes extracting one of a second plurality of first-layer syndromes from each of the plurality of received qubits, said second-layer correcting includes extracting a second-layer syndrome from the second plurality of first-layer corrected qubits, the method further comprises receiving the plurality of first-layer syndromes from a classical communication channel, and said second-layer correcting is based on error probabilities determined from the first plurality of first-layer syndromes, the second plurality of first-layer syndromes, and the second-layer syndrome.

(A9) In the method denoted (A8), said second-layer correcting includes determining a second-layer physical error based on the second-layer syndrome, determining a set of candidates by identifying each subset of the second plurality of first-layer-corrected qubits that would generate the second-layer syndrome the third syndrome if all each of the first-layer-corrected qubits of said each subset had a single-qubit logical error, and determining, for each of the set of candidates, one of the error probabilities based on the first plurality of first-layer syndromes, the second plurality of first-layer syndromes, and the second-layer syndrome. Said second-layer correcting also includes identifying, from the set of candidates, a top candidate having a highest of the error probabilities, and correcting the second-layer physical error by transforming each of the first-layer-corrected qubits in the top candidate to undo its first-layer logical error.

(A10) In any one of the methods denoted (A1) to (A9), the first-layer code is a bosonic code and the second-layer code is a discrete-variable code.

(A11) In the method denoted (A10), the bosonic code is a GKP code.

(A12) In the method denoted (A11), each of the plurality of data qubits is in an imperfect GKP state having a finite amount of squeezing.

(A13) In the method denoted (A10), the bosonic code is either a cat code or a binomial code.

(A14) In the method denoted (A10), the discrete-variable code is a subsystem code.

(A15) In the method denoted (A14), the subsystem code is a stabilizer code.

(A16) In the method denoted (A15), the stabilizer code is a Calderbank-Shor-Steane (CSS) code.

(A17) In the method denoted (A16), the CSS code is either a [[4,1,2]] code or a [[7,1,3]] code.

(B1) A method for concatenated quantum error correction includes, with each first-layer quantum repeater of a sequence of first-layer quantum repeaters, (i) receiving a plurality of data qubits via a quantum communication channel, each of the plurality of data qubits encoding a first-layer logical qubit according to a first-layer code, the plurality of data qubits block-encoding a second-layer logical qubit according to a second-layer code concatenated with a first-layer code, (ii) first-layer correcting, based on a plurality of first-layer syndromes extracted from the plurality of data qubits, each of the plurality of data qubits into one of a plurality of first-layer-corrected qubits, (iii) transmitting the plurality of first-layer syndromes over a classical communication channel to a second-layer quantum repeater, and (iv) transmitting the plurality of first-layer-corrected qubits over a quantum communication channel to (a) a next first-layer quantum repeater of the sequence, when said each first-layer quantum repeater is not a last first-layer quantum repeater of the sequence or (b) the second-layer quantum repeater, when said each first-layer quantum repeater is the last first-layer quantum repeater of the sequence. The method also includes, with the second-layer quantum repeater, (v) receiving, from the last first-layer quantum repeater, the corresponding plurality of first-layer-corrected qubits as a plurality of received qubits and (vi) second-layer correcting the plurality of received qubits based on error probabilities determined from (c) the plurality of first-layer syndromes received from each of the sequence of first-layer quantum repeaters, and (d) a second-layer syndrome extracted from the plurality of received qubits.

In the method denoted (B2), said second-layer correcting includes extracting the second-layer syndrome from the plurality of received qubits, determining a second-layer physical error based on the second-layer syndrome, determining a set of candidates by identifying each subset of the plurality of received qubits that would generate the second-layer syndrome if each of the received qubits of said each subset had a first-layer logical error, and determining, for each of the set of candidates, one of the error probabilities based on (i) the plurality of first-layer syndromes received from each of the sequence of first-layer quantum repeaters and (ii) the second-layer syndrome. Said second-layer correcting also includes identifying, from the set of candidates, a top candidate having a highest of the error probabilities, and correcting the second-layer physical error by transforming each of the received qubits in the top candidate to undo its first-layer logical error.

(B3) In either one of the methods denoted (B1) and (B2), the first-layer code is a bosonic code and the second-layer code is a discrete-variable code.

(C1) A second-layer quantum repeater for concatenated quantum error correction includes a classical computing device and a quantum computing device in electronic communication with the classical computing device. The classical computing device includes a classical processor and a memory in electronic communication with the classical processor. The quantum computing device includes a qubit processor for processing and measuring qubits. The memory stores machine-readable instructions that, when executed by the classical processor, control the second-layer quantum repeater to (i) receive a plurality of data qubits via a quantum communication channel, each of the plurality of data qubits encoding a first-layer logical qubit according to a first-layer code, the plurality of data qubits block-encoding a second-layer logical qubit according to a second-layer code concatenated with the first-layer code, (ii) receive a plurality of first-layer syndromes via a classical communication channel, and (iii) second-layer correct the plurality of data qubits based on error probabilities determined from (i) the plurality of first-layer syndromes and (ii) a second-layer syndrome extracted from the plurality of received qubits.

(C2) In the second-layer quantum repeater denoted (C1), the memory stores additional machine-readable instructions that, when executed by the classical processor, control the second-layer quantum repeater (i) to extract the second-layer syndrome from the plurality of data qubits, (ii) determine a second-layer physical error based on the second-layer syndrome, (iii) determine a set of candidates by identifying each subset of the plurality of data qubits that would generate the second-layer syndrome if each of the data qubits of said each subset had a first-layer logical error, (iv) determine, for each of the set of candidates, one of the error probabilities based on the plurality of first-layer syndromes and the second-layer syndrome, (v) identify, from the set of candidates, a top candidate having a highest of the error probabilities, and (vi) correct the second-layer physical error by transforming each of the data qubits in the top candidate to undo its first-layer logical error.

(C3) In either one of the second-layer quantum repeaters denoted (C1) and (C2), the first-layer code is a bosonic code and the second-layer code is a discrete-variable code.

(D1) A quantum-communication system includes a sequence of one or more first-layer quantum repeaters and a second-layer quantum repeater coupled to an output of the sequence of one or more first-layer quantum repeaters via a quantum communication channel.

(D2) In the quantum-communication system denoted (D1), each first-layer quantum repeater of the sequence is designed to transmit a plurality of data qubits to a next first-layer quantum repeater of the sequence via an intrasequence quantum communication channel, a last first-layer quantum repeater of the sequence is designed to transmit the plurality of data qubits to the second-layer quantum repeater via a last intrasequence quantum communication channel, each of the plurality of data qubits encode a first-layer logical qubit according to a first-layer code, and the plurality of data qubits block-encode a second-layer logical qubit according to a second-layer code concatenated with the first-layer code.

(D3) In the quantum-communication system denoted (D2), the first-layer code is a bosonic code and the second-layer code is a discrete-variable code.

(D4) In any one of the quantum-communication systems denoted (D1) to (D3), each first-layer quantum repeater is designed to first-layer correct each of the plurality of data qubits, and the second-layer quantum repeater is designed to second-layer correct the plurality of data qubits.

(D5) In the quantum-communication system denoted (D4), each first-layer quantum repeater is further designed to extract one of a plurality of first-layer syndromes from each of the plurality of data qubits and transmit the plurality of first-layer syndromes to the second-layer quantum repeater via a classical communication channel. The second-layer quantum repeater is further designed to extract a second-layer syndrome from the plurality of data qubits and second-layer correct the plurality of data qubits based on each plurality of first-layer syndromes and the second-layer syndrome.

(D6) In any one of the quantum-communication systems denoted (D1) to (D5), the quantum-communication system further includes a second sequence of one or more first-layer quantum repeaters coupled to an output of the second-layer quantum repeater via an intersequence quantum communication channel. The quantum-communication system further includes a second second-layer quantum repeater coupled to an output of the second sequence of first-layer quantum repeaters via a quantum communication channel.

(E1) A quantum-communication system includes a plurality of second-layer quantum repeaters and a plurality of linear chains of one or more first-layer quantum repeaters. An output of each of the plurality of linear chains is coupled, via an intersequence quantum communication channel, to an input of a corresponding one of the plurality of second-layer quantum repeaters.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for concatenated quantum error correction, comprising:
    extracting one of a plurality of first-layer syndromes from each of a plurality of data qubits, each of the plurality of data qubits encoding a first-layer logical qubit according to a first-layer code, the plurality of data qubits block-encoding a second-layer logical qubit according to a second-layer code concatenated with the first-layer code;
    first-layer correcting, based on the plurality of first-layer syndromes, each of the plurality of data qubits into one of a plurality of first-layer-corrected qubits;
    receiving the plurality of first-layer-corrected qubits from a quantum communication channel as a plurality of received qubits;
    extracting a second-layer syndrome from the plurality of received qubits;
    receiving the plurality of first-layer syndromes from a classical communication channel; and
    second-layer correcting the plurality of received qubits based on error probabilities determined from the plurality of first-layer syndromes and the second-layer syndrome.

2. The method of claim 1, wherein said second-layer correcting includes:
    determining a second-layer physical error based on the second-layer syndrome;
    determining a set of candidates by identifying each subset of the plurality of received qubits that would generate the second-layer syndrome if each of the received qubits of said each subset had a first-layer logical error;
    determining, for each of the set of candidates, one of the error probabilities based on the plurality of first-layer syndromes and the second-layer syndrome;
    identifying, from the set of candidates, a top candidate having a highest of the error probabilities; and
    correcting the second-layer physical error by transforming each of the received qubits in the top candidate to undo its first-layer logical error.

3. The method of claim 1, wherein:
    said second-layer correcting includes transforming the plurality of received data qubits into a plurality of second-layer corrected qubits; and
    the method further includes transmitting the plurality of second-layer corrected qubits into a second quantum communication channel.

4. The method of claim 1, wherein:
    the first-layer code is a Gottesman-Kitaev-Preskill (GKP) code;
    the second-layer code is a discrete-variable code;
    the plurality of data qubits comprises a plurality of GKP qubits;
    said first-layer correcting includes:
        extracting, from each GKP qubit of the plurality of GKP qubits, one of a plurality of first-layer syndromes indicating a shift in a first quadrature; and
        displacing, based on the shift, said each GKP qubit along the first quadrature; and
    said second-layer correcting includes:
        receiving the plurality of first-layer syndromes from a classical communication channel;
        extracting a second-layer syndrome from the plurality of received qubits;
        determining, based on the second-layer syndrome, a second-layer physical error of the second-layer logical qubit in the first quadrature;
        determining a set of candidates by identifying each subset of the plurality of received qubits that would generate the second-layer syndrome if each of the received qubits of said each subset had a first-layer logical error in the first quadrature;
        determining, based on the plurality of first-layer syndromes and the second-layer syndrome, error probabilities for the set of candidates;
        determining, from the set of candidates, a top candidate with a highest of the error probabilities; and
        correcting the second-layer physical error by displacing each of the received qubits in the top candidate along the first quadrature to undo its first-layer logical error.

5. The method of claim 4, wherein said extracting the second-layer syndrome includes:
    coupling one or more of the plurality of received qubits to an ancilla qubit;
    measuring the ancilla qubit to obtain a total displacement in the first quadrature; and
    determining the second-layer syndrome based on the total displacement.

6. The method of claim 1,
    further comprising first-layer correcting each of the plurality of received qubits into one of a second plurality of first-layer-corrected qubits;
    wherein said second-layer correcting includes second-layer correcting the second plurality of first-layer-corrected qubits.

7. The method of claim 6, wherein:
    said first-layer correcting each of the plurality of data qubits includes extracting one of a first plurality of first-layer syndromes from each of the plurality of data qubits;
    said first-layer correcting each of the plurality of received qubits includes extracting one of a second plurality of first-layer syndromes from each of the plurality of received qubits;
    said second-layer correcting includes extracting a second-layer syndrome from the second plurality of first-layer corrected qubits;
    the method further comprises receiving the plurality of first-layer syndromes from a classical communication channel; and
    said second-layer correcting is based on error probabilities determined from the first plurality of first-layer syndromes, the second plurality of first-layer syndromes, and the second-layer syndrome.

8. The method of claim 7, wherein said second-layer correcting includes:
   determining a second-layer physical error based on the second-layer syndrome;
   determining a set of candidates by identifying each subset of the second plurality of first-layer-corrected qubits that would generate the second-layer syndrome if each of the first-layer-corrected qubits of said each subset had a first-layer logical error;
   determining, for each of the set of candidates, one of the error probabilities based on the first plurality of first-layer syndromes, the second plurality of first-layer syndromes, and the second-layer syndrome;
   identifying, from the set of candidates, a top candidate having a highest of the error probabilities; and
   correcting the second-layer physical error by transforming each of the first-layer-corrected qubits in the top candidate to undo its first-layer logical error.

9. The method of claim 1, wherein:
   the first-layer code is a bosonic code; and
   the second-layer code is a discrete-variable code.

10. The method of claim 9, wherein:
    the bosonic code is a GKP code; and
    each of the plurality of data qubits is in an imperfect GKP state having a finite amount of squeezing.

11. The method of claim 9, wherein the bosonic code is either a cat code or a binomial code.

12. The method of claim 9, wherein the discrete-variable code is a subsystem code.

13. The method of claim 12, wherein the subsystem code is a stabilizer code.

14. A method for concatenated quantum error correction, comprising:
    with each first-layer quantum repeater of a sequence of first-layer quantum repeaters:
      receiving a plurality of data qubits via a quantum communication channel, each of the plurality of data qubits encoding a first-layer logical qubit according to a first-layer code, the plurality of data qubits block-encoding a second-layer logical qubit according to a second-layer code concatenated with a first-layer code;
      first-layer correcting, based on a plurality of first-layer syndromes extracted from the plurality of data qubits, each of the plurality of data qubits into one of a plurality of first-layer-corrected qubits;
      transmitting the plurality of first-layer syndromes over a classical communication channel to a second-layer quantum repeater; and
      transmitting the plurality of first-layer-corrected qubits over a quantum communication channel to (i) a next first-layer quantum repeater of the sequence, when said each first-layer quantum repeater is not a last first-layer quantum repeater of the sequence or (ii) the second-layer quantum repeater, when said each first-layer quantum repeater is the last first-layer quantum repeater of the sequence; and
    with the second-layer quantum repeater:
      receiving, from the last first-layer quantum repeater, the corresponding plurality of first-layer-corrected qubits as a plurality of received qubits; and
      second-layer correcting the plurality of received qubits based on error probabilities determined from (i) the plurality of first-layer syndromes received from each of the sequence of first-layer quantum repeaters, and (ii) a second-layer syndrome extracted from the plurality of received qubits.

15. The method of claim 14, wherein said second-layer correcting includes:
    extracting the second-layer syndrome from the plurality of received qubits;
    determining a second-layer physical error based on the second-layer syndrome;
    determining a set of candidates by identifying each subset of the plurality of received qubits that would generate the second-layer syndrome if each of the received qubits of said each subset had a first-layer logical error;
    determining, for each of the set of candidates, one of the error probabilities based on (i) the plurality of first-layer syndromes received from each of the sequence of first-layer quantum repeaters and (ii) the second-layer syndrome;
    identifying, from the set of candidates, a top candidate having a highest of the error probabilities; and
    correcting the second-layer physical error by transforming each of the received qubits in the top candidate to undo its first-layer logical error.

16. The method of claim 14, wherein:
    the first-layer code is a bosonic code; and
    the second-layer code is a discrete-variable code.

17. A second-layer quantum repeater for concatenated quantum error correction, comprising:
    a classical computing device comprising:
      a classical processor; and
      a memory in electronic communication with the classical processor; and
    a quantum computing device in electronic communication with the classical computing device, the quantum computing device including a qubit processor for processing and measuring qubits;
    the memory storing machine-readable instructions that, when executed by the classical processor, control the second-layer quantum repeater to:
      receive a plurality of data qubits via a quantum communication channel, each of the plurality of data qubits encoding a first-layer logical qubit according to a first-layer code, the plurality of data qubits block-encoding a second-layer logical qubit according to a second-layer code concatenated with the first-layer code,
      receive a plurality of first-layer syndromes via a classical communication channel, and
      second-layer correct the plurality of data qubits based on error probabilities determined from (i) the plurality of first-layer syndromes and (ii) a second-layer syndrome extracted from the plurality of received qubits.

18. The second-layer quantum repeater of claim 17, the memory storing additional machine-readable instructions that, when executed by the classical processor, control the second-layer quantum repeater to:
    extract the second-layer syndrome from the plurality of data qubits,
    determine a second-layer physical error based on the second-layer syndrome,
    determine a set of candidates by identifying each subset of the plurality of data qubits that would generate the second-layer syndrome if each of the data qubits of said each subset had a first-layer logical error,
    determine, for each of the set of candidates, one of the error probabilities based on the plurality of first-layer syndromes and the second-layer syndrome, identify, from the set of candidates, a top candidate having a highest of the error probabilities, and correct the second-layer physical error by transforming each of the data qubits in the top candidate to undo its first-layer logical error.

19. The second-layer quantum repeater of claim 17, wherein:

the first-layer code is a bosonic code; and
the second-layer code is a discrete-variable code.

* * * * *